United States Patent
Iwamitsu et al.

(10) Patent No.: US 8,918,609 B2
(45) Date of Patent: *Dec. 23, 2014

(54) STORAGE APPARATUS AND DATA MANAGEMENT METHOD TO DETERMINE WHETHER TO MIGRATE DATA FROM A FIRST STORAGE DEVICE TO A SECOND STORAGE DEVICE BASED ON AN ACCESS FREQUENCY OF A PARTICULAR LOGICAL AREA

(71) Applicant: Hitachi, Ltd., Tokyo (JP)

(72) Inventors: Koji Iwamitsu, Odawara (JP); Hiroaki Akutsu, Yokohama (JP); Daisuke Endo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,302

(22) Filed: Mar. 6, 2014

(65) Prior Publication Data

US 2014/0195760 A1 Jul. 10, 2014

Related U.S. Application Data

(63) Continuation of application No. 13/643,232, filed as application No. PCT/JP2012/006548 on Oct. 12, 2012.

(51) Int. Cl.
*G06F 13/00* (2006.01)
*G06F 3/06* (2006.01)

(52) U.S. Cl.
CPC ............ *G06F 3/0647* (2013.01); *G06F 3/0649* (2013.01); *G06F 3/0685* (2013.01); *G06F 3/0611* (2013.01); *G06F 3/0604* (2013.01); *G06F 3/0673* (2013.01)
USPC ........... 711/162; 711/161; 711/165; 711/154; 714/4.11; 707/827

(58) Field of Classification Search
CPC ............................... G06F 3/0647; G06F 3/067
USPC ................ 711/162, 161, 165, 154; 714/4.11; 707/827
See application file for complete search history.

(56) References Cited

U.S. PATENT DOCUMENTS

| | | | |
|---|---|---|---|
| 7,647,450 B2 * | 1/2010 | Nagae et al. | 711/114 |
| 8,015,371 B2 | 9/2011 | Araki et al. | |
| 2008/0091638 A1 | 4/2008 | Suzuki | |

(Continued)

FOREIGN PATENT DOCUMENTS

WO 2011/077489 A1 6/2011

*Primary Examiner* — Hong Kim
(74) *Attorney, Agent, or Firm* — Mattingly & Malur, PC

(57) ABSTRACT

A storage apparatus for which a hierarchical data management system is adopted is designed so that when receiving a read request for a first logical area to which a first storage area of a first storage device in a virtual volume is allocated, whether or not to migrate data in a first storage area of the first storage device, to a storage area of a second storage device is decided according to an access frequency to the first logical area in synchronization with the read request. When it is decided that the data stored in the first storage area of the first storage device should be migrated to the storage area of the second storage device, the data is migrated to a second storage area of the second storage device and the second storage area thereof is allocated to the first logical area in the virtual volume.

10 Claims, 44 Drawing Sheets

(56) References Cited

U.S. PATENT DOCUMENTS

| | | |
|---|---|---|
| 2011/0082988 A1* | 4/2011 | Kono et al. .................. 711/161 |
| 2011/0167236 A1 | 7/2011 | Orikasa et al. |
| 2011/0219271 A1* | 9/2011 | Kaneko et al. ............... 714/47.1 |
| 2011/0246739 A1 | 10/2011 | Matsuda et al. |
| 2011/0320754 A1* | 12/2011 | Ichikawa et al. ............. 711/165 |
| 2012/0005435 A1* | 1/2012 | Emaru et al. .................. 711/154 |
| 2012/0131302 A1* | 5/2012 | Nasu et al. .................... 711/171 |
| 2014/0108759 A1* | 4/2014 | Iwamitsu et al. ............ 711/165 |

* cited by examiner

FIG.5

| VOL NUMBER | TOTAL NUMBER OF PAGES | NUMBER OF ALLOCATED PAGES | | | NUMBER OF ALLOCATED CHUNKS | | | ASSIGNED POOL | I/O SYNCHRO-NIZATION PROMOTION | LAST ALLOCATING RG NUMBER | HIERARCHICAL MODE |
|---|---|---|---|---|---|---|---|---|---|---|---|
| | | Tier1 | Tier2 | Tier3 | Tier1 | Tier2 | Tier3 | | | | |
| 0 | 2000 | 600 | 300 | 100 | 600 | 10 | 4 | 0 | ON | 0 | ON |
| 1 | 1000 | 50 | 100 | 100 | 50 | 4 | 4 | 0 | OFF | 1 | ON |
| 2 | 5000 | 0 | 0 | 0 | 0 | 0 | 0 | 0 | ON | 2 | ON |
| 3 | 500 | 300 | 100 | 100 | 300 | 4 | 4 | 0 | ON | 0 | ON |
| 4 | 3000 | 200 | 0 | 900 | 200 | 0 | 29 | 0 | OFF | 1 | ON |
| 5 | 1000 | 0 | 100 | 0 | 0 | 4 | 0 | 1 | ON | 3 | OFF |
| 6 | 2000 | 0 | 200 | 0 | 0 | 7 | 0 | 2 | ON | 4 | OFF |
| ... | ... | ... | ... | ... | ... | ... | ... | ... | ... | ... | ... |

FIG.6

| RG NUMBER | POOL NUMBER | TOTAL NUMBER OF CHUNKS | NUMBER OF USED CHUNKS | DEVICE TYPE (TIER) | ASSIGNED VOL | CHUNK SIZE | PAGE SIZE |
|---|---|---|---|---|---|---|---|
| 0 | 0 | 10000 | 200 | SATA(Tier3) | 0,1,2,3,4 | 1GB | 32MB |
| 1 | 0 | 2000 | 100 | SAS(Tier2) | 0,1,2,3,4 | 1GB | 32MB |
| 2 | 0 | 1000 | 300 | SSD(Tier1) | 0,1,2,3,4 | 32MB | 32MB |
| 3 | 1 | 300 | 200 | SAS(Tier2) | 6 | 1GB | 32MB |
| 4 | 0 | 500 | 0 | SAS(Tier2) | NONE | 1GB | 32MB |
| 5 | 2 | 600 | 300 | SAS(Tier2) | 5,6 | 1GB | 32MB |
| ... | ... | ... | ... | ... | ... | ... | ... |

| TIER NUMBER | POOL NUMBER | ASSIGNED RG | TOTAL CAPACITY (GB) | USED CAPACITY (GB) | NEW ALLOCATION BUFFER RATIO (%) | RELOCATION BUFFER RATIO (%) |
|---|---|---|---|---|---|---|
| 0 | 0 | 2 | 1000 | 300 | 0 | 2 |
| 1 | 0 | 1,4 | 2500 | 100 | 2 | 8 |
| 2 | 0 | 0 | 10000 | 200 | 2 | 8 |
| 42A | 42B | 42C | 42D | 42E | 42F | 42G |

FIG. 8

| POOL NUMBER | HIERARCHICAL MODE | ASSIGNED RG | ASSIGNED VVOL | EXECUTION STATUS | TIER THRESHOLD VALUE | | PROMOTION LINE | | | DEMOTION LINE | | |
|---|---|---|---|---|---|---|---|---|---|---|---|---|
| | | | | | T1 ⇔ T2 | T2 ⇔ T3 | T3 → T1 | T2 → T1 | T3 → T2 | T1 → T2 | T2 → T3 | T1 → T3 |
| 0 | ON | 0,1,2,4 | 0,1,2,3,4 | COUNT | 100 | 10 | 186 | 256 | 683 | 100 | 10 | 10 |
| 1 | OFF | 3 | 5 | - | - | - | - | - | - | - | - | - |
| 2 | ON | 5 | 6 | STOP | 130 | 80 | 150 | 140 | 90 | 100 | 60 | 40 |
| ... | ... | ... | ... | ... | ... | ... | ... | ... | ... | ... | ... | ... |

| PAGE NUMBER | RG NUMBER | PAGE STATUS | VOL NUMBER | RELOCATION STATUS | FRONT QUEUE POINTER OR VIRTUAL ADDRESS | REAR QUEUE POINTER |
|---|---|---|---|---|---|---|
| 100 | 0 | ALLOCATED | 0 | — | 12(VIRTUAL ADDRESS) | FFFFFFFF |
| 101 | 1 | ALLOCATED | 3 | BEING MIGRATED | 20(VIRTUAL ADDRESS) | FFFFFFFF |
| 102 | 2 | UNALLOCATED | — | — | FFFFFFFF | 106(PAGE NUMBER) |
| 103 | 2 | UNALLOCATED | — | — | 106(PAGE NUMBER) | FFFFFFFF |
| 104 | 0 | ALLOCATED | 2 | — | 30(VIRTUAL ADDRESS) | FFFFFFFF |
| 105 | 0 | ALLOCATED | 2 | STANDBY | 1000(VIRTUAL ADDRESS) | FFFFFFFF |
| 106 | 2 | UNALLOCATED | — | — | 102(PAGE NUMBER) | 103(PAGE NUMBER) |
| 107 | 5 | UNALLOCATED (BEING FORMATTED) | — | — | FFFFFFFF | FFFFFFFF |
| 108 | 3 | UNALLOCATED | — | — | FFFFFFFF | FFFFFFFF |
| ... | ... | ... | ... | ... | ... | ... |
| 44A | 44B | 44C | 44D | 44E | 44F | 44G |

| PAGE ADDRESS | COUNTER VALUE |
|---|---|
| 0 | 100 |
| 1 | 255 |
| 2 | 0 |
| 3 | 0 |
| 4 | 5 |
| 5 | 30 |
| 6 | 0 |
| ... | ... |
| 45A | 45B |

| VOL NUMBER | MIGRATION SOURCE PAGE | MIGRATION DESTINATION PAGE | EXECUTION STATUS | MIGRATION DESTINATION TIER |
|---|---|---|---|---|
| 3 | 101 | 102 | IN EXECUTION | Tier1 |
| 2 | 105 | 108 | STANDBY | Tire2 |
| ... | ... | ... | ... | ... |
| 46A | 46B | 46C | 46D | 46E |

| MONITORED VALUE | COUNT-UP PROBABILITY |
|---|---|
| 0 | 100 |
| 1 | 100 |
| 2 | 100 |
| ... | ... |
| 100 | 1199625 |
| ... | ... |
| 255 | 1325493424777 |

| | CONTROL POLICIES | EXPECTED EFFECTS |
|---|---|---|
| UPON HIGH LOAD (WHEN RECEIVING I/O OF 60% TO 80% OR MORE OF CAPABILITY OF THE HIGHEST-LEVEL TIER) | EQUALIZE AVAILABILITY RATIO OF EACH TIER IN STEPWISE MANNER (ALMOST THE SAME AS RESPONSE EQUALIZATION) | • MINIMIZATION OF AVERAGE RESPONSE<br>• MAXIMIZATION OF THROUGHPUT PERFORMANCE |
| UPON NON-HIGH LOAD (WHEN RECEIVING I/O OF LESS THAN 60% TO 80% OF CAPABILITY OF THE HIGHEST-LEVEL TIER) | USE TIERS FROM THE LOWEST-LEVEL TIER IN ASCENDING ORDER OF LEVELS WHILE PREVENTING AVAILABILITY RATIO OF EACH TIER FROM EXCEEDING 60% TO 100% (ALMOST THE SAME AS RESPONSE EQUALIZATION) | • MINIMIZATION OF AVERAGE RESPONSE |

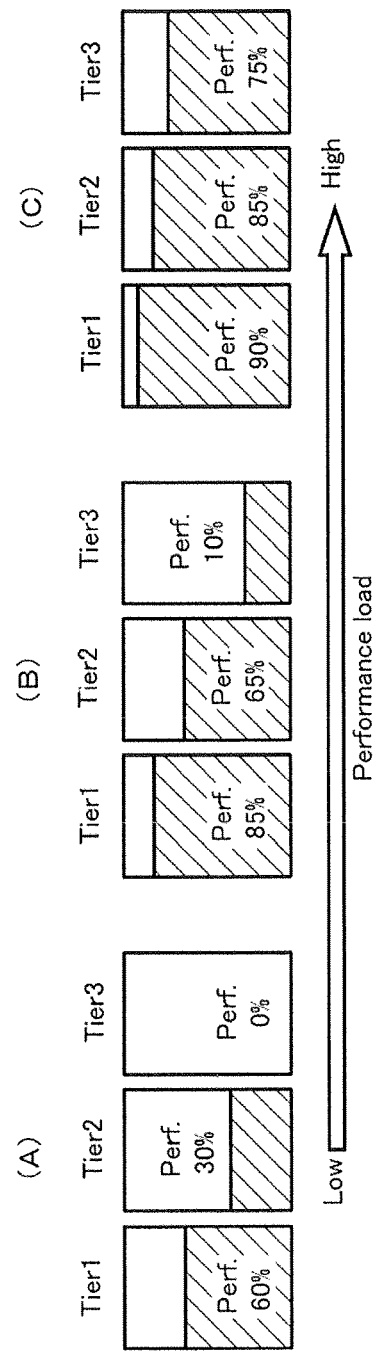

FIG.34

| SECTION NUMBER | NUMBER OF SECTION I/O ACCESSES | AVAILABILITY RATIO LEVEL BASED ON DRIVE TYPE (PERMYRIAD) | | | | |
|---|---|---|---|---|---|---|
| | | SSD | SAS15K | SAS10K | NL-SAS | SATA |
| 0 | 0 | 0 | 0 | 0 | 0 | 0 |
| 1 | 8000 | 8000 | 0 | 0 | 0 | 0 |
| 2 | 8089 | 8089 | 6000 | 0 | 0 | 0 |
| 3 | 11267 | 8267 | 6372 | 6000 | 0 | 0 |
| 4 | 11362 | 8311 | 6465 | 6103 | 1000 | 0 |
| 5 | 12216 | 8533 | 6930 | 6615 | 6000 | 3750 |
| 6 | 12728 | 8667 | 7209 | 6923 | 6364 | 6000 |
| 7 | 16000 | 10000 | 10000 | 10000 | 10000 | 10000 |

| BOUNDARY | TIER THRESHOLD VALUE |
|---|---|
| T1⇔T2 | 100 IOPH |
| T2⇔T3 | 10 IOPH |

(B)

| TIER | AVERAGE DRIVE RESPONSE TIME |
|---|---|
| T1 | 1ms |
| T2 | 9ms |
| T3 | 12ms |

(C)

| MIGRATION PATTERN | MIGRATION DESTINATION TIER | MIGRATION EFFECT | P/D LINE | (REMARKS) MIGRATION TENDENCY |
|---|---|---|---|---|
| Promotion | T2→T1 | 8 | 256 | MEDIUM |
|  | T3→T1 | 11 | 186 | HIGH |
|  | T3→T2 | 3 | 683 | NONE |
| Demotion | T1→T2 | -8 | 100 | NONE |
|  | T1→T3 | -11 | 10 | NONE |
|  | T2→T3 | -3 | 10 | NONE |

(A)

| BOUNDARY | TIER THRESHOLD VALUE |
|---|---|
| T1⇔T2 | 100 IOPH |
| T2⇔T3 | 10 IOPH |

(B)

| TIER | AVERAGE DRIVE RESPONSE TIME |
|---|---|
| T1 | 1ms |
| T2 | 50ms |
| T3 | 12ms |

(C)

| MIGRATION PATTERN | MIGRATION DESTINATION TIER | MIGRATION EFFECT | P/D LINE | (REMARKS) MIGRATION TENDENCY |
|---|---|---|---|---|
| Promotion | T2→T1 | 49 | 100 | HIGH |
|  | T3→T1 | 11 | 100 | MEDIUM |
|  | T3→T2 | -38 | MAX | NONE |
| Demotion | T1→T2 | -49 | 100 | NONE |
|  | T1→T3 | -11 | 10 | NONE |
|  | T2→T3 | 38 | 3 | LOW |

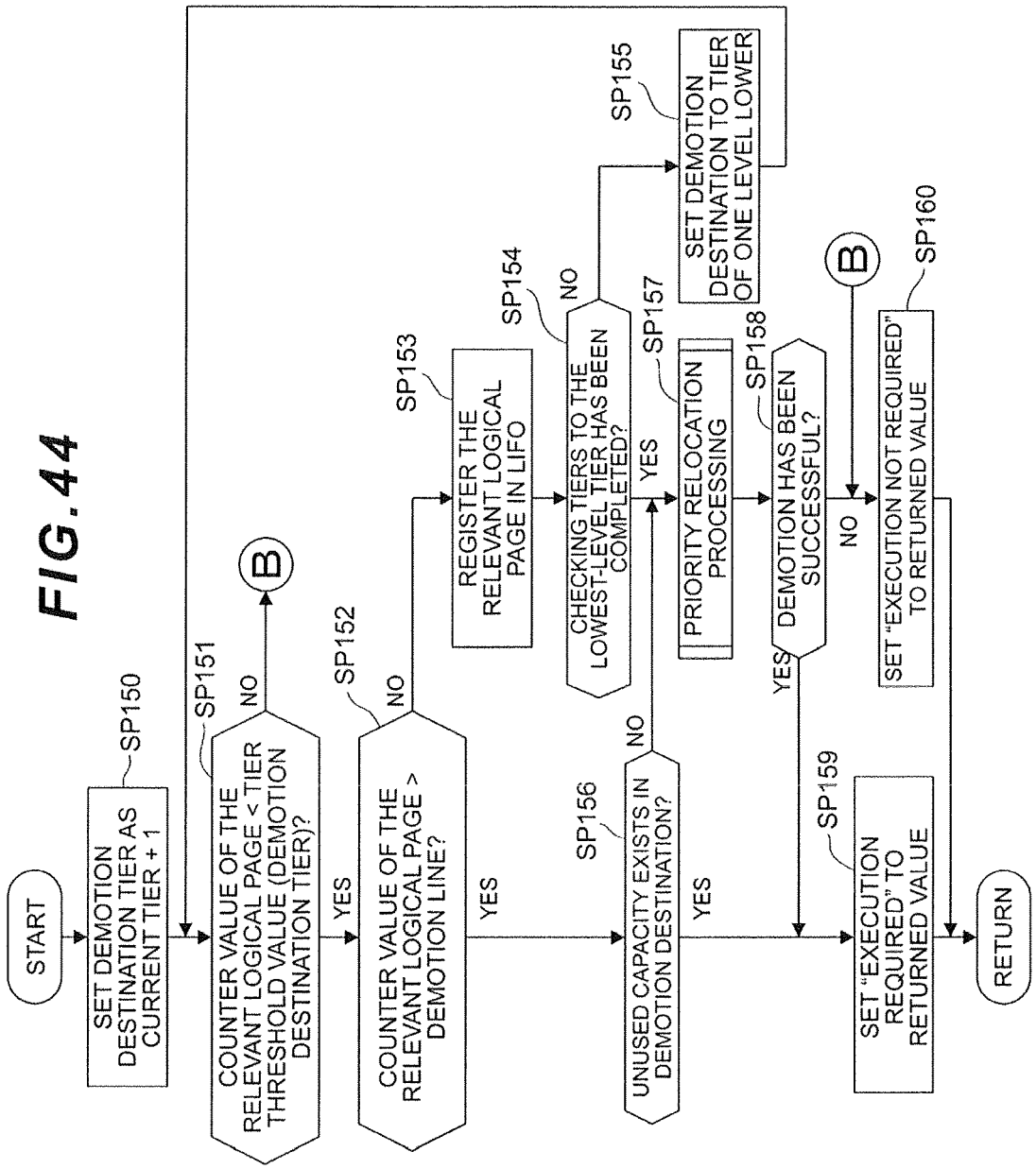

US 8,918,609 B2

STORAGE APPARATUS AND DATA MANAGEMENT METHOD TO DETERMINE WHETHER TO MIGRATE DATA FROM A FIRST STORAGE DEVICE TO A SECOND STORAGE DEVICE BASED ON AN ACCESS FREQUENCY OF A PARTICULAR LOGICAL AREA

This application is a continuation of U.S. patent application Ser. No. 13/643,232, filed Nov. 19, 2012, (Pending) which is a 371 of PCT/JP2012/006548, filed Oct. 12, 2012, the content of which is incorporated herein by reference in its entirety.

TECHNICAL FIELD

The present invention relates to a storage apparatus and a data management method and is suited for use in, for example, a storage apparatus to which a hierarchical data management technique is applied.

BACKGROUND ART

Conventionally, the hierarchical data management technique has been suggested as a virtualization technique for storage apparatuses (for example, see PTL 1). A storage apparatus provides a host system with virtual logical volumes (hereinafter referred to as the virtual volumes). The storage apparatus manages a storage area of a virtual volume by dividing it into a plurality of unit storage areas of a specified size (hereinafter referred to as the logical pages or the logical blocks).

Furthermore, the storage apparatus manages storage areas, which are provided by a plurality of types of storage drives with different performances, as one pool. The storage apparatus further manages the storage areas in the relevant pool by dividing the storage areas into a plurality of storage tiers called tiers according to the performance of the storage drives providing by the relevant storage area, and sectioning each of these tiers into storage areas, each of which is of the same size as a logical page of a virtual volume (hereinafter referred to as the physical page).

Then, when receiving a write command from the host system, which designates a virtual volume as a write location, the storage apparatus allocates a physical page from any of the storage tiers in a pool to a logical page at the data write location in the relevant virtual volume and stores write target data in the relevant physical page.

Furthermore, the storage apparatus manages the number of I/O accesses (access frequency) per unit time to each logical page of the virtual volume; and migrates data periodically by migrating data, which is stored in a logical page with a large number of I/O accesses, to a storage tier constituted from a high-performance storage drives and migrating data, which is stored in a logical page with a small number of I/O accesses, to a storage tier constituted from low-performance storage drives.

CITATION LIST

Patent Literature

[PTL 1]
WO 2011/077489A1

SUMMARY OF INVENTION

Technical Problem

The storage apparatus described in PTL 1 executes processing on I/O received from a host, judgment processing for judging whether or not data should be migrated according to an access frequency, and migration processing for actually migrating data based on the above-described judgment processing, respectively on separate cycles. In this case, an execution cycle of the judgment processing is longer than the execution cycle of the processing on I/O received from the host; and furthermore, the execution cycle of the migration processing is longer than the execution cycle of the judgment processing.

Therefore, data of high access frequency cannot be immediately migrated to a high-performance tier due to the above-described time lags. As a result, there is a problem of difficulty in enhancing response performance of the storage apparatus on a real-time basis.

The present invention was devised in consideration of the above-described circumstances and aims at suggesting a storage apparatus capable of enhancing response performance on a real-time basis and a method for controlling such a storage apparatus.

Solution to Problem

In order to solve the above-described problems, a storage apparatus according to the present invention includes: a first storage device; a second storage device whose performance is better than that of the first storage device; and a controller for providing a virtual volume including a plurality of logical areas to a host system and allocating a storage area of the first storage device or a storage area of the second storage device to a logical area after receiving a write request; wherein when receiving a read request for a first logical area to which a first storage area of the first storage device in the virtual volume is allocated, the controller decides whether or not to migrate data, which is stored in the first storage area of the first storage device, to the storage area of the second storage device according to an access frequency to the first logical area in synchronization with the read request; and when it is decided that the data stored in the first storage area of the first storage device should be migrated to the storage area of the second storage device, the controller migrates the data in the first storage area of the first storage device to a second storage area of the second storage device and allocates the second storage area of the second storage device to the first logical area in the virtual volume.

Furthermore, a data management method for a storage apparatus including a first storage device, a second storage device whose performance is better than that of the first storage device, and a controller for providing a virtual volume including a plurality of logical areas to a host system and allocating a storage area of the first storage device or a storage area of the second storage device to a logical area after receiving a write request is provided; and the data management method includes: a first step executed, when receiving a read request for a first logical area to which a first storage area of the first storage device in the virtual volume is allocated, by the controller deciding whether or not to migrate data, which is stored in the first storage area of the first storage device, to the storage area of the second storage device according to an access frequency to the first logical area in synchronization with the read request; and a second step executed when it is decided that the data stored in the first storage area of the first storage device should be migrated to the storage area of the second storage device, by the controller migrating the data in the first storage area of the first storage device to a second storage area of the second storage device and allocating the second storage area of the second storage device to the first logical area in the virtual volume.

Advantageous Effects of Invention

According to the present invention, the processing for judging whether or not it is necessary to migrate read target data from the first storage area of the first storage device to the second storage area of the second storage device and the data relocation processing can be executed in synchronization with read processing. Therefore, it is possible to realize a storage apparatus and data management method capable of enhancing response performance on a real-time basis.

BRIEF DESCRIPTION OF DRAWINGS

FIG. 5 is a conceptual diagram showing the structure of a virtual volume index table.

FIG. 6 is a conceptual diagram showing the structure of a RAID group index table.

FIG. 7 is a conceptual diagram showing the structure of a tier management table.

FIG. 8 is a conceptual diagram showing the structure of a pool index table.

FIG. 9 is a conceptual diagram showing the structure of a page address table.

FIG. 10 is a conceptual diagram showing the structure of a counter value management table.

FIG. 11 is a conceptual diagram showing the structure of a page relocation execution management table.

FIG. 12 is a conceptual diagram showing the structure of a monitored value transition table.

FIG. 29 is a chart for explaining a tier threshold value calculation method according to this embodiment.

FIG. 30(A) to FIG. 30(C) are conceptual diagrams for explaining the tier threshold value calculation method according to this embodiment.

FIG. 34 is a conceptual diagram showing the structure of a section I/O access management table.

FIG. 38(A) to FIG. 38(C) are charts for explaining the promotion lines and the demotion lines.

FIG. 44 is a flowchart illustrating a processing sequence for demotion judgment processing.

DESCRIPTION OF EMBODIMENTS

An embodiment of the present invention will be explained in detail with reference to the attached drawings.

(1) Configuration of Computer System According to this Embodiment

Figure 1:
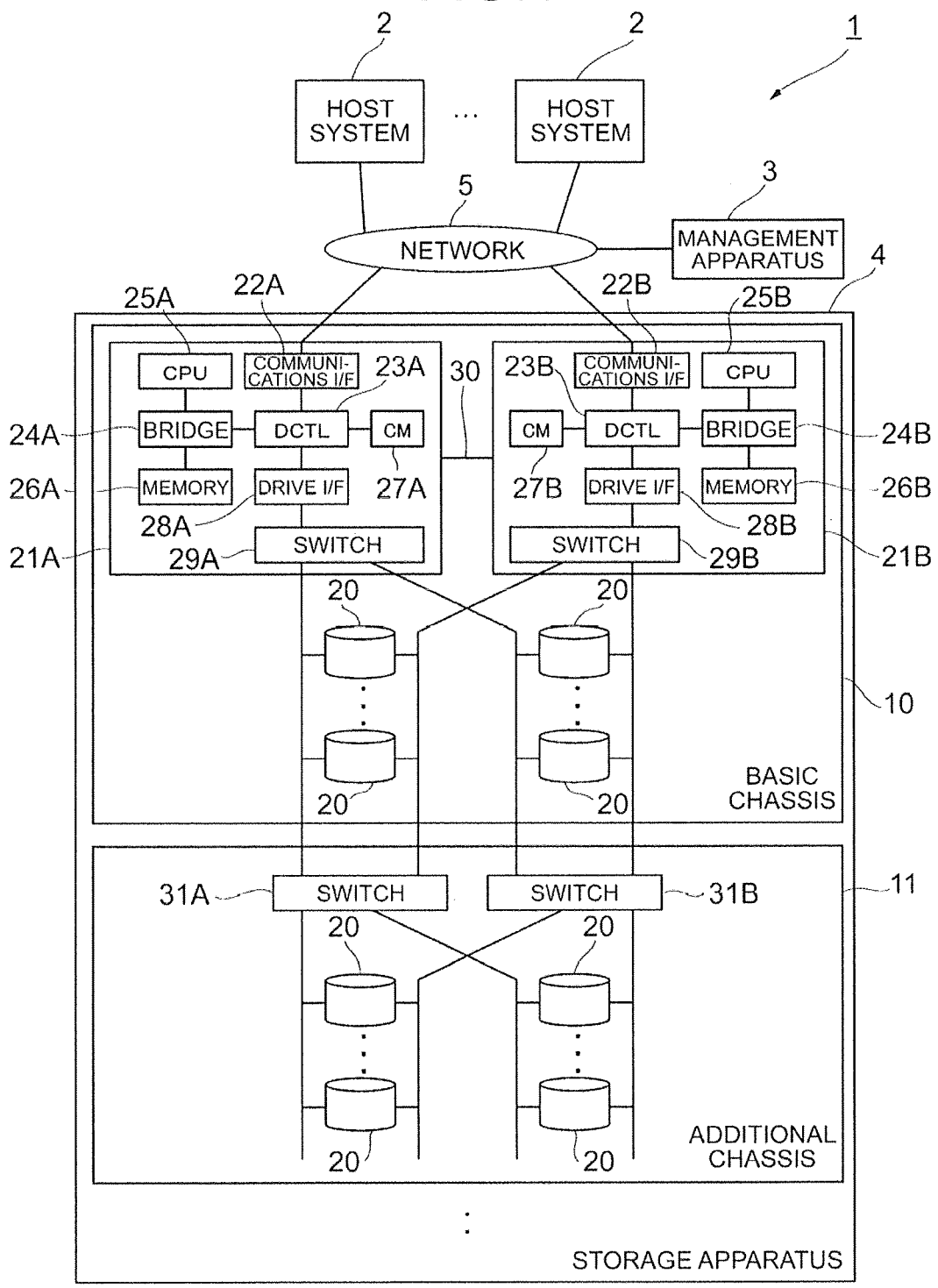
FIG. 1 is a block diagram showing the overall configuration of a computer system according to this embodiment.

Referring to FIG. 1, the reference numeral 1 represents a computer system according to a first embodiment as a whole. This computer system 1 includes a plurality of host systems 2, a management apparatus 3, and a storage apparatus 4, which are connected via a network 5.

The host system 2 is a computer device executing I/O access (read access or write access) to the storage apparatus 4 and is composed of, for example, a personal computer, workstation, or mainframe.

The management apparatus 3 is a server device for managing the storage apparatus 4 and is composed of a general-purpose server device equipped with information processing resources such as a CPU (Central Processing Unit), a ROM (Read Only Memory), and a RAM (Random Access Memory). The management apparatus 3 includes a display device for displaying a UI (User Interface) screen for making various settings to the storage apparatus 4 as well as various information, input devices such as a keyboard and a mouse for an operator to input various operations and various settings, and a communication device for communicating with the storage apparatus 4 via the network 5. Various processing is executed for the management apparatus 3 as a whole by the CPU executing programs stored in, for example, the ROM in accordance with various commands input via the input devices.

The storage apparatus 4 includes a basic chassis 10 and one or more additional chassis 11.

The basic chassis 10 includes a plurality of storage drives 20 and two system-0 and system-1 controllers 21A, 21B for controlling data input to, or output from, the plurality of storage drives 20.

The storage drives 20 are composed of, for examples, hard disk devices such as SAS (Serial Attached SCSI) disks or SATA (Serial AT Attachment) disks or semiconductor memories such as SSDs (Solid State Drives). These storage drives 20 are operated by each of the system-0 controller 21A and the system-1 controller 21B according to a RAID (Redundant Arrays of Inexpensive Disks) system. Incidentally, there may be one controller 21A, 21B.

Each of the system-0 controller 21A and the system-1 controller 21B includes a communications interface unit 22A, 22B, a data transfer control unit 23A, 23B, a bridge 24A, 24B, a CPU (Central Processing Unit) 25A, 25B, a local memory 26A, 26B, a cache memory 27A, 27B, a drive interface unit 28A, 28B, and a switch 29A, 29B.

The communications interface unit 22A, 22B is an interface with the network 5 and sends and/or receives data (write data or read data) or I/O commands to and/or from the host system 2 via the network 5.

The data transfer control unit 23A, 23B has a function switching between a data transfer source and a data transfer designation between the communications interface unit 22A, 22B, the bridge 24A, 24B, the cache memory 27A, 27B, and the drive interface unit 28A, 28B and is composed of, for example, a PCIe (PCI [Peripheral Component Interconnect] Express) switch. Furthermore, the data transfer control unit 23A, 23B is connected to the data transfer control unit 23B, 23A for the other system (system 1 or system 0) via a bus 30 and is designed to be capable of sending and/or receiving commands and data to and/or from the data transfer control unit 23B, 23A for the other system via this bus 30.

The bridge 24A, 24B is a relay device for connecting each of the CPU 25A, 25B and the local memory 26A, 26B of the local system to the data transfer control unit 23A, 23B of that local system, extracts only the corresponding data among data passing through the bus connecting the communications interface unit 22A, 22B, the data transfer control unit 23A, 23B, the cache memory 27A, 27B, and the drive interface unit 28A, 28B, and transfers it to the CPU 25A, 25B and the local memory 26A, 26B.

The CPU 25A, 25B is a processor controlling the operation of the entire storage apparatus 4 and controls, for example, input/output of data, commands, or management information sent and/or received via the communications interface unit 22A, 22B. Furthermore, the local memory 26A, 26B is mainly used to retain various control programs and various control data. Various processing as described later is executed in the storage apparatus 4 as a whole by the CPU 25A, 25B executing the control programs retained in the local memory 26A, 26B.

The cache memory 27A, 27B is mainly used to temporarily store and retain data read from, and/or data to be written to, the storage drives 20.

The drive interface unit 28A, 28B is an interface with the storage drives 20. The CPU 25A, 25B reads read data from and/or writes write data to the corresponding address location in the relevant storage drive 20 by controlling the relevant storage drive 20 via the drive interface unit 28A, 28B based on an I/O command issued from the host system 2 via the communications interface unit 22A, 22B.

The switch 29A, 29B is a relay device for connecting the plurality of storage drives 20 to each of the system-0 controller 21A and the system-1 controller 21B and is composed of, for example, an expander. These switches 29A, 29B can be expanded and connected to each other by a tree-structure topology. Accordingly, each of the system-0 controller 21A and the system-1 controller 21B can control the large number of storage drives 20 via the plurality of switches 29A, 29B.

The additional chassis 11 includes a plurality of switches 31A, 31B, which are placed respectively corresponding to the switches 29A, 29B provided in the system-0 controller 21A and the system-1 controller 21B of the basic chassis 10, and a plurality of storage drives 20. The same switches as used for the switches 29A, 29B of the basic chassis 10 are used for the switches 31A, 31B and the switches 31A, 31B are directly connected to these switches 29A, 29B or indirectly connected to the switches 29A, 29B via the corresponding switches 31A, 31B in an additional chassis 11 immediately preceding the relevant chassis.

Figure 2:
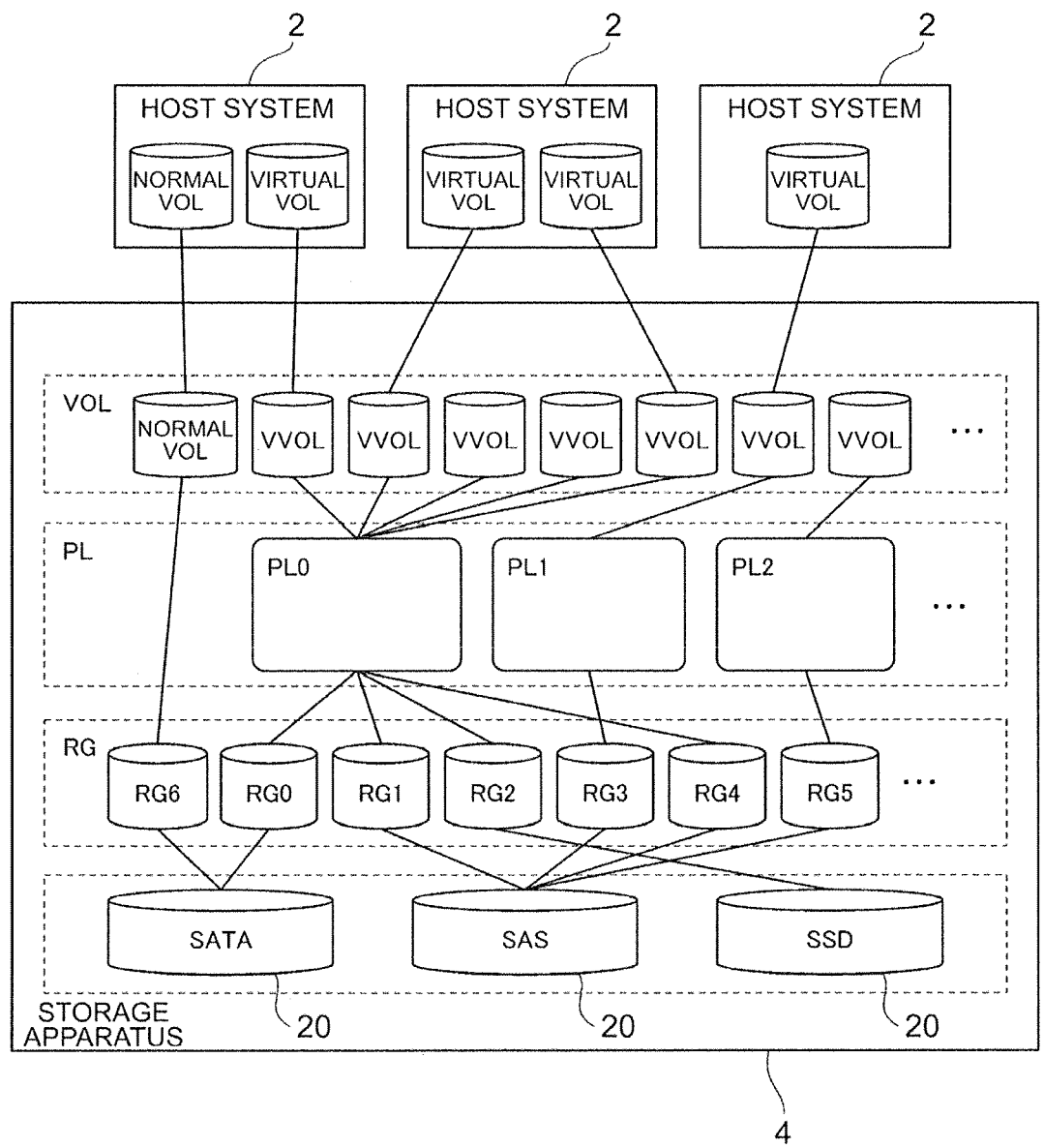
FIG. 2 is a conceptual diagram showing a logical structure of storage areas in a storage apparatus according to this embodiment.

FIG. 2 shows a logical structure of storage areas in the storage apparatus 4. With this computer system 1, one or more storage drive 20 in the storage apparatus 4 constitutes one RAID group RG and storage areas provided by one or more RAID groups RG are managed as one pool PL. The storage areas provided by a RAID group RG are managed by dividing them into a plurality of types of tiers (storage tiers) according to the performance of the storage drives 20 constituting that RAID group RG. Each pool PL to which an operation mode to manage data by changing a page-based (or block-based) storage area, which is allocated to a virtual volume, between tiers (hereinafter referred to as the hierarchical mode) is set is composed of a plurality of tiers with different response performances. The storage area of each pool PL is managed by dividing it into physical pages, each of which is of the same size as that of a logical page of a virtual volume VVOL.

Each pool PL is associated with one or more virtual volumes VVOL and these virtual volumes VVOL are provided to the host system 2.

Each virtual volume VVOL is assigned its unique identifier (hereinafter referred to as the volume number). The inner area of each virtual volume VVOL is managed by using a storage area unit of a specified size called a logical block. Furthermore, a virtual volume VVOL is divided into logical pages, each of which is of a specified size, and is managed by using these logical pages as units. Here, a logical page is composed of a plurality of logical blocks. In the case of this embodiment, data reading and/or writing from the host system 2 to the virtual volume VVOL is performed by using a combination of the volume number of the relevant virtual volume VVOL and a unique number assigned to each logical block in the relevant virtual volume VVOL (hereinafter referred to as the LBA [Logical Block Address]) as a virtual address and designating the relevant virtual address.

If a data write command targeted at a virtual volume VVOL is received from the host system 2 and no storage area is allocated to a virtual address designated as a write location of the relevant data in the relevant virtual volume VVOL, a necessary amount of storage area is allocated in physical pages from a pool PL, which is associated with that virtual volume VVOL, to a logical page(s) including logical blocks at that virtual address. Then, the write data from the host system 2 is written to the physical pages allocated to these logical blocks.

(2) Real-time Monitoring Function According to this Embodiment

Next, a real-time monitoring function mounted in the storage apparatus 4 according to this embodiment will be explained.

Figure 3:
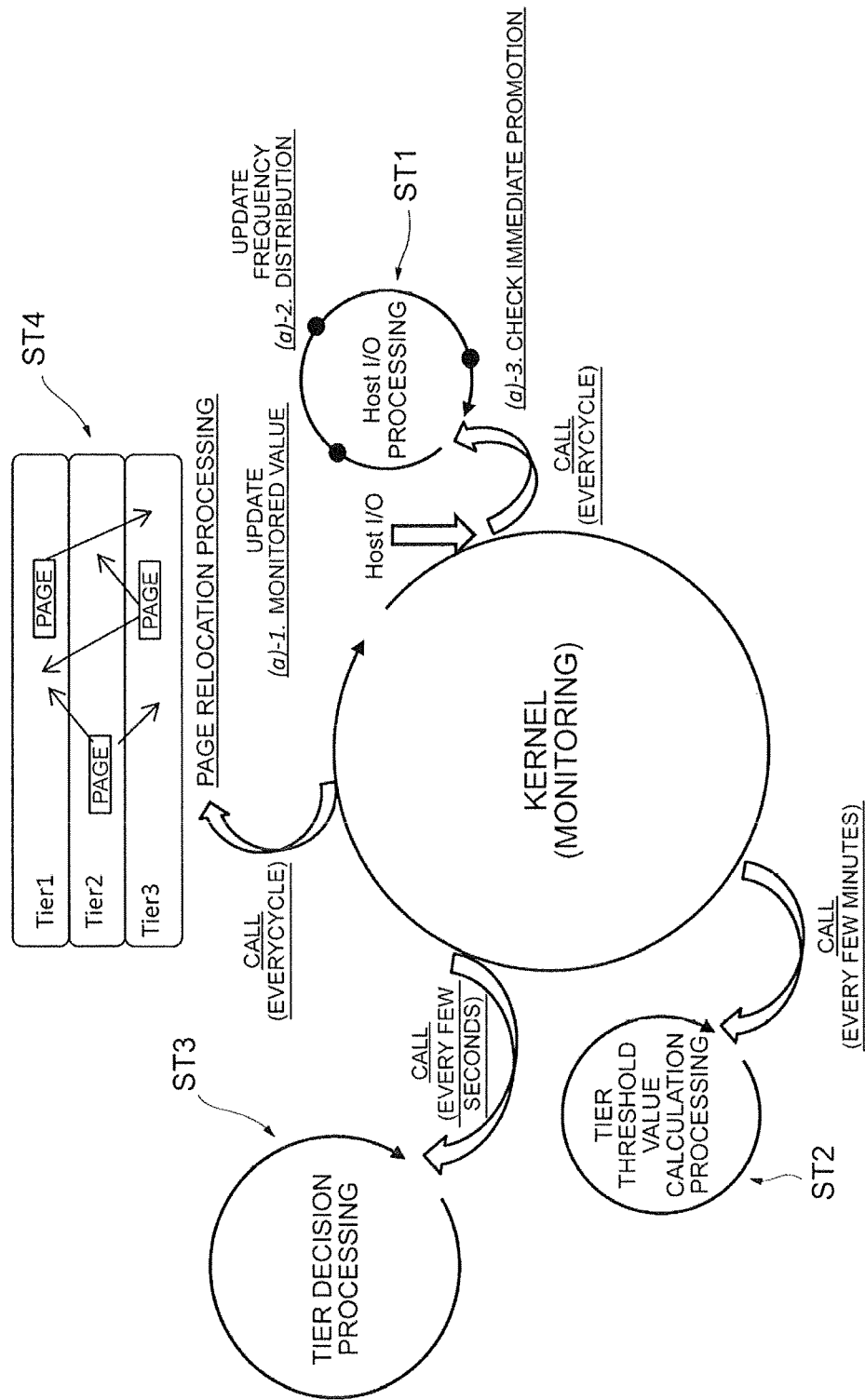
FIG. 3 is a conceptual diagram for explaining a real-time monitoring function according to this embodiment.

FIG. 3 shows the outline of real-time monitoring processing executed in the storage apparatus 4 with respect to a pool PL whose hierarchical mode is set on based on the real-time monitoring function.

As shown in this FIG. 3, the storage apparatus 4 executes: host I/O processing (read processing or write processing) ST1 for processing an I/O request (read request or write request) from the host system 2 on a specified monitoring cycle with respect to a pool PL whose hierarchical mode is set on; and page relocation processing ST4 for migrating data, which is written to a logical page(s) of high or low access frequency among logical pages of each virtual volume VVOL, from a current physical page of the corresponding pool PL to a physical page belonging to a higher-level or lower-level tier than the tier where the relevant physical page belongs.

Furthermore, in addition to the host I/O processing ST1 and the page relocation processing ST4, the storage apparatus 4 executes, on specified cycles which are set for each of the following processing (ST1 and ST4 are separate cycles): tier threshold value calculation processing ST2 for calculating a threshold value serving as a judgment standard for judging whether to migrate data writing to a logical page to another tier (hereinafter referred to as the tier threshold value), with respect to each pool PL; and tier decision processing ST3 for deciding an optimum tier to store data which is stored in each logical page of each virtual volume VVOL.

In this case, an execution cycle of the tier threshold value calculation processing ST2 is a few-minute cycle and an execution cycle of the tier decision processing ST3 is a few-second cycle, so that the execution cycles of the above-mentioned processing ST2 and ST3 are extremely slower than execution cycles (monitoring cycles) of the host I/O processing ST1 and the page relocation processing ST4, which are few-nanosecond (ns) cycles. Accordingly, due to time lags between the execution cycles of the tier threshold value calculation processing ST2 and the tier decision processing ST3 and the execution cycles of the host I/O processing ST1 and the page relocation processing ST4, data which should be migrated may not be sometimes migrated immediately to a physical page of an appropriate tier.

Furthermore, it is possible to execute the tier threshold value calculation processing ST2 and the tier decision processing ST3 on the same cycles as the execution cycles of the host I/O processing ST1 and the page relocation processing ST4 in order to reduce the time lags; however, in that case, overhead for the tier threshold value calculation processing ST2 and the tier decision processing ST3 increases, which causes a problem of incapability to achieve response performance which could originally be expected.

So, one of characteristics of this storage apparatus 4 is that it executes promotion judgment processing on a virtual volume VVOL associated with the pool PL, whose hierarchical mode is set on, for judging whether or not data written to a logical page which is I/O-accessed from the host system 2 at the time of the host I/O processing ST1 should be migrated from a current physical page in the corresponding pool PL to a physical page belonging to a tier of a higher level than that of the relevant physical page (migration from the current physical page in a pool PL to a physical page belonging to a tier of an upper level than that of the current physical page will be hereinafter referred to as the promotion); and if it is determined that the promotion is necessary, the storage apparatus 4 executes page relocation processing for migrating the data to a physical page of an appropriate tier in the corresponding pool PL in synchronization with the host I/O processing.

Incidentally, the following explanation will be given, assuming that tiers which are set to a pool PL in the storage apparatus 4 have a three-tier structure composed of a first tier to a third tier; and the first tier (Tier1) is a storage area provided by a RAID group RG composed of the highest-performance storage drives 20 (for example, SSDs), the second tier (Tier2) is a storage area provided by a RAID group RG composed of the second-highest-performance storage drives 20 (for example, SAS disks), and the third tier (Tier3) is a storage area provided by a RAID group RG composed of the lowest-performance storage drives 20 (for example, NL-SAS and SATA disks).

Figure 4:
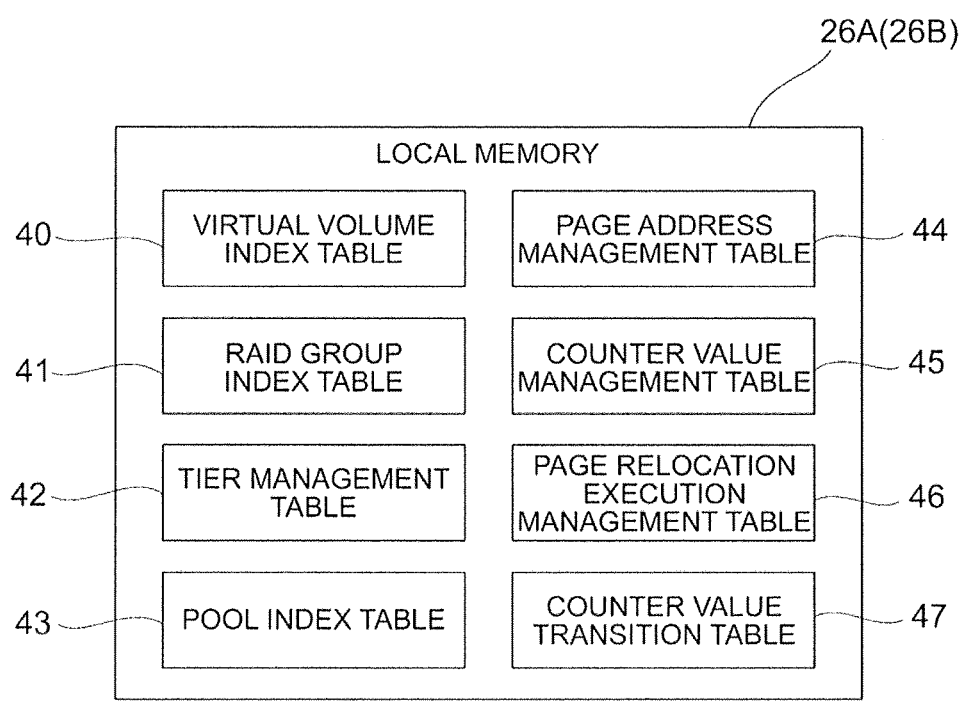
FIG. 4 is a conceptual diagram for explaining a memory structure of the storage apparatus.

As a means for implementing the real-time monitoring processing according to this embodiment described above, the local memory 26A, 26B for the storage apparatus 4 stores a virtual volume index table 40, a RAID group index table 41, a tier management table 42, a pool index table 43, a page address table 44, a counter value management table 45, a page relocation execution management table 46, and a counter value transition table 47 as shown in FIG. 4.

The virtual volume index table 40 among the above-described tables is a table for managing virtual volumes VVOL which are set in the storage apparatus 4; and the virtual volume index table 40 is constituted from a volume number field 40A, a total-number-of-pages field 40B, a number-of-allocated-pages field 40C, a number-of-allocated-chunks field 40D, an assigned pool field 40E, an I/O synchronization promotion field 40F, a last allocating RAID group number field 40G, and a hierarchical mode field 40H as shown in FIG. 5.

Then, the volume number field 40A stores an identifier assigned to each virtual volume VVOL which is set in the storage apparatus 4 (hereinafter referred to as the volume number); and the total-number-of-pages field 40B stores the total number of logical pages which are set to the corresponding virtual volume VVOL.

Furthermore, the number-of-allocated-pages field 40C is constituted from a first tier field 40CA, a second tier field 40CB, and a third tier field 40CC; and each of the first tier field 40CA, the second tier field 40CB, and the third tier field 40CC stores the total number of physical pages allocated from physical pages belonging to the first to third tiers in the corresponding pool PL to the corresponding virtual volume VVOL.

Similarly, the number-of-allocated-chunks field 40D is constituted from a first tier field 40DA, a second tier field 40DB, and a third tier field 40DC; and each of the first tier field 40DA, the second tier field 40DB, and the third tier field 40DC stores the total number of chunks allocated from physical pages belonging to the first to third tiers in the corresponding pool PL to the corresponding virtual volume VVOL. The chunks herein used are storage area units secured at once in the pool PL in order to allocate them to the virtual volume VVOL and a chunk is composed of a specified number of physical pages (32 pages in this embodiment). The details of the chunks will be explained later. Incidentally, the size of a physical chunk and the size of a physical page are the same in the first tier which is the SSD storage area.

The assigned pool field 40E stores an identifier of a pool PL associated with the corresponding virtual volume VVOL (hereinafter referred to as the pool number); and the I/O synchronization promotion field 40F stores information indicating whether or not an operation mode to execute processing for judging whether or not I/O target data should be migrated (or stored) to a physical page in an upper-level tier in the pool PL, and migrating (or storing) the I/O target data to the physical page in the higher-level tier in the corresponding pool PL in synchronization with the host I/O processing ST1 (FIG. 3) (hereinafter referred to as the I/O synchronization promotion mode) is set (the I/O synchronization promotion field 40F stores "ON" if the I/O synchronization promotion mode is set; and the I/O synchronization promotion field 40F stores "OFF" if the I/O synchronization promotion mode is not set).

Furthermore, the last allocating RAID group number field 40G stores an identification number of a RAID group RG from which a physical page is allocated to the corresponding virtual volume VVOL last time (hereinafter referred to as the RAID group number); and the hierarchical mode field 40H stores information indicating whether or not a hierarchical mode is set to a pool PL associated with the relevant virtual volume VVOL (the hierarchical mode field 40H stores "ON" if the hierarchical mode is set; and the hierarchical mode field 40H stores "OFF" if the hierarchical mode is not set).

Incidentally, the hierarchical mode means an operation mode to manage data by means of the hierarchical data management technique as described earlier. A pool to which this hierarchical mode is set is composed of a plurality of tiers and data written to the relevant logical page is migrated from a physical page then associated with that logical page to a physical page belonging to a higher-level or lower-level tier in the pool PL as necessary according to the access frequency to each logical page of the virtual volume VVOL.

The RAID group index table 41 is a table used to manage RAID groups RG defined in the storage apparatus 4; and is constituted from a RAID group number field 41A, a pool number field 41B, a total-number-of-chunks field 41C, a number-of-used-chunks field 41D, a drive type and tier field 41E, an assigned virtual volume field 41F, a chunk size field 41G, and a page size field 41H as shown in FIG. 6.

Then, the RAID group number field 41A stores a RAID group number of each RAID group RG created in the storage apparatus 4; and the pool number field 41B stores a pool number of a pool PL to which the relevant RAID group RG belongs (or which the relevant RAID group RG constitutes).

Furthermore, the total-number-of-chunks field 41C stores the total number of chunks which are storage areas provided by the relevant RAID group RG; and the number-of-used-chunks field 41D stores the total number of chunks which are already allocated to any of virtual volumes VVOL among the total number of chunks.

Furthermore, the drive type and tier field 41E stores the type of the storage drives 20 (FIG. 1) constituting the relevant RAID group RG and the identification number of a tier to which a storage area provided by the relevant storage drive 20 (hereinafter referred to as the tier number); and the assigned virtual volume field 41F stores the volume number of a virtual volume VVOL to which a physical page(s) provided by the relevant RAID group RG are allocated.

Furthermore, the chunk size field 41G stores the size of chunks in the storage area provided by the relevant RAID group RG; and the page size field 41H stores the size of physical pages in the storage area provided by the relevant RAID group RG.

On the other hand, the tier management table 42 is a table created for each pool PL in order to manage each tier (first to third tiers) constituting the relevant pool PL; and is constituted from a tier index field 42A, a pool number field 42B, an assigned RAID group field 42C, a total capacity field 42D, a used capacity field 42E, a new allocation buffer ratio field 42F, and a relocation buffer ratio field 42G as shown in FIG. 7.

Then, each pool field 42B stores the pool number of the corresponding pool PL. Also, the tier index field 42A stores the tier number of each tier (first to third tiers) constituting the relevant pool PL; and the assigned RAID group field 42C stores the RAID group numbers of all RAID groups RG providing storage areas of the corresponding tier.

Furthermore, the total capacity field 42D stores the total capacity of the corresponding tier; and the used capacity field 42E stores a capacity already allocated to any of the virtual volumes VVOL among the total capacity of the relevant tier. Furthermore, the new allocation buffer ratio field 42F stores a ratio of storage capacity that should be secured as a buffer when allocating a new physical page to the relevant tier (a ratio to the total capacity; and hereinafter referred to as the new allocation buffer ratio). Similarly, the relocation buffer ratio field 42G stores a ratio of storage capacity that should be secured as a buffer when migrating data stored in a physical page(s) in the relevant tier to a physical page(s) in another tier (a ratio to the total capacity; and hereinafter referred to as the relocation buffer ratio).

The pool index table 43 is a table used to manage the pools PL which are set in the storage apparatus 4; and is constituted from a pool number field 43A, a hierarchical mode field 43B, an assigned RAID group field 43C, an assigned virtual volume field 43D, an execution status field 43E, a tier threshold value field 43F, a promotion line field (hereinafter sometimes referred to as the promotion threshold value) 43G, and a demotion line (hereinafter sometimes referred to as the demotion threshold value) field 43H as shown in FIG. 8.

Then, the pool number field 43A stores the identification number (pool number) assigned to each pool PL created in the storage apparatus 4; and the hierarchical mode field 43B stores information indicating whether or not the hierarchical mode is set to the relevant pool PL (the hierarchical mode field 43B stores "ON" if the hierarchical mode is set; and the hierarchical mode field 43B stores "OFF" if the hierarchical mode is not set).

Furthermore, the assigned RAID group field 43C stores the RAID group number of a RAID group(s) RG belonging to the corresponding pool PL (or a RAID group(s) constituting that pool PL); and the assigned virtual volume field 43D stores the volume number of all virtual volumes VVOL associated with that pool PL.

Furthermore, the execution status field 43E stores information indicating whether or not the setting is made to count the number of accesses to individual logical pages in each virtual volume VVOL associated with that pool PL when the hierarchical mode is set to that pool PL (the execution status field 43E stores "Count" if the setting to count the number of accesses is set; and the execution status field 43E stores "Stop" if the setting to count the number of accesses is not set).

The tier threshold value field 43F is constituted from a first tier threshold value field 43FA and a second tier threshold value field 43FB. Then, the first tier threshold value field 43FA stores a tier threshold value serving as a judgment standard used when judging whether or not data written to a logical page in the corresponding virtual volume VVOL should be migrated (or demoted) from a physical page belonging to the first tier in the corresponding pool PL to a physical page belonging to the second tier, or whether or not the data should be migrated (or promoted) from the physical page belonging to the second tier to the physical page belonging to the first tier (hereinafter referred to as the first tier threshold value).

Furthermore, the second tier threshold value field 43FB stores a tier threshold value serving as a judgment standard used when judging whether or not data stored in a logical page in the relevant virtual volume VVOL should be migrated (or demoted) from a physical page belonging to the second tier in the relevant pool PL to a physical page belonging to the third tier, or whether or not the data should be migrated (or promoted) from the physical page belonging to the third tier to the physical page belonging to the second tier (hereinafter referred to as the second tier threshold value). The details of these first and second tier threshold values will be explained later.

The promotion line field 43G is constituted from a T3-T1 promotion line field 43GA, a T2-T1 promotion line field 43GB, and a T3-T2 promotion line field 43GC.

Then, the T3-T1 promotion line field 43GA stores a threshold value of access frequency to the relevant logical page (hereinafter referred to as the T3-T1 promotion line), which is used as a judgment standard together with the aforementioned first tier threshold value when judging whether or not data stored in a logical page of the corresponding virtual volume VVOL should be migrated (or promoted) from a physical page belonging to the third tier in the corresponding pool PL to a physical page belonging to the first tier. The promotion from the physical page belonging to the third tier to the physical page belonging to the first tier is executed when the number of I/O accesses to the corresponding logical page of the corresponding virtual volume VVOL satisfies both a migration condition defined by the first tier threshold value (larger than the first tier threshold value) and a migration condition defined by the T3-T1 promotion line (larger than the T3-T1 promotion line). Incidentally, the promotion from a physical page belonging to the third tier to a physical page belonging to the first tier may be executed without considering the first tier threshold value when the migration condition defined by the T3-T1 promotion line (larger than the T3-T1 promotion line) is satisfied.

Similarly, the T2-T1 promotion line field 43GB stores a threshold value of access frequency to the relevant logical page (hereinafter referred to as the T2-T1 promotion line), which is used as a judgment standard together with the aforementioned first tier threshold value when judging whether or not data stored in a logical page in the relevant virtual volume VVOL should be migrated (or promoted) from a physical page belonging to the second tier in the relevant pool PL to a physical page belonging to the first tier. The promotion from the physical page belonging to the second tier to the physical page belonging to the first tier is executed when the number of I/O accesses to the corresponding logical page of the corresponding virtual volume VVOL satisfies both the migration condition defined by the first tier threshold value (larger than the first tier threshold value) and a migration condition defined by the T2-T1 promotion line (larger than the T2-T1 promotion line). Incidentally, the promotion from a physical page belonging to the second tier to a physical page belonging to the first tier may be executed without considering the first tier threshold value when the migration condition defined by the T2-T1 promotion line (larger than the T2-T1 promotion line) is satisfied.

Furthermore, the T3-T2 promotion line field 43GC stores a threshold value of access frequency to the relevant logical page (hereinafter referred to as the T3-T2 promotion line), which is used as a judgment standard together with the aforementioned second tier threshold value when judging whether or not data stored in a logical page in the relevant virtual volume VVOL should be migrated (or promoted) from a physical page belonging to the third tier in the relevant pool to a physical page belonging to the second tier. The promotion from the physical page belonging to the third tier to the physical page belonging to the second tier is executed when the number of I/O accesses to the corresponding logical page of the corresponding virtual volume VVOL satisfies both a migration condition defined by the second tier threshold value (larger than the second tier threshold value) and a migration condition defined by the T3-T2 promotion line (larger than the T3-T2 promotion line). Incidentally, the promotion from a physical page belonging to the third tier to a physical page belonging to the second tier may be executed without considering the second tier threshold value when the migration condition defined by the T3-T2 promotion line (larger than the T3-T2 promotion line) is satisfied.

Furthermore, the demotion line field 43H is constituted from a T1-T2 demotion line field 43HA, a T2-T3 demotion line field 43HB, and a T1-T3 demotion line field 43HC.

Then, the T1-T2 demotion line field 43HA stores a threshold value of access frequency to the relevant logical page (hereinafter referred to as the T1-T2 demotion line), which is used as a judgment standard together with the aforementioned first tier threshold value when judging whether or not data stored in a logical page of the corresponding virtual volume VVOL should be migrated (or demoted) from a physical page belonging to the first tier in the corresponding pool PL to a physical page belonging to the second tier. The demotion from the physical page belonging to the first tier to the physical page belonging to the second tier is executed when the number of I/O accesses to the corresponding logical page of the corresponding virtual volume VVOL satisfies both a migration condition defined by the first tier threshold value (smaller than the first tier threshold value) and a migration condition defined by the T1-T2 demotion line (smaller than the T1-T2 demotion line). Specifically speaking, when the number of I/O accesses is smaller than the first tier threshold value and larger than the T1-T2 demotion line, the demotion from a physical page belonging to the first tier to a physical page belonging to the second tier is executed.

Similarly, the T2-T3 demotion line field 43HB stores a threshold value of access frequency to the relevant logical page (hereinafter referred to as the T2-T3 demotion line), which is used as a judgment standard together with the aforementioned second tier threshold value when judging whether or not data stored in a logical page in the relevant virtual volume VVOL should be migrated (or demoted) from a physical page belonging to the second tier in the relevant pool PL to a physical page belonging to the third tier. The migration from the physical page belonging to the second tier to the physical page belonging to the third tier is executed when the number of I/O accesses to the corresponding logical page of the corresponding virtual volume VVOL satisfies both a migration condition defined by the second tier threshold value (smaller than the second tier threshold value) and a migration condition defined by the T2-T3 demotion line (smaller than the T2-T3 demotion line). Specifically speaking, when the number of I/O accesses is smaller than the second tier threshold value and larger than the T2-T3 demotion line, the demotion from a physical page belonging to the second tier to a physical page belonging to the third tier is executed.

Furthermore, the T1-T3 demotion line field 43HC stores a threshold value of access frequency to the relevant logical page (hereinafter referred to as the T1-T3 promotion line), which is used as a judgment standard together with the aforementioned second tier threshold value when judging whether or not data stored in a logical page in the relevant virtual volume VVOL should be relocated (or demoted) from a physical page belonging to the first tier in the relevant pool PL to a physical page belonging to the third tier. The demotion from the physical page belonging to the first tier to the physical page belonging to the third tier is executed when the number of I/O accesses to the corresponding logical page of the corresponding virtual volume VVOL satisfies both the migration condition defined by the second tier threshold value (smaller than the second tier threshold value) and a migration condition defined by the T1-T3 demotion line (larger than the T1-T3 demotion line). Specifically speaking, when the number of I/O accesses is smaller than the second tier threshold value and larger than the T1-T3 demotion line, the demotion from a physical page belonging to the first tier to a physical page belonging to the third tier is executed.

The page address table 44 is a table indicating the status of allocation of virtual volumes of physical pages to logical pages. This page address table 44 is constituted from a page number field 44A, a RAID group number field 44B, a page status field 44C, a volume number field 44D, a relocation status field 44E, a front queue pointer or virtual address field 44F, and a rear queue pointer field 44G as shown in FIG. 9.

Then, the page number field 44A stores an identification number assigned to each of physical pages constituting the corresponding chunk (hereinafter referred to as the page number). Incidentally, this page number is specific to the relevant physical page in the storage apparatus 4 and different page numbers are assigned to all the physical pages in the storage apparatus 4.

The RAID group number field 44B stores the RAID group number of a RAID group RG providing the corresponding physical page.

The page status field 44C stores information indicating whether or not the relevant physical page is already allocated to a logical page of any of the virtual volumes VVOL (the page status field 44B stores "Allocated" if the physical page is allocated; and the page status field 44B stores "Unallocated" if the physical page is not allocated).

The volume number field 44D stores the volume number of a virtual volume VVOL to which a physical page with the corresponding page number is allocated. Therefore, an unallocated physical page does not store the volume number of a virtual volume VVOL.

The relocation status field 44E stores the execution status of the page relocation processing for migrating data stored in the relevant physical page to another physical page. Incidentally, the "execution status of the page relocation processing" includes: "Being Migrated" indicating that the page relocation processing is being executed; and "Standby" indicating that it has been decided to execute the page relocation processing, but the page relocation processing has not been executed, yet.

Furthermore, if the corresponding physical page is allocated to any of the virtual volumes VVOL, the front queue pointer or virtual address field 44V stores a virtual address where that physical page is allocated in the virtual volume VVOL; and if the corresponding physical page is not allocated to any of the virtual volumes VVOL, the front queue pointer or virtual address field 44V stores the page number of a physical page which is stored immediately before the relevant physical page in a queue for managing unallocated physical pages.

Furthermore, the rear queue pointer field 44G stores the page number of a physical page which is stored immediately after the relevant physical page in the queue for managing the unallocated physical pages.

On the other hand, the counter value management table 45 is a table used to manage the number of I/O accesses to individual logical pages in each virtual volume VVOL defined in the storage apparatus 4; and is constituted from a page address field 45A and a counter value field 45B as shown in FIG. 10.

Then, the page address field 45A stores identification information of each logical page (page address), which is assigned to the relevant logical page; and the counter value field 45B stores a pseudo counter value of the number of I/O accesses to the corresponding logical page. This counter value is limited to values within the range from "0" to "255"; and as the counter value becomes larger, the count-up probability decreases according to the number of I/O accesses. The details of this counter value will be explained later.

Furthermore, the page relocation execution management table 46 is a table used to manage the execution status of the page relocation processing; and is constituted from a volume number field 46A, a migration source page field 46B, a migration destination page field 46C, an execution status field 46D, and a migration destination tier field 46E as shown in FIG. 11.

Then, the volume number field 46A stores the page number of a logical page which is a target of the page relocation processing. Furthermore, the migration source page field 46B stores the page number of a physical page where data of the relevant logical page is currently stored (hereinafter referred to as the migration source page); and the migration destination page field 46C stores the page number of a physical page which is a migration destination of the data (hereinafter referred to as the migration destination page).

Furthermore, the execution status field 46D stores the same information as information stored in the corresponding relocation status field 44E in the page address table 44 (FIG. 9). Furthermore, the migration destination tier field 46E stores the tier number of a tier to which the relevant migration destination page belongs.

The counter value transition table 47 is a table for managing the count-up probability when increasing the counter value stored in the counter value field 45B of the counter value management table 45 (FIG. 10) by one; and is constituted from a counter value field 47A and a count-up probability field 47B as shown in FIG. 12.

Then, the counter value field 47A stores each counter value ("0" to "255") within a possible range of the counter value stored in the counter value field 45B of the counter value management table 45; and the count-up probability field 47B stores probability when increasing the corresponding counter value by "1" (hereinafter referred to as the count-up probability).

Figure 13:
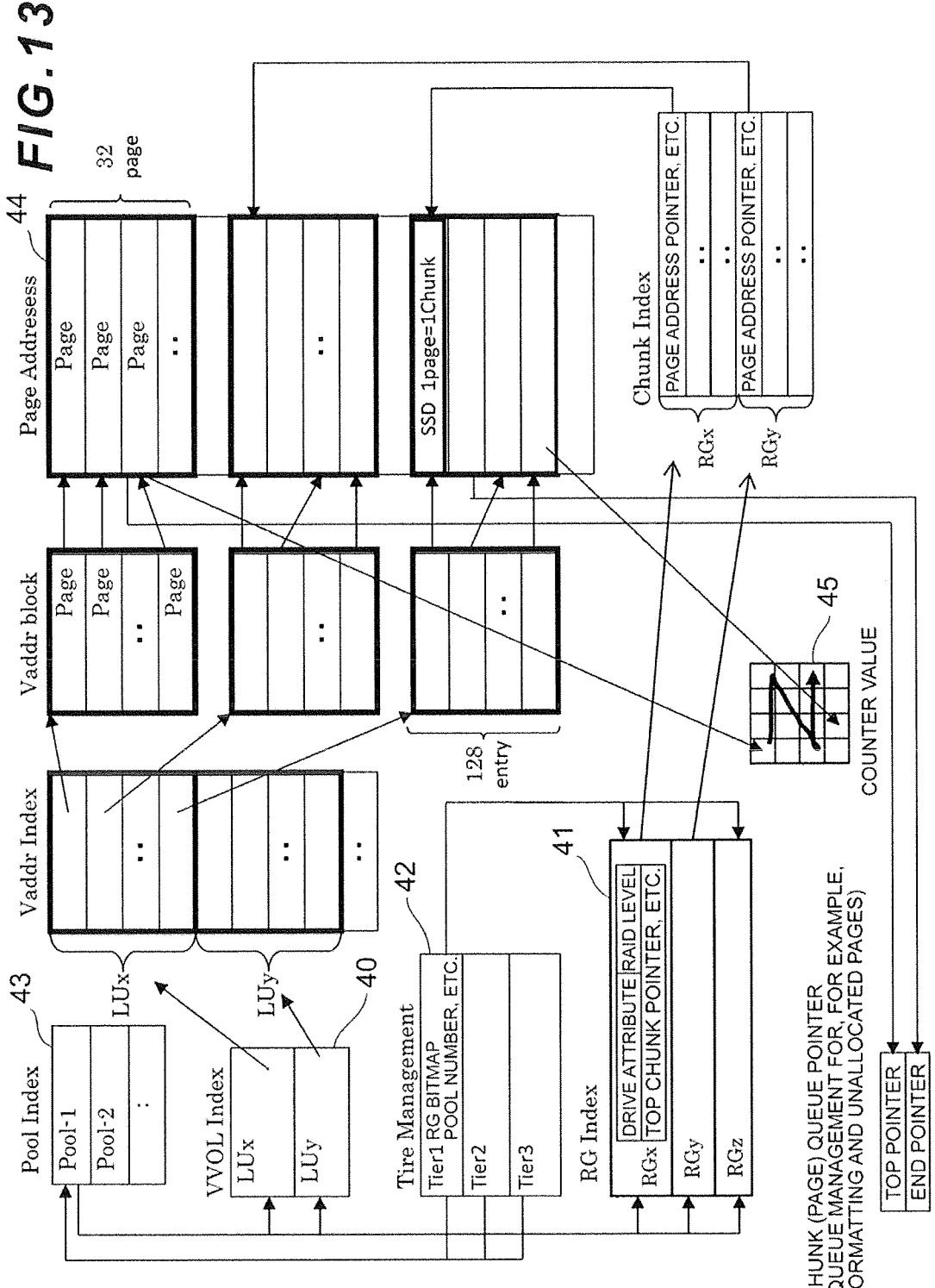
FIG. 13 is a conceptual diagram showing the relationship between the tables.

Incidentally, FIG. 13 shows the relationship between various tables including the virtual volume index table 40, the RAID group index table 41, the tier management table 42, the pool index table 43, the page address table 44, and the counter value management table 45 described above.

The term "Vaddr Index" used in the drawing represents a virtual address index table (its details are not shown in the drawing) that stores virtual addresses of the respective logical blocks in the corresponding virtual volume VVOL in an ascending order. The term "Vaddr Block" represents a logical block management table (its details are not shown in the drawing) that stores page addresses of the respective logical pages constituting the corresponding logical block. Furthermore, the term "Chunk Index" represents a chunk mapping table (its details are not shown in the drawing).

(3) Various Processing about Real-Time Monitoring Function According to this Embodiment Next, the specific processing content of various processing executed by the CPU 25A, 25B (FIG. 1) in the system-0 controller 21A or the system-1 controller 21B (FIG. 1) of the storage apparatus 4 in relation to the real-time monitoring function according to this embodiment will be explained. Incidentally, it is a matter of course that the following various processing is executed in accordance with a control program (not shown in the drawing) stored in the local memory 26A, 26B (FIG. 1).

(3-1) Host I/O Processing ST1

(3-1-1) Read Processing (3-1-1-1) Read Processing

Figure 14:
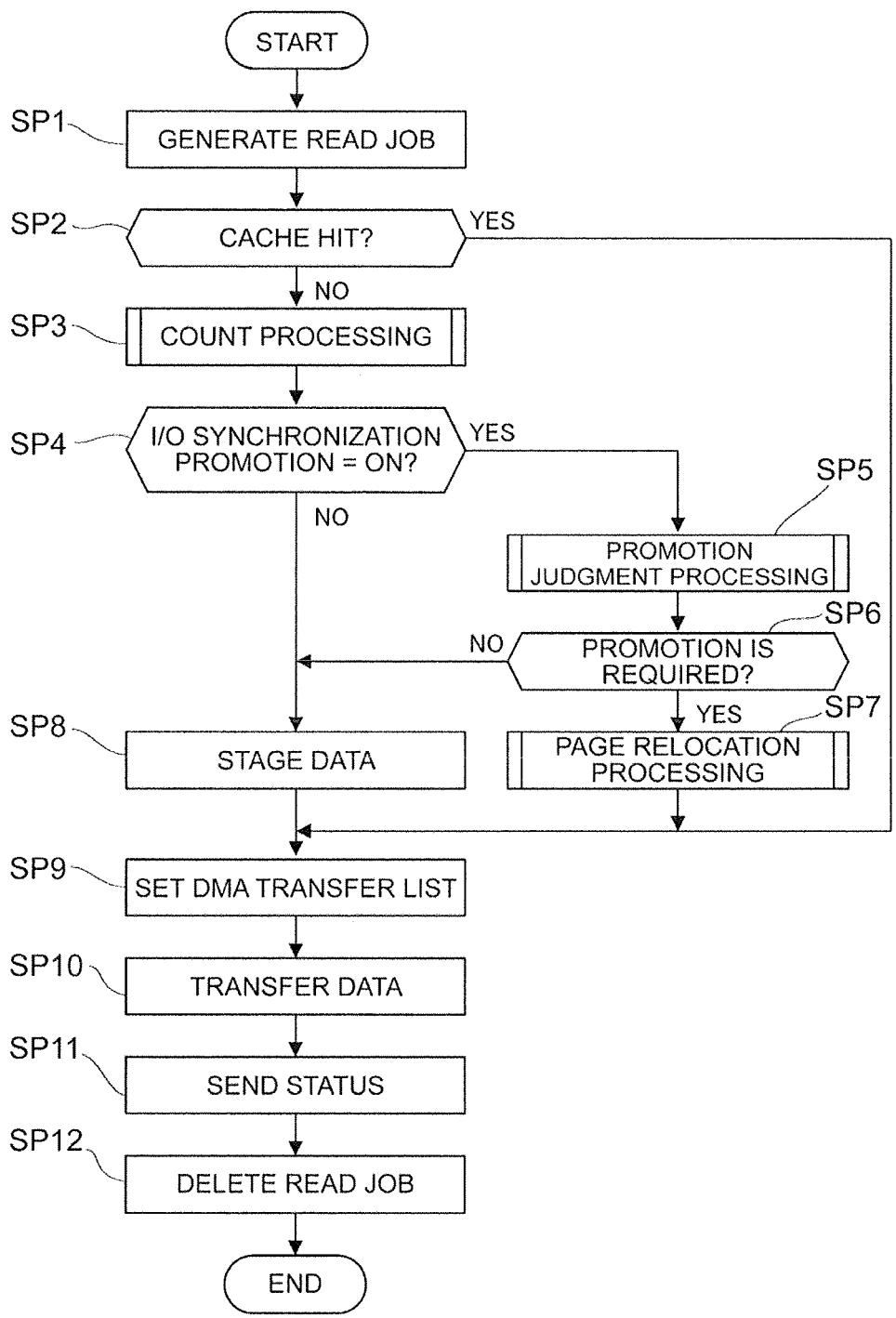
FIG. 14 is a flowchart illustrating a processing sequence for read processing.

FIG. 14 shows a processing sequence for read processing executed in the host I/O processing ST1 shown in FIG. 3 by the CPU 25A, 25B of the storage apparatus 4 which has received a read command from the host system 2.

After receiving the read command, the CPU 25A, 25B reads data from a logical page, which is designated as a read location by the relevant read command, in a virtual volume VVOL, which is designated as the read location by the read command, and transfers it to the host system 2, which is a sender of the relevant read command, in accordance with the processing sequence shown in FIG. 14 in the host I/O processing ST1 in FIG. 3.

Furthermore, if the I/O synchronization promotion mode is set on at that time, the CPU 25A, 25B judges whether or not the relevant data should be migrated to a physical page belonging to an upper-level tier than the physical page currently storing the data in the corresponding pool PL and executes the page relocation processing for migrating the relevant data to a physical page belonging to a tier of a higher level than that of a tier to which a physical page currently storing the relevant data in the corresponding pool PL as the need arises.

In fact, after receiving the read command, the CPU 25A, 25B starts read processing and generates a job to execute the read processing according to the received read command (hereinafter referred to as the read job) (SP1).

Subsequently, the CPU 25A, 25B executes the generated read job and judges whether or not the read target data exists in the cache memory 27A, 27B (FIG. 1) (SP2). Then, if the CPU 25A, 25B obtains an affirmative judgment result in this step, it proceeds to step SP9. Specifically speaking, in a case of a cache hit, for example, the count processing, the promotion judgment processing, and the page relocation processing are not executed in synchronization with the I/O processing.

On the other hand, if the CPU 25A, 25B obtains a negative judgment result in step SP2, it executes count processing for updating the counter value stored in the counter value field 45B (FIG. 10) in the counter value management table 45, which was explained earlier with reference to FIG. 10, corresponding to the logical page where the relevant data is stored (SP3). Incidentally, the counter value processing recalculates the tier threshold value and the promotion and demotion lines as described later when the counter value is updated. Then, the CPU 25A, 25B refers to the corresponding I/O synchronization promotion field 40F in the virtual volume index table 40 explained earlier with reference to FIG. 5 and judges whether or not the I/O synchronization promotion mode is set on to the virtual volume VVOL designated as the read location by the read command (SP4).

If the CPU 25A, 25B obtains a negative judgment result in this step, it has the cache memory 27A, 27B (FIG. 1) read the read target data from the storage drives 20 (FIG. 1) by controlling, for example, the data transfer control unit 23A, 23B (FIG. 1) and the drive interface unit 28A, 28B (FIG. 1) (SP8) and then proceeds to step SP9.

On the other hand, if the CPU 25A, 25B obtains an affirmative judgment result in step SP4, it refers to the counter value management table 45 (FIG. 10) and executes the promotion judgment processing for judging whether or not it is necessary to promote the data designated as the read target by the read command (SP5).

Figure 16:
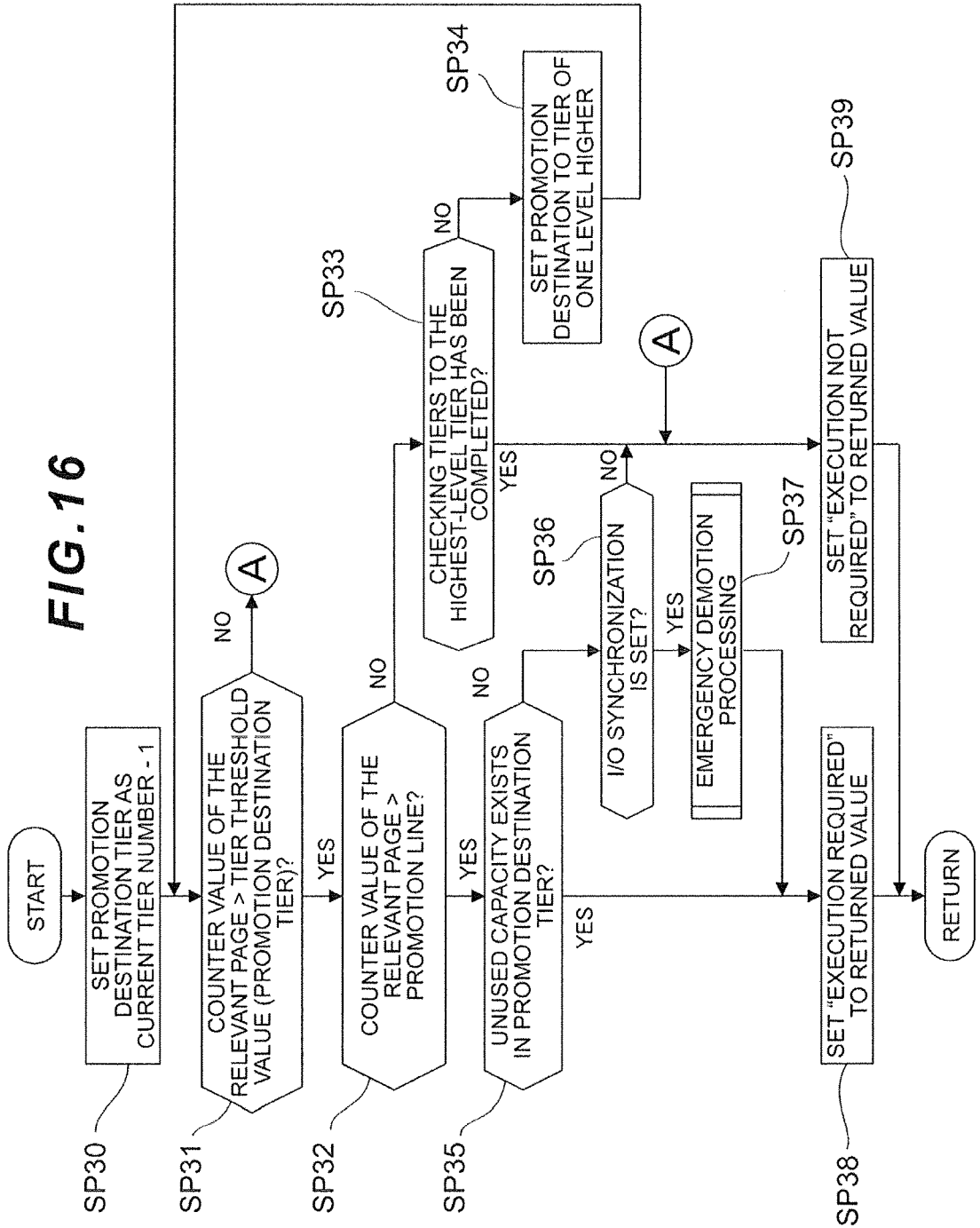
FIG. 16 is a flowchart illustrating a processing sequence for promotion judgment processing.

Subsequently, the CPU 25A, 25B judges whether or not the promotion of the read target data is necessary, based on the processing result of the promotion judgment processing executed in step SP5 (SP6). This judgment is performed by judging whether a returned value of the promotion judgment processing, which will be explained later with reference to FIG. 16, is "Execution Required" or not, where possible returned values are "Execution Required" and "Execution Not Required." The details of this returned value will be explained later. Then, if the CPU 25A, 25B obtains a negative judgment result in this step, it has the cache memory 27A, 27B read the read target data (SP8) and then proceeds to step SP9.

On the other hand, if the CPU 25A, 25B obtains an affirmative judgment result in step SP7, it executes page relocation processing for migrating the read target data from the corresponding physical page in the corresponding pool PL to a physical page belonging to a higher-level tier (SP7). Then, the CPU 25A, 25B proceeds to step SP9.

Then, when the CPU 25A, 25B proceeds to step SP9, it sets a DMA (Direct Memory Access) transfer list for transferring the read target data, which is stored in the cache memory 27A, 27B, to the host system 2 which is a sender of the read command (SP9), and sends the created DMA transfer list to the data transfer control unit 23A, 23B (FIG. 1) (SP10). As a result, the read target data is read from the cache memory 27A, 27B by the data transfer control unit 23A, 23B in accordance with this DMA transfer list and transferred to the host system 2 which is the sender of the read command.

Then, after the above-described transfer of the read target data is completed, the CPU 25A, 25B sends the status to that effect to the host system 2 (SP11) and then deletes the read job created in step SP1 (SP12). Subsequently, the CPU 25A, 25B terminates this read processing.

(3-1-1-2) Count Processing

Figure 15:
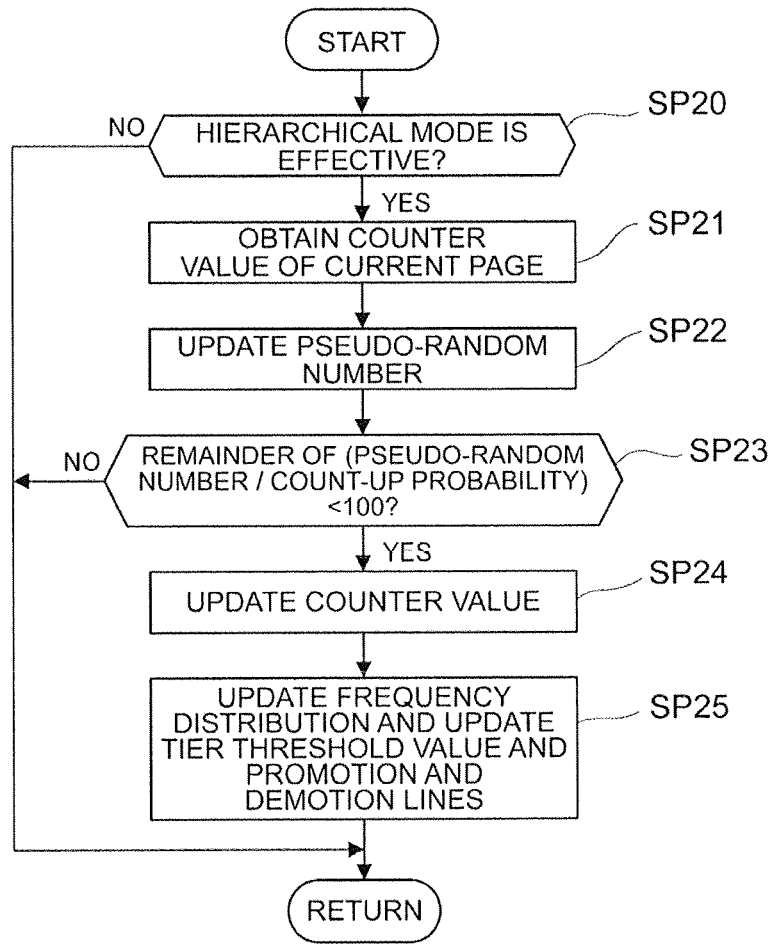
FIG. 15 is a flowchart illustrating a processing sequence for count processing.

FIG. 15 shows a specific processing sequence for the count processing executed by the CPU 25A, 25B in step SP3 of the read processing.

When the CPU 25A, 25B proceeds to step SP3 of the read processing, it starts the count processing shown in this FIG. 15; and firstly refers to the virtual volume index table 40 (FIG. 5) and judges whether or not the hierarchical mode of a pool PL associated with the virtual volume VVOL designated as the read location in the read command is set on (SP20). Then, if the CPU 25A, 25B obtains a negative judgment result in this step, it terminates this count processing and returns to the read processing.

On the other hand, if the CPU 25A, 25B obtains an affirmative judgment result in step SP20, it obtains a counter value of a local page where the read target data is stored from the counter value management table 45 (FIG. 10) (SP21).

Subsequently, the CPU 25A, 25B updates a pseudo-random number necessary to change that counter value (SP22).

Specifically speaking, the CPU 25A, 25B manages such a pseudo-random number as a global parameter on the basis of a pool PL. Then, the CPU 25A, 25B updates the pseudo-random number by simply adding "100" to the pre-update pseudo-random number. As a result, the pseudo-random number which is updated sequentially becomes a random number with respect to one logical page.

Next, the CPU 25A, 25B refers to the counter value transition table 47 (FIG. 12), obtains the count-up probability which is set in advance for the counter value obtained in step SP21, and judges whether a value of a remainder when the pseudo-random number updated in step SP22 is divided by that count-up probability is smaller than "100" or not (SP23). Then, if the CPU 25A, 25B obtains a negative judgment result in this step, it terminates this count processing and returns to the read processing.

On the other hand, if the CPU 25A, 25B obtains an affirmative judgment result in step SP23, it updates the counter value management table 45 (FIG. 10) to add the counter value obtained in step SP21 by one (SP24). Then, the CPU 25A, 25B changes a frequency distribution diagram described later with respect to FIG. 31, further updates the tier threshold values (first and second tier threshold values) and the promotion and demotion lines which will be described later (SP25), and then terminates this count processing and returns to the read processing.

(3-1-1-3) Promotion Judgment Processing

FIG. 16 shows a specific processing sequence for the promotion judgment processing executed by the CPU 25A, 25B in step SP5 of the read processing (FIG. 14). The CPU 25A, 25B judges whether the read target data should be promoted or not, in accordance with the processing sequence shown in FIG. 16. Therefore, during the processing executed in synchronization with the I/O processing, only the read target data is a target to be judged and other data are not considered to be targets to be judged.

Specifically speaking, when the CPU 25A, 25B proceeds to step SP5 of the read processing, it starts this promotion judgment processing; and firstly sets a tier of one level higher than that of the current tier as a promotion destination tier (SP30) and then judges whether or not the counter value obtained in step SP21 of the aforementioned count processing (FIG. 15) is larger than a tier threshold value (first or second tier threshold value) for relocating the data from the current tier to the tier which was set as the promotion destination in step SP30 (SP31). Then, if the CPU 25A, 25B obtains a negative judgment result in this step, it proceeds to step SP39. Incidentally, the comparison between the count value in SP31 and the tier threshold value can be omitted.

On the other hand, if the CPU 25A, 25B obtains an affirmative judgment result in step SP31, it judges whether or not the counter value obtained in step SP21 of the count processing (FIG. 15) is larger than a corresponding promotion line which is a threshold value for promoting the data from the current tier to the tier which was set as the promotion destination in step SP30 (SP32).

If the CPU 25A, 25B obtains a negative judgment result in this step, it judges whether or not the judgment to check if the read target data can be promoted has been performed on the tiers up to the highest-level tier (SP33). Then, if the CPU 25A, 25B obtains a negative judgment result in this step, it sets a tier of one level higher than that of the current tier as the promotion destination and then returns to step SP31. Subsequently, the CPU 25A, 25B executes the processing of step SP31 and subsequent steps in the same manner as described above.

Incidentally, in the subsequent processing, the tier threshold value for promoting data from the current tier to the tier which was set as the promotion destination in step SP34 last time is used as a target to be compared with the above-described counter value in step SP31; and the promotion line for promoting data from the current tier to the tier which was set as the promotion destination in step SP34 last time is used as a target to be compared with the above-described counter value in step SP32. Furthermore, in this embodiment, the judgment processing of SP31 and SP32 is executed from a storage tier of one level higher than that of the current storage tier of the read target data to a storage area of the highest-level tier; on the contrary, the judgment processing of SP31 and SP32 may be executed from the storage area of the highest-level tier to the storage tier of one level higher than the current storage tier.

On the other hand, if the CPU 25A, 25B obtains an affirmative judgment result in step SP33 (this means that the judgment has been performed on all the tiers up to the highest-level tier, but the access frequency to the local page where the data is stored is not the access frequency for which the promotion should be performed), it sets "Execution Not Required," which means it is unnecessary to execute the promotion, to the returned value (SP39) and then terminates this promotion judgment processing and returns to the read processing (FIG. 14). Thus, in this case, a negative judgment result will be obtained in step SP6 of the read processing (FIG. 14) to be executed after this.

On the other hand, if the CPU 25A, 25B obtains an affirmative judgment result in step SP32, it refers to the tier management table 42 (FIG. 7) and judges whether or not the tier which was set as the promotion destination in step SP30 or step SP34 executed last has enough unused capacity to promote the read target data (for example, 1% or more of the total capacity of that tier) (SP35).

If the CPU 25A, 25B obtains an affirmative judgment result in this step, it sets "Execution Required," which means that the promotion should be executed, to the returned value (SP38) and then terminates this promotion judgment processing and returns to the read processing. Thus, in this case, an affirmative judgment result will be obtained in step SP6 of the read processing (FIG. 14) to be executed after this.

On the other hand, if the CPU 25A, 25B obtains a negative judgment result in step SP35, it refers to the virtual volume index table 40 (FIG. 5) and judges whether or not the I/O synchronization promotion mode is set to the virtual volume VVOL designated as the read location of data in the read command (SP36).

Then, if the CPU 25A, 25B obtains a negative judgment result in this step, it proceeds to step SP39.

On the other hand, if the CPU 25A, 25B obtains an affirmative judgment result in step SP36, it executes the emergency demotion processing for demoting data, which can be migrated to a lower-level tier, from among data stored in the tier which was set as the promotion destination in step SP30 or step SP34 executed last (SP37). Then, the CPU 25A, 25B proceeds to step SP38 and executes the processing of the relevant step SP38. Subsequently, the CPU 25A, 25B terminates this promotion judgment processing and returns to the read processing.

Now, the details of the emergency demotion processing executed in step SP37 of the aforementioned promotion judgment processing (FIG. 16) will be explained.

The emergency demotion processing is processing executed to increase the unused capacity of the tier which is the relevant promotion destination when the then target data (the read target data in the above-mentioned example) needs to be promoted, but the promotion destination tier does not have enough unused capacity to promote the relevant data.

Figure 17:
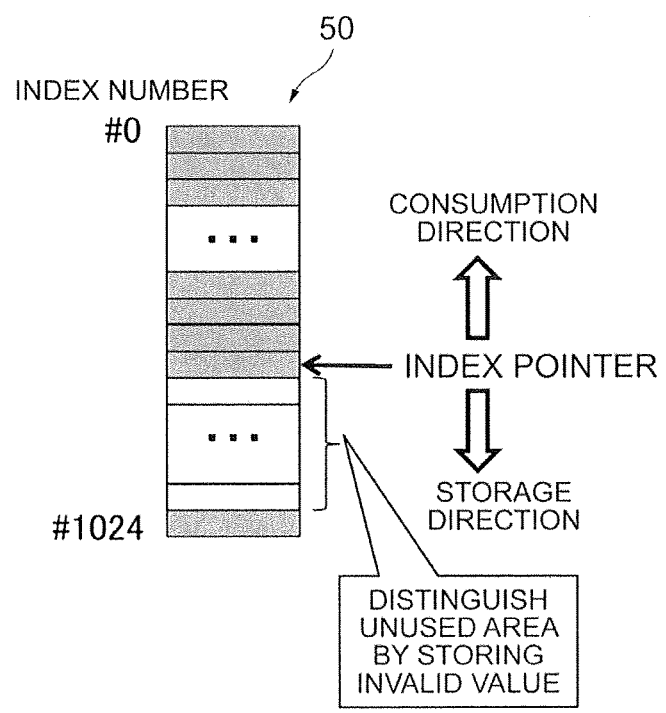
FIG. 17 is a conceptual diagram for explaining LIFO.

As a means for doing so, the storage apparatus 4 retains, for example, LIFO (Last In Fast Out) 50 as shown in FIG. 17 for each tier (each of the first to third tiers). Incidentally, the reason why the LIFO, but not FIFO (Fast In Fast Out), is used is that the tier threshold value is updated sequentially as described later, so that data which has been judged lately has less fluctuation and there is a high possibility that such data can be demoted.

Logical pages storing data which can be a demotion target from the viewpoint of the tier threshold value, but cannot be a demotion target from the viewpoint of the demotion line described later, from among logical pages in the corresponding virtual volume VVOL are registered in the LIFO 50 in step SP153 of the demotion judgment processing described later with reference to FIG. 44.

Then, if it is determined in step SP35 of the promotion judgment processing (FIG. 16) that the promotion destination tier does not have enough unused capacity, the CPU 25A, 25B judges whether a logical page corresponding to the relevant entry can be the demotion target or not, with respect to each entry of the LIFO 50 associated with the promotion destination tier in the order starting from the recently registered entry as many as a specified number of entries. Then, if there is a logical page which can be the demotion target, data stored in that logical page is demoted to a lower-level tier. Incidentally, the maximum number of entry checks in this case should be designed so that it can be changed by tuning.

The above-described LIFO 50 for each tier is retained in the local memory 26A, 26B (FIG. 1) for the system-0 controller 21A and the system-1 controller 21B (FIG. 1) in the storage apparatus 4. Since these LIFO's 50 are occupied and used by each core, no lock is necessary. Each entry of the LIFO 50 stores the volume number of a virtual volume VVOL, to which the corresponding logical page is allocated, and a page offset number of a physical page allocated to the relevant logical page (8 [Bytes] in total). Also, each LIFO 50 retains an index pointer as a cyclic stack configuration.

Figure 18:
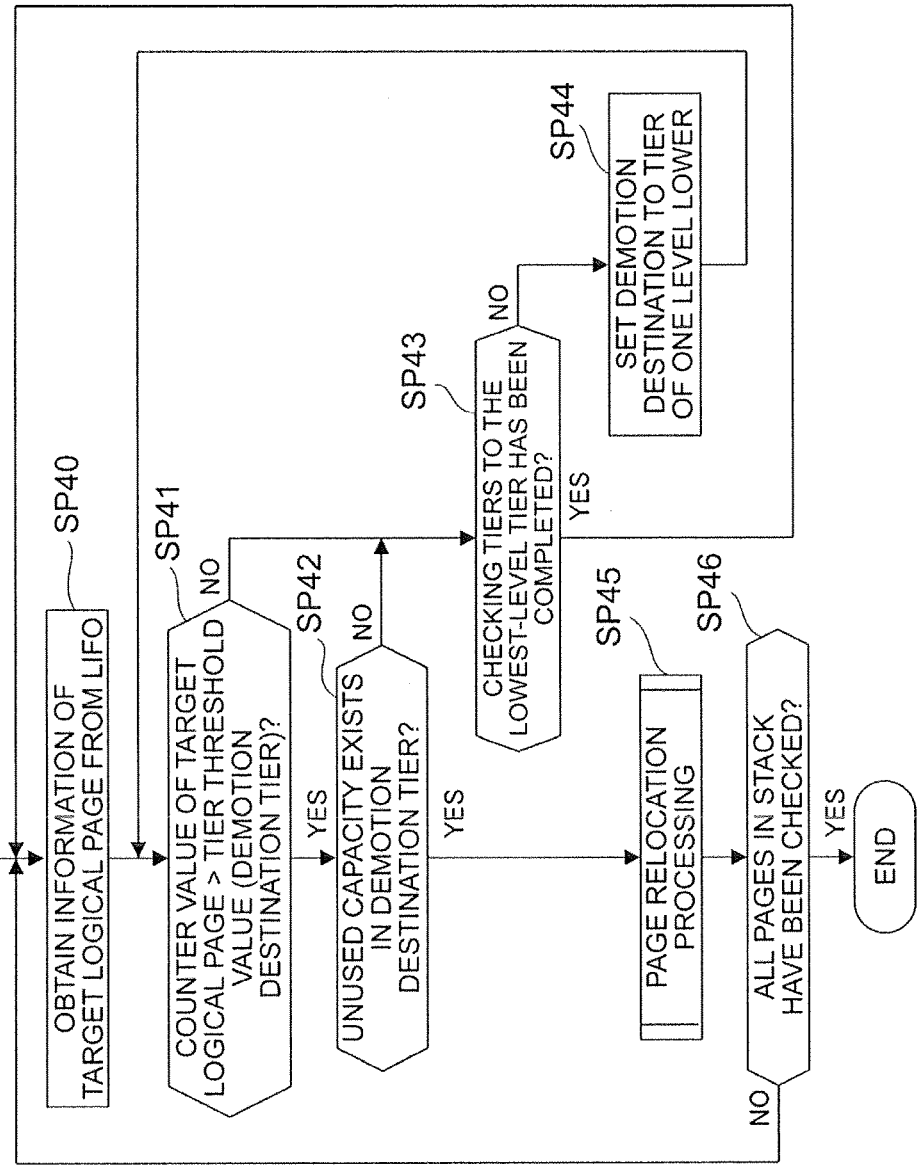
FIG. 18 is a flowchart illustrating a processing sequence for emergency demotion processing.

FIG. 18 shows specific processing content of the emergency demotion processing. When the CPU 25A, 25B proceeds to step SP37 of the promotion judgment processing (FIG. 16), it starts the emergency demotion processing shown in FIG. 18 and firstly selects a target (a logical page which was registered last time at this stage) from among logical pages registered in the relevant the LIFO 50 from the corresponding LIFO 50 and obtains registered information (such as the volume number and the page offset number) about that logical page (SP40).

Subsequently, the CPU 25A, 25B obtains the counter value of the logical page selected in step SP40 (hereinafter referred to as the target logical page) from the counter value management table 45 (FIG. 10) and judges whether or not the obtained counter value is smaller than the tier threshold value (the first or second tier threshold value) for the demotion from the tier, to which the physical page allocated to the target logical page belongs, to the tier which is set as the demotion destination (the tier of one level lower than that of the tier to which the physical page allocated to the target logical page belongs at this stage) (SP41).

If the CPU 25A, 25B obtains a negative judgment result in this step, it judges whether or not the judgment on all the tiers down to the lowest-level tier as the demotion destination tier has been completed or not (SP43). Then, if the CPU 25A, 25B obtains a negative judgment result in this step, it resets the demotion destination to a tier of one level lower than that of the tier which has been set as the demotion destination (SP44), and then executes the processing of step SP41 and subsequent steps in the same manner as described above.

Furthermore, if the CPU 25A, 25B obtains an affirmative judgment result in step SP41, it refers to the tier management table 42 (FIG. 7) and judges whether the demotion destination has an unused capacity or not (SP42). Then, if the CPU 25A, 25B obtains a negative judgment result in this step, it proceeds to step SP43 and then executes the processing of step SP43 and subsequent steps in the same manner as described above.

On the other hand, if the CPU 25A, 25B obtains an affirmative judgment result in step SP42 (this means that the counter value of the target logical page is smaller than the tier threshold value of the demotion destination tier and the demotion destination tier has an unused capacity), it executes the page relocation processing for migrating data stored in the target logical page to the tier which is set as the demotion destination of the relevant data (SP45).

Subsequently, the CPU 25A, 25B judges whether the execution of the processing from step SP40 to step SP45 on all the logical pages registered in the corresponding LIFO 50 has been completed or not (SP46). Then, if the CPU 25A, 25B obtains a negative judgment result in this step, it returns to step SP40 and then executes the processing of step SP40 and subsequent steps in the same manner as described above, while sequentially switching the target logical page to be selected in step SP40 to a logical page registered in the LIFO 50 immediately before the logical page which was set as the target logical page in the previous processing of step SP40 to step SP45.

Then, if the CPU 25A, 25B obtains an affirmative judgment result in step SP46 by eventually finishing executing the processing of step SP40 to step SP45 on all the logical pages registered in the LIFO 50, it terminates this emergency demotion processing.

(3-1-1-4) Page Relocation Processing

Figure 19:
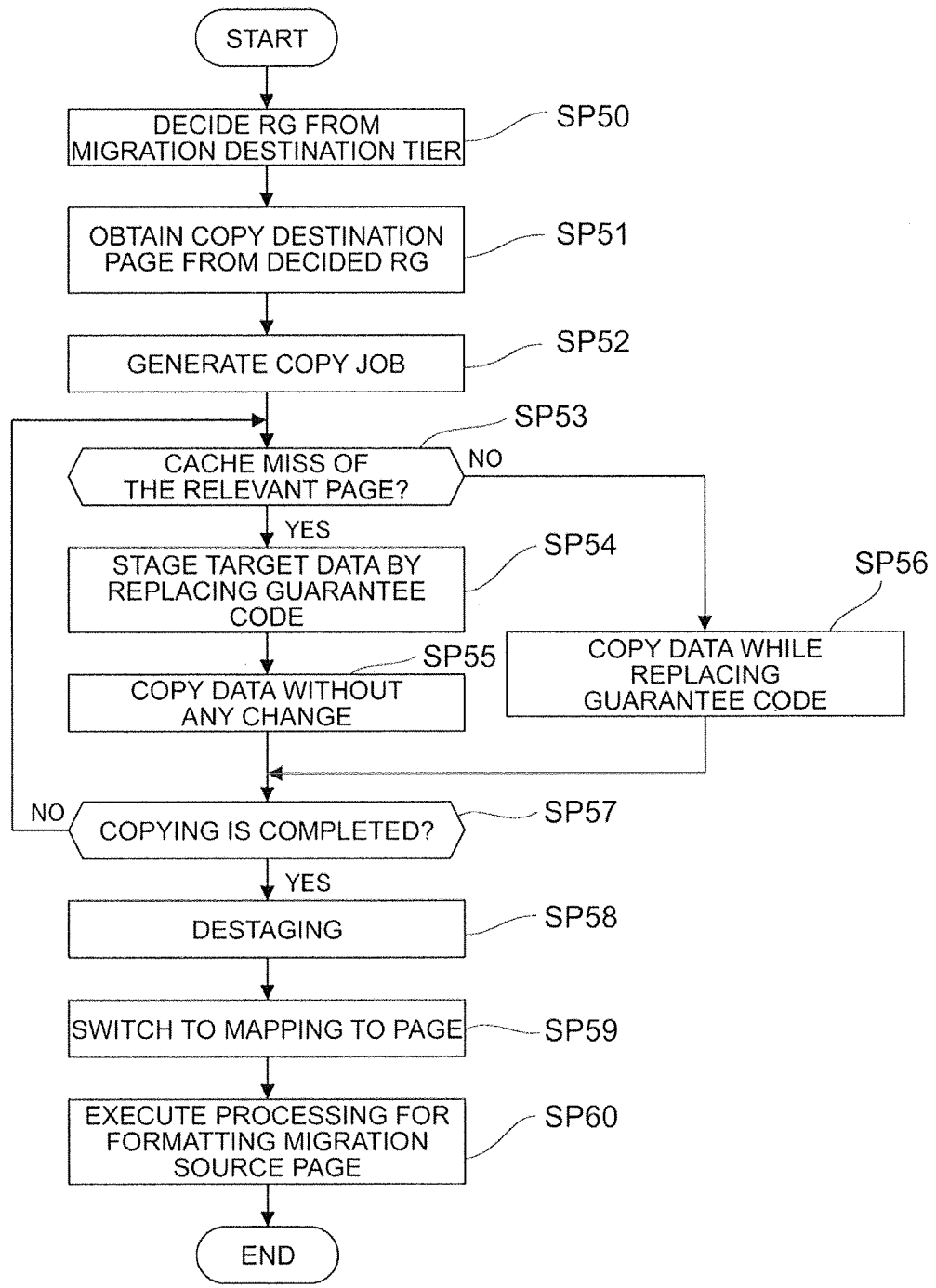
FIG. 19 is a flowchart illustrating a processing sequence for page relocation processing.

FIG. 19 shows a specific processing sequence of the page relocation processing executed by the CPU 25A, 25B in step SP7 of the read processing (FIG. 14). The CPU 25A, 25B migrates (or promotes) the read target data, which was determined as the promotion target in step SP5 of the read processing, to an upper-level tier in accordance with the processing sequence shown in FIG. 19.

In fact, when the CPU 25A, 25B proceeds to step SP7 of the read processing, it starts this page relocation processing and firstly refers to the tier management table 42 (FIG. 7) and decides one RAID group RG which should be a migration destination of target data (hereinafter referred to as the migration destination RAID group), from among RAID groups RG providing storage areas to the migration destination tier of the then target data (which is the read target data decided during the promotion judgment processing (FIG. 16) in step SP5 of the read processing in this example and will be hereinafter referred to as the target data) by means of, for example, round robin scheduling (SP50).

Subsequently, the CPU 25A, 25B refers to the page address table 44 (FIG. 9) and decides and reserves a physical page, which should become the migration destination of the target data, from physical pages provided by the RAID group RG decided in step SP50 (SP51).

Next, the CPU 25A, 25B generates a job (copy job) for migrating the target data to the physical page decided in step SP51 and registers necessary information about the migration of the target data in the page relocation execution management table 46 (FIG. 11) (SP52).

Subsequently, the CPU 25A, 25B judges whether the target data is not retained in the cache memory 27A, 27B (FIG. 1) (whether a cache miss or not) (SP53).

In this case, an affirmative judgment result will be always obtained in this step SP53 of the page relocation processing executed in step SP7 of the read processing as it is apparent from FIG. 14 (see step SP2 of the read processing). Thus, when this happens, the CPU 25A, 25B issues an instruction to the data transfer control unit 23A, 23B (FIG. 1) and the drive interface unit 28A, 28B (FIG. 1) to read (or stage) the target data to the cache memory 27A, 27B (SP54).

Figure 20:
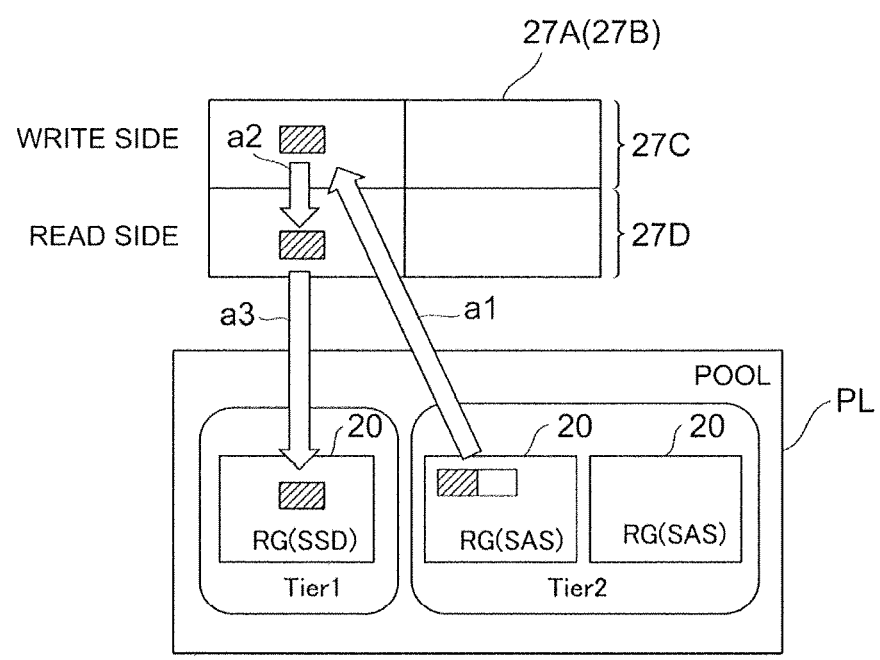
FIG. 20 is a conceptual diagram for explaining the page relocation processing.

Then, having received such an instruction, the drive interface unit 28A, 28B reads the target data from the corresponding storage drive 20 (FIG. 1) and transfers the read target data to the data transfer control unit 23A, 23B. Having received this target data, the data transfer control unit 23A, 23B replaces a guarantee code, which is added to the relevant target data, with a guarantee code corresponding to a storage area of a relocation destination and then writes that target data to a write storage area (hereinafter referred to as the write-side storage area) 27C associated with the relocation destination tier in the cache memory 27A, 27B as shown in FIG. 20 (arrow a1 in FIG. 20). Incidentally, an example of the guarantee code is a logical address of a storage area of the relocation destination.

Subsequently, the CPU 25A, 25B gives an instruction to the data transfer control unit 23A, 23B to copy the target data, which has been read to the cache memory 27A, 27B in step SP54, from the corresponding write-side storage area 27C in the cache memory 27A, 27B to a read storage area (hereinafter referred to as the read-side storage area) 27D associated with the relocation destination tier in the relevant cache memory 27A, 27B (SP55). Thus, having received such an instruction, the data transfer control unit 23A, 23B copies the target data, which was staged to the relevant write-side storage area 27C in the cache memory 27A, 27B, to the read-side storage area 27D associated with the migration destination tier in the cache memory 27A, 27B (arrow a2 in FIG. 20). Then, the CPU 25A, 25B proceeds to step SP57.

On the other hand, a negative judgment result will be always obtained in this step SP53 of the page relocation processing executed in step SP81 of the write processing described later (see step SP75 of the write processing). Specifically speaking, during the relocation processing executed in synchronization with the write processing, the write data stored in the cache memory is used and is stored in a storage area of the migration destination tier. If the CPU 25A, 25B obtains a negative judgment result in step SP53, it gives an instruction to the data transfer control unit 23A, 23B to copy the target data retained in the cache memory 27A, 27B from the write-side storage area 27C associated with the tier in the cache memory 27A, 27B, where the relevant target data is stored, to the read-side storage area 27D associated with the migration destination tier in the cache memory 27A, 27B (SP56).

Figure 21:
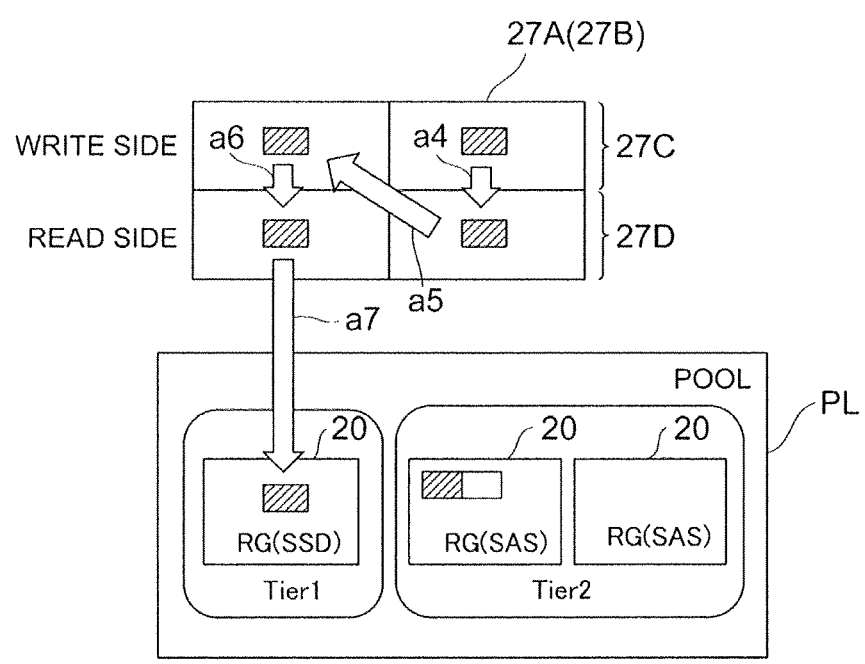
FIG. 21 is a conceptual diagram for explaining the page relocation processing.

Thus, having received such an instruction, the data transfer control unit 23A, 23B copies the target data from the write-side storage area 27C associated with the tier in the cache memory 27A, 27B, where the target data is stored, to the read-side storage area 27D associated with the migration source tier in the cache memory 27A, 27B as shown in FIG. 21 (arrow 4 in FIG. 21). Furthermore, the data transfer control unit 23A, 23B replaces a guarantee code, which is attached to the relevant target data, with a guarantee code according to the storage area of the migration destination and copies the target data, which has been copied to the read-side storage area 27D, to the write-side storage area 27C associated with the migration destination tier in the cache memory 27A, 27B (arrow a5 in FIG. 21). Furthermore, the data transfer control unit 23A, 23B copies the relevant target data from the write-side storage area 27C associated with the migration destination tier to the read-side storage area 27D associated with the migration destination tier in the cache memory 27A, 27B (arrow a6 in FIG. 21).

Subsequently, the CPU 25A, 25B judges whether copying of all pieces of the target data to the read-side storage area 27D associated with the migration destination tier in the cache memory 27A, 27B has been completed or not (SP57). Then, if the CPU 25A, 25B obtains a negative judgment result in this step, it returns to step SP53 and then repeats the processing from step SP53 to step SP57.

Then, if the CPU 25A, 25B obtains an affirmative judgment result in step SP57 by eventually finishing copying all the pieces of the target data to the read-side storage area 27D associated with the migration destination tier in the cache memory 27A, 27B, it issues an instruction to the data transfer control unit 23A, 23B and the drive interface unit 28A, 28B (FIG. 1) to write (or destage) the target data, which is stored in the relevant read-side storage area 27D, to the corresponding storage drive 20 (FIG. 1) (SP58).

Thus, having received such an instruction, the data transfer control unit 23A, 23B reads the target data from the read-side storage area 27D associated with the migration destination tier in the cache memory 27A, 27B and transfers it to the drive interface unit 28A, 28B as shown in FIG. 20 and FIG. 21. Furthermore, the drive interface unit 28A, 28B writes the target data, which it receives from the data transfer control unit 23A, 23B, to the corresponding storage drive 20 and writes the relevant target data to the physical page which is the migration destination decided in step SP51 (arrow a3 in FIG. 20 and arrow a7 in FIG. 21).

Figure 22:
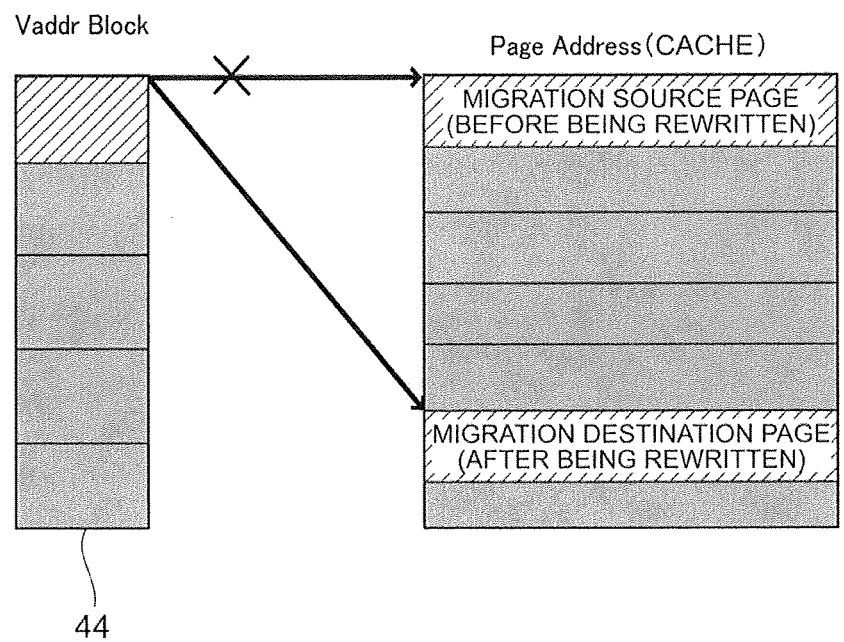
FIG. 22 is a conceptual diagram for explaining the page relocation processing.

Subsequently, the CPU 25A, 25B updates the page address table 44 (FIG. 9) to switch a mapping destination of the logical page in the virtual volume VVOL where the aforementioned target data has been stored, as seen from the host system 2, to the physical page which is the migration destination (SP59). Specifically speaking, the CPU 25A, 25B changes the corresponding destination (mapping destination) of the relevant logical page in the relevant virtual volume VVOL in the page address table 44 from the physical page, which is the migration source of the target data, to the physical page which is the migration destination as shown in FIG. 22.

Next, the CPU 25A, 25B executes format processing for formatting the physical page which is the migration source of the target data (SP60); and then terminates this page relocation processing.

(3-1-2) Write Processing (3-1-2-1) Write Processing

Figure 23:
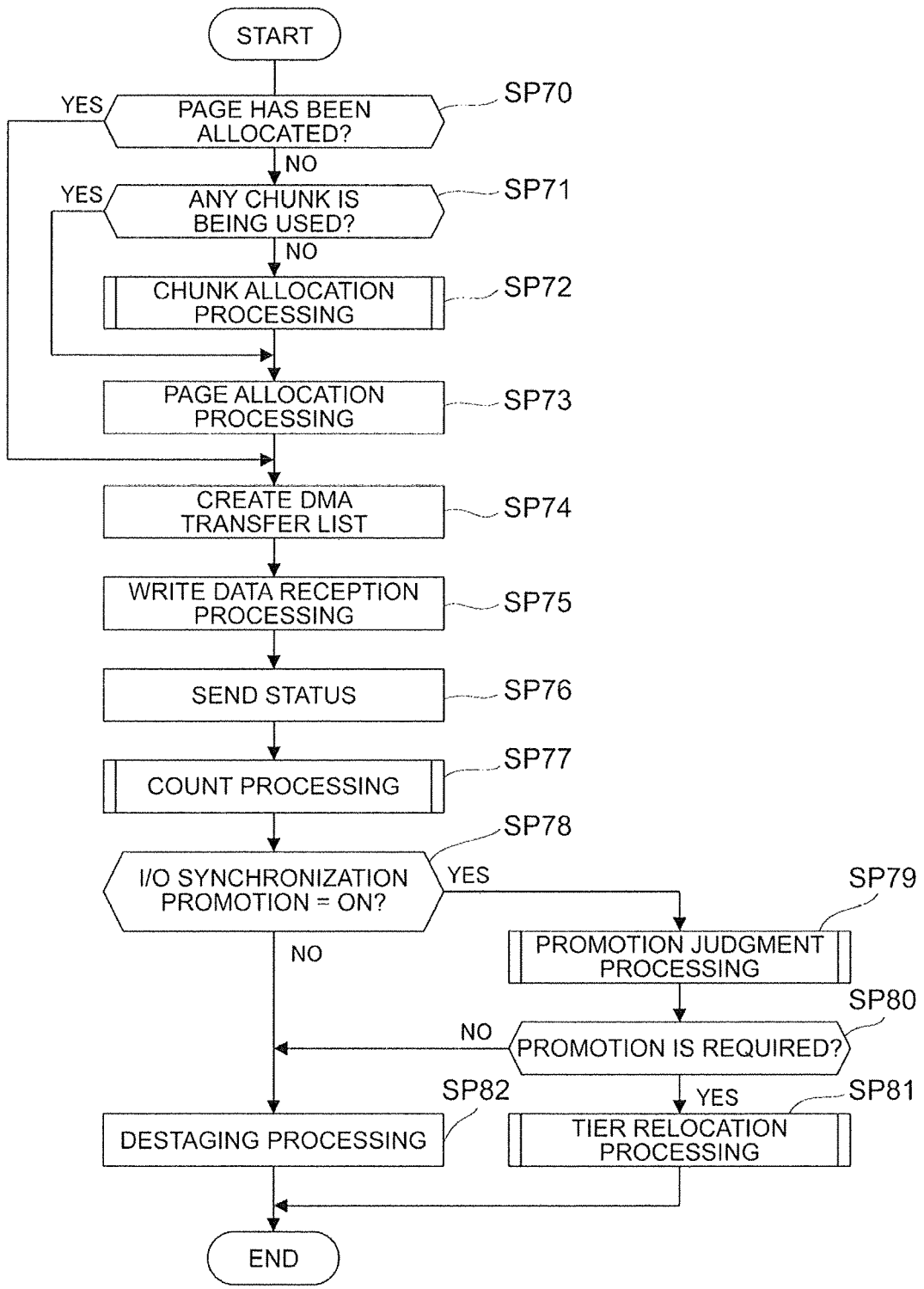
FIG. 23 is a flowchart illustrating a processing sequence for write processing.

FIG. 23 shows a processing sequence for the write processing executed by the CPU 25A, 25B of the storage apparatus 4, which has received a write command from the host system 2, during the host I/O processing ST1 in FIG. 3.

After receiving the write command, the CPU 25A, 25B writes the write target data, which is transferred together with the relevant write command, to a logical page designated in the relevant write command in a virtual volume VVOL designated in the write command during the host I/O processing ST1 in FIG. 3 in accordance with the processing sequence shown in FIG. 23. Furthermore, if the I/O synchronization promotion mode of the relevant virtual volume VVOL is set on under this circumstance, the CPU 25A, 25B executes the page relocation processing for migrating the data to an upper-level tier as the need arises.

In fact, after receiving the write command from the host system 2, the CPU 25A, 25B starts this write processing; and the CPU 25A, 25B refers to the page address table 44 (FIG. 9) and judges whether or not a physical page has already been allocated to the logical page designated as a write location in the write command in the virtual volume VVOL designated as the write location in the write command (SP70). Then, if the CPU 25A, 25B obtains an affirmative judgment result in this step, it proceeds to step SP74.

On the other hand, if the CPU 25A, 25B obtains a negative judgment result in step SP70, it judges whether or not a chunk having an unused physical page is allocated to the virtual volume VVOL designated as the write location in the received write command (SP71). The chunk herein used is a chunk including a physical page which is allocated first to the logical page; and is a chunk belonging to the second tier in this embodiment. Then, if the CPU 25A, 25B obtains an affirmative judgment result in this step, it proceeds to step SP73.

On the other hand, if the CPU 25A, 25B obtains a negative judgment result in step SP71, it executes chunk allocation processing for allocating a chunk to the virtual volume VVOL designated as the write location in the write command (SP72).

Next, the CPU 25A, 25B executes the page allocation processing for allocating an unallocated physical page in the chunk, which is being used or was allocated in SP71, to the logical page designated as the write location in the write command in the virtual volume VVOL designated as the write location in the write command (SP73). The CPU 25A, 25B executes the above-described allocation processing and proceeds to SP74.

Subsequently, the CPU 25A, 25B creates a DMA transfer list, which designates a storage area in the cache memory 27A, 27B (FIG. 1) where the write target data should be written; and sends the created DMA transfer list to the data transfer control unit 23A, 23B (SP74).

Next, the CPU 25A, 25B requests the host system 2, which has transferred the write command, to start transferring the write target data (SP75). Thus, as a result, the write target data transferred from the relevant host system 2 is stored by the data transfer control unit 23A, 23B, at an address location in the cache memory 27A, 27B, which is designated by the aforementioned DMA transfer list.

Then, when the CPU 25A, 25B eventually finishes storing all pieces of the write target data in the cache memory 27A, 27B, it sends the completion status of the write processing to the host system 2 which is the sender of the write command (SP76); and then executes the count processing described earlier with reference to FIG. 15 (SP77).

Subsequently, the CPU 25A, 25B refers to the virtual volume index table 40 (FIG. 5) and judges whether or not the I/O synchronization promotion mode of the virtual volume VVOL designated as the write location in the write command is set on (SP78).

Then, if the CPU 25A, 25B obtains a negative judgment result in this step, it executes destage processing for writing the then-received write target data to the storage drive 20 (FIG. 1) which provides the physical page allocated to the logical page designed in the relevant write command in the virtual volume VVOL designed in the write command (SP82); and then terminates this write processing. Incidentally, the destage processing in step SP82 does not have to be executed at this timing and may be executed asynchronously with this write processing.

On the other hand, if the CPU 25A, 25B obtains an affirmative judgment result in step SP78, it executes the processing of step SP79 to step SP81 in the same manner as step SP5 to step SP7 of the read processing described earlier with reference to FIG. 14. As a result, the write target data is migrated from the current tier to a physical page of an upper-level tier, as the need arises, by the processing of step SP79 to step SP81 in the same manner as in the read processing. Then, the CPU 25A, 25B terminates this write processing. Incidentally, the processing from step SP5 to step SP7 is executed on the read target data, while the processing from step SP79 to step SP81 is executed on the write target data.

(3-1-2-2) Chunk Allocation Processing

Next, the chunk allocation processing executed by the CPU 25A, 25B in step SP71 of the write processing (FIG. 23) will be explained. In doing so, a chunk allocation method in this storage apparatus 4 will be firstly explained.

Figure 24:
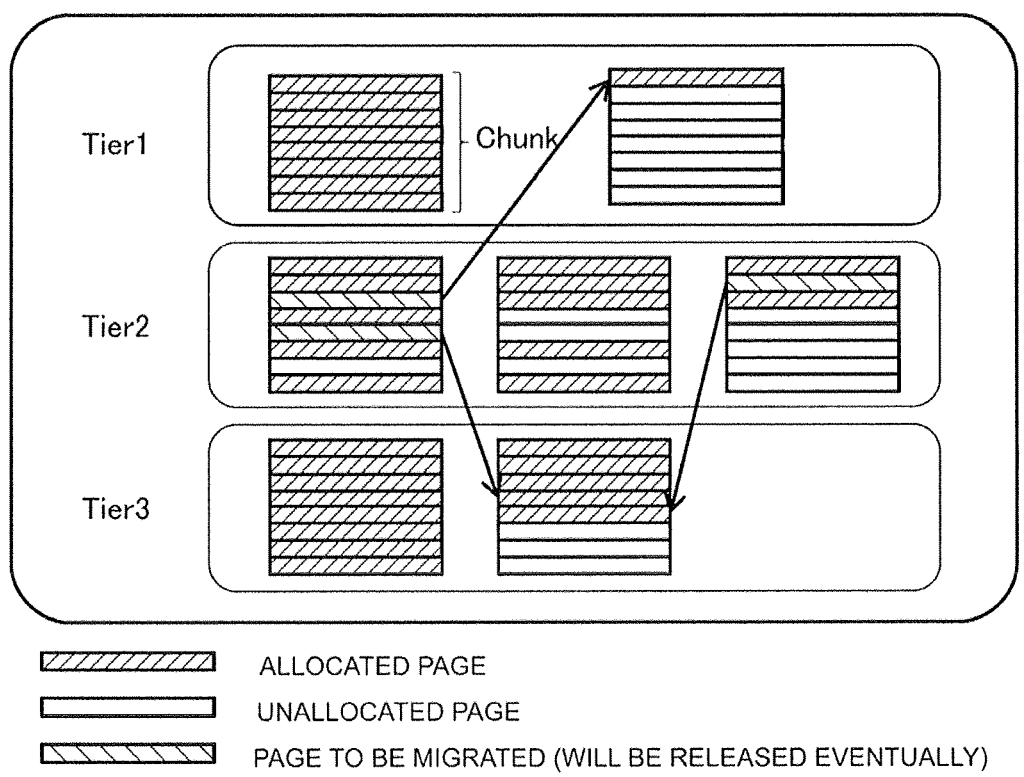
FIG. 24 is a conceptual diagram for explaining chunk allocation processing.

FIG. 24 shows the outline of a method of constituting one chunk from a plurality of physical pages (for example, 32 physical pages) in any of the first to third tiers and allocating a storage area(s) on a chunk basis to a virtual volume(s) VVOL.

If one chunk is constituted from a plurality of physical pages as is apparent from FIG. 24 and the page relocation processing described earlier with reference to FIG. 19 is repeatedly executed, the number of chunks in which unused physical pages are scattered increases (see a second chunk in FIG. 24) and capacity efficiency degrades. The same can be said about all the tiers.

As a possible means for preventing the degradation of the capacity efficiency is to decrease the number of physical pages to constitute one chunk. However, the chunk allocation processing for allocating a chunk(s) to a tier needs to be executed after executing exclusion processing on the target chunk to be allocated. So, if the number of physical pages constituting one chunk is decreased, the number of times the chunk allocation processing is executed increases, thereby causing a problem of performance degradation due to overhead of the exclusion processing.

In this case, regarding the second tier or the third tier, the storage drives 20 (FIG. 1) constituting the second tier or the third tier are not so expensive, so that there would be no problem if one chunk is constituted from a reasonable number of physical pages to prioritize the performance. However, regarding the first tier, the storage drives 20 (SSD) constituting the first tier are expensive, so that not so many storage drives 20 can be mounted on the storage apparatus 4.

Figure 25:
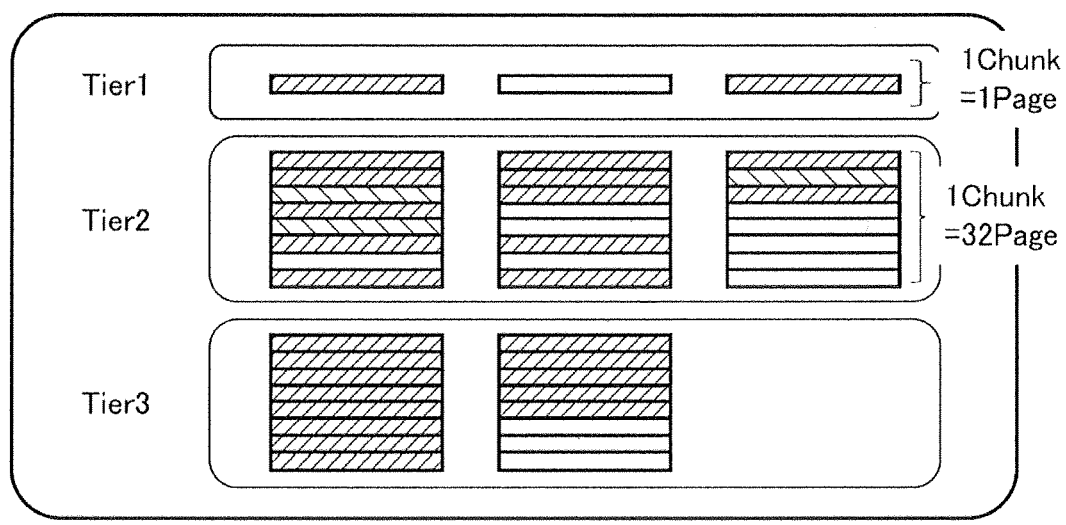
FIG. 25 is a conceptual diagram for explaining the chunk allocation processing.

Accordingly, in this embodiment, one chunk is constituted from 32 physical pages with respect to the second and the third tier, while one chunk is constituted from one physical page with respect to the first tier as shown in FIG. 25. Furthermore, with regard to the first tier, the same number of chunks (32 chunks) as the number of physical pages constituting one chunk for the second and the third tier are collectively secured during the chunk allocation processing and one chunk at a time is sequentially allocated from the secured chunks to the virtual volume VVOL. Incidentally, if a plurality of chunks are collectively secured, some secured chunks are wasted; however, unused chunks may be collected regularly by garbage collection. Incidentally, one chunk may be allocated to the virtual volume VVOL without executing the processing for securing 32 chunks.

If the above-described chunk allocation method according to this embodiment is employed, it is possible to effectively preventing degradation of the capacity efficiency due to repeated execution of the page relocation processing while reducing the number of times the exclusion processing is executed when allocating chunks of the first tier to the virtual volume VVOL.

Figure 26:
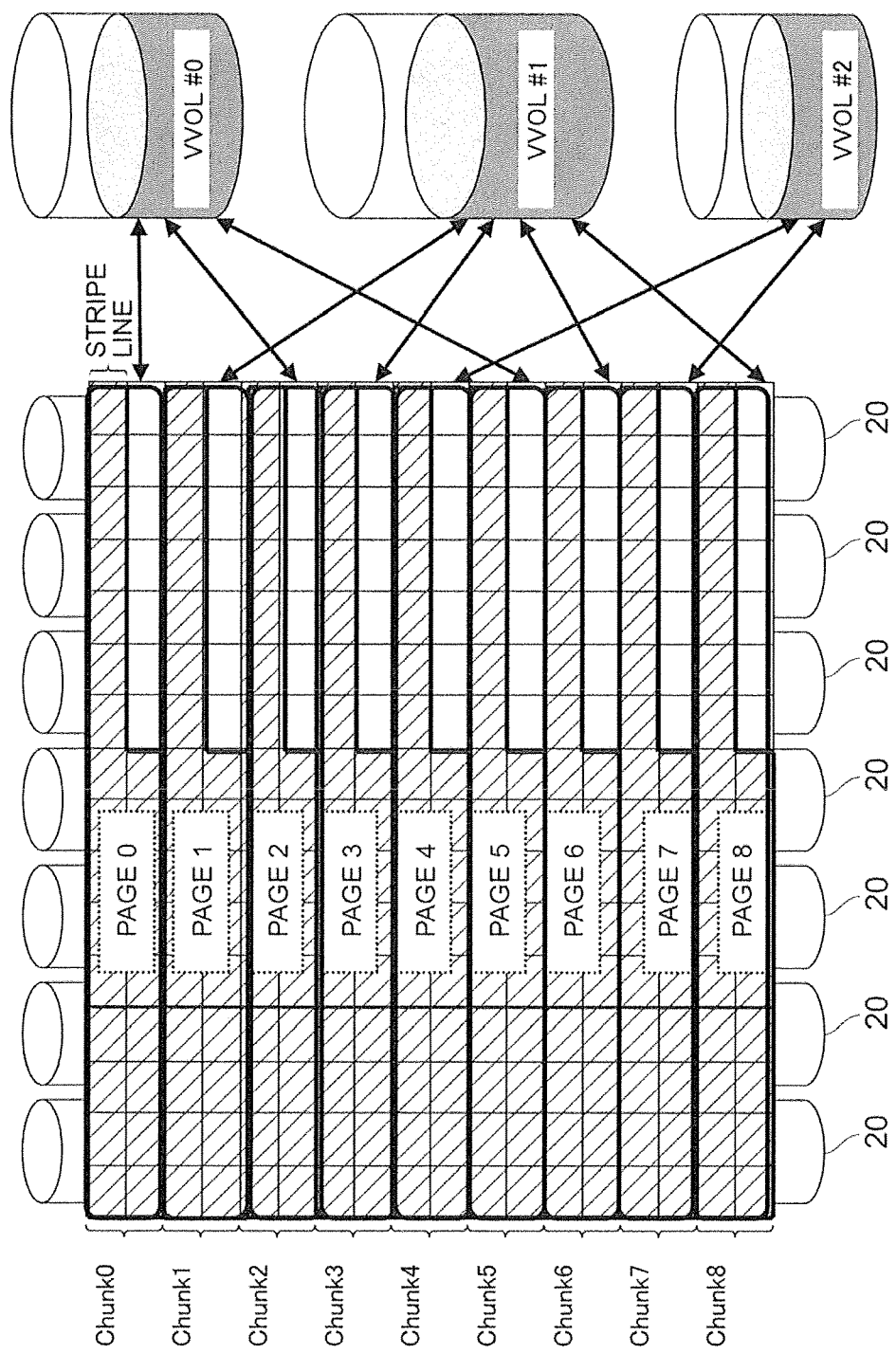
FIG. 26 is a conceptual diagram for explaining the chunk allocation processing.
Figure 27:
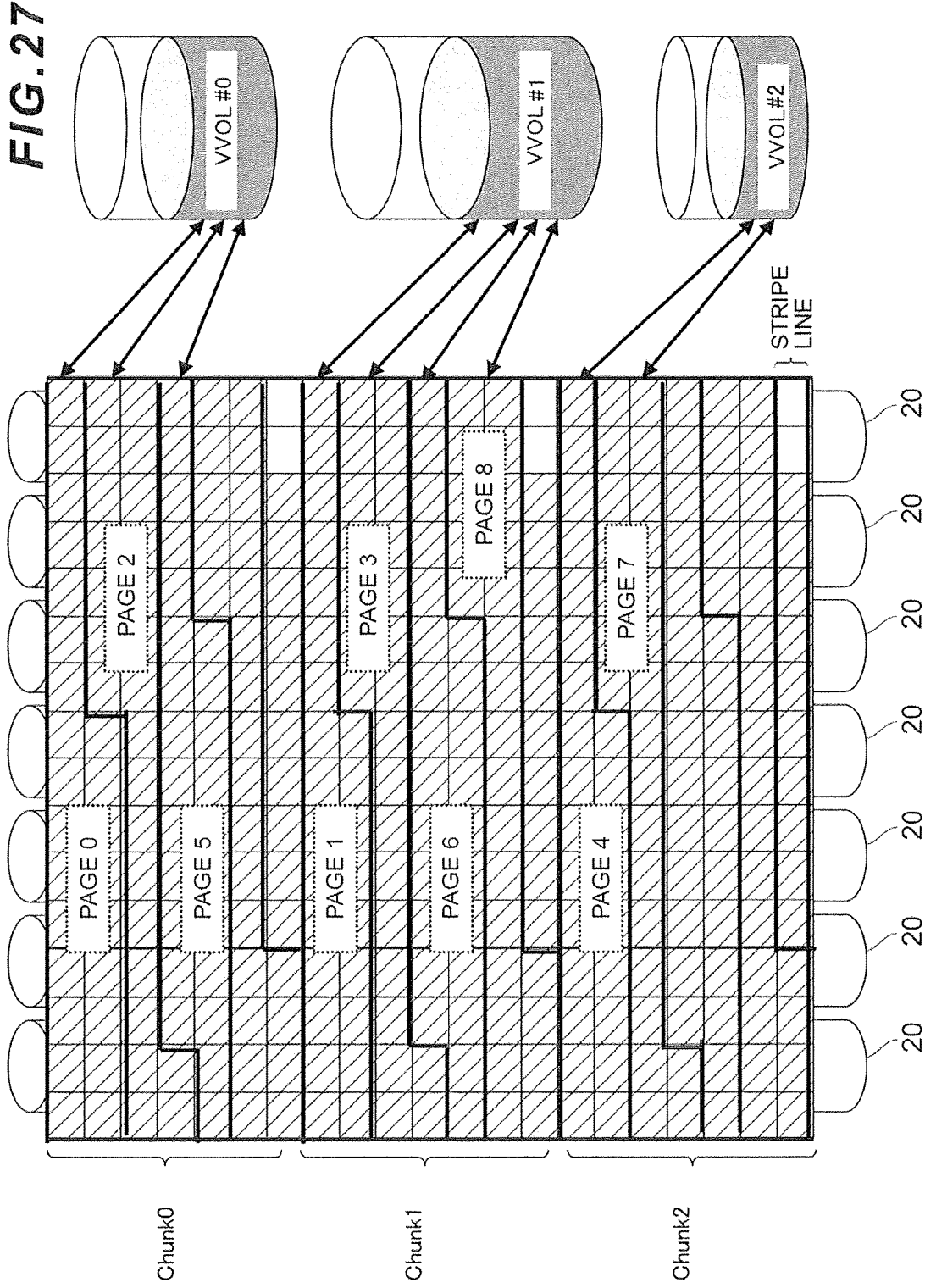
FIG. 27 is a conceptual diagram for explaining the chunk allocation processing.

However, if one chunk is constituted from only one physical page and the structure of RAID group RGs is set as 5D+2P, 13D+2P, and 17D+1P structures where "D" represents the number of storage drives for data storage and "P" represents the number of storage drives for parity storage, a boundary of each stripe line does not match the end of physical pages (32 [Mbytes]) as shown in FIG. 26 and the problem is that the number of wasteful storage areas belonging to none of physical pages (non-shaded areas in FIG. 26 and FIG. 27) increases as compared to, for example, a case where one chunk is constituted from a plurality of physical pages as shown in FIG. 27.

Regarding this point, it is possible to reduce the occurrence of wasteful storage areas as much as possible by making the boundary of each stripe line match the end of each physical page by setting the number of storage drives for data storage to 2, 4, 8 or 16 as in 2D+2P, 4D+1P, 8D+2P.

Figure 28:
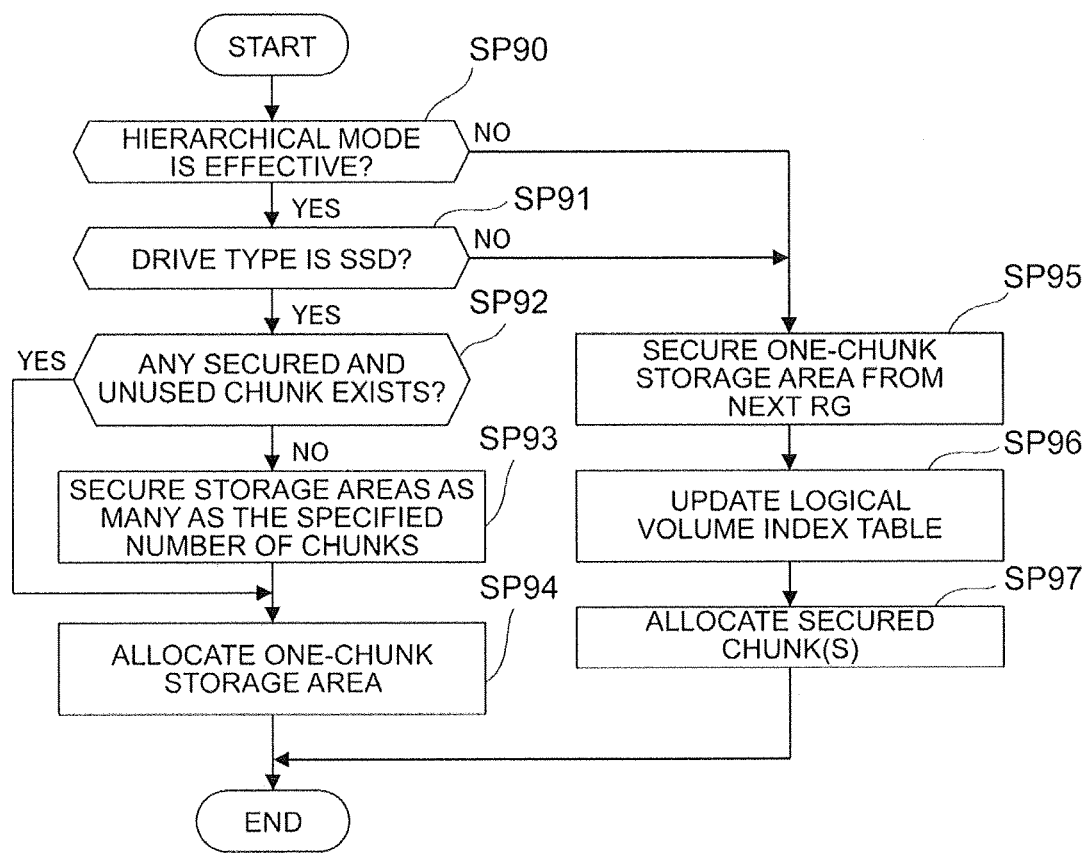
FIG. 28 is a flowchart illustrating a processing sequence for chunk allocation processing.

FIG. 28 shows a specific processing sequence for the above-described chunk allocation processing according to this embodiment. The CPU 25A, 25B allocates chunks to the corresponding tier in step SP71 of the write processing (FIG. 23) in accordance with the processing sequence shown in FIG. 28.

In fact, when the CPU 25A, 25B starts step SP71 of the write processing, it starts this chunk allocation processing and firstly refers to the corresponding hierarchical mode field 43B (FIG. 8) in the pool index table 43 (FIG. 8) and judges whether or not the hierarchical mode is set to a pool PL associated with the virtual volume VVOL designated as the write location in the write command (SP90).

If the CPU 25A, 25B obtains an affirmative judgment result in this step, it judges whether or not the drive type of the storage drive 20 (FIG. 1) providing a physical page allocated to the logical page designated as the write location in the write command is the storage drive 20 which is set as the storage drive 20 constituting the first tier 20 (hereinafter referred to as the SSD) (SP91).

If the CPU 25A, 25B obtains an affirmative judgment result in this step, it judges whether or not there is any unused chunk which has been secured in the first tier (SP92). Then, if the CPU 25A, 25B obtains an affirmative judgment result in this step, it proceeds to step SP94. On the other hand, if the CPU 25A, 25B obtains a negative judgment result in step SP92, it secures the same number of chunks in the pool PL as the number of physical pages constituting one chunk in the second and third tiers (SP93).

Next, the CPU 25A, 25B allocates the unused chunks secured for the first tier to the first tier (SP94) and then terminates this chunk allocation processing.

On the other hand, if the CPU 25A, 25B obtains a negative judgment result in step SP90 or step SP91, it refers to the last allocating RAID group number field 40G (FIG. 5) in the virtual volume index table 40 (FIG. 5), selects the next RAID group RG by means of, for example, round robin scheduling, and secures only one chunk defined in the storage area provided by the relevant RAID group RG (SP95).

Subsequently, the CPU 25A, 25B updates the last allocating RAID group number field 40G in the virtual volume index table 40 to the group ID of the RAID group RG secured in step SP95 (SP96). Subsequently, the CPU 25A, 25B allocates the chunk secured in step SP95 to the corresponding tier (the second or third tier) (SP97) and then terminates this chunk allocation processing.

(3-2) Tier Threshold Value Calculation Processing ST2
(3-2-1) Concept of Tier Threshold Values The hierarchical data management system based on the real-time monitoring function according to this embodiment is intended to not only maximize throughput performance of the entire storage apparatus 4, but also minimize an average of response time (average response time) for each tier. FIG. 29 shows policies of the hierarchical data management system according to this embodiment.

Specifically speaking, with the storage apparatus 4 according to this embodiment as shown in FIG. 30, physical pages of a high-performance tier are allocated to virtual volumes VVOL as much as possible at the time of a low load on the entire storage apparatus 4 (FIG. 30(A)); and as the load increases, an availability ratio of each tier is increased so that the availability ratio of each tier will become closer to 100% in a stepwise manner (FIG. 30(C)). At each step (hereinafter sometimes referred to as the section), the availability ratio of each tier is set so that the availability ratio of the higher-performance tier becomes higher.

Such a hierarchical data management system can minimize the average response time at the time of the low load; and minimize the average response and maximize the throughput performance at the time of the high load. Also, hierarchical control is performed to increase the availability ratio of each tier so that as the load increases, the availability ratio of each tier will become 100% in a stepwise manner. As a result, it is possible to prevent the occurrence of abrupt demotion in response to an increase of the load.

When deciding the tier threshold values (the first and second tier threshold values), the allocated capacity and allocated performance of each tier are considered. The "allocated capacity" of the tier herein used means a limit count of physical pages which can be allocated from the relevant tier to the virtual volume VVOL. Furthermore, the "allocated performance" of the tier means a limit count of the number of I/O accesses which can be processed within a unit time period (for example, one hour) in that tier. This allocated performance changes according to a ratio of the physical pages allocated to the virtual volume VVOL to the total number of physical pages in the relevant tier (hereinafter referred to as the tier availability ratio). The time when the count of physical pages or the number of I/O accesses exceeds its limit count of either the allocated capacity or the allocated performance for a certain tier is decided as a tier threshold value (the first or second tier threshold value) between that tier and a tier of one level lower than that of the relevant tier.

Figure 31A:
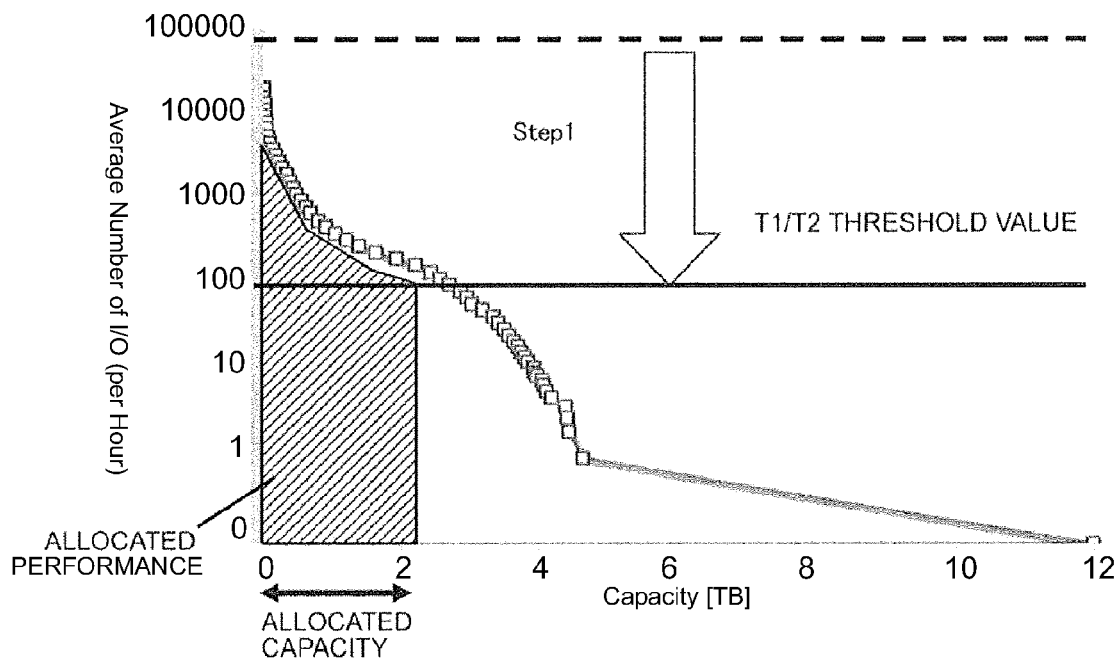
FIG. 31(A) and FIG. 31(B) are frequency distribution diagrams for explaining the tier threshold value calculation method according to this embodiment.

For example, with a frequency distribution diagram as shown in FIG. 31(A) in which its vertical axis represents the number of I/O accesses to one logical page and the number of I/O accesses to each logical page of the virtual volume VVOL associated with a certain pool PL is plotted in a horizontal axial direction, where the horizontal axis represents the number of pages (capacity) and the area between a graph and the horizontal axis represents the total sum of I/O accesses (performance).

Figure 31B:
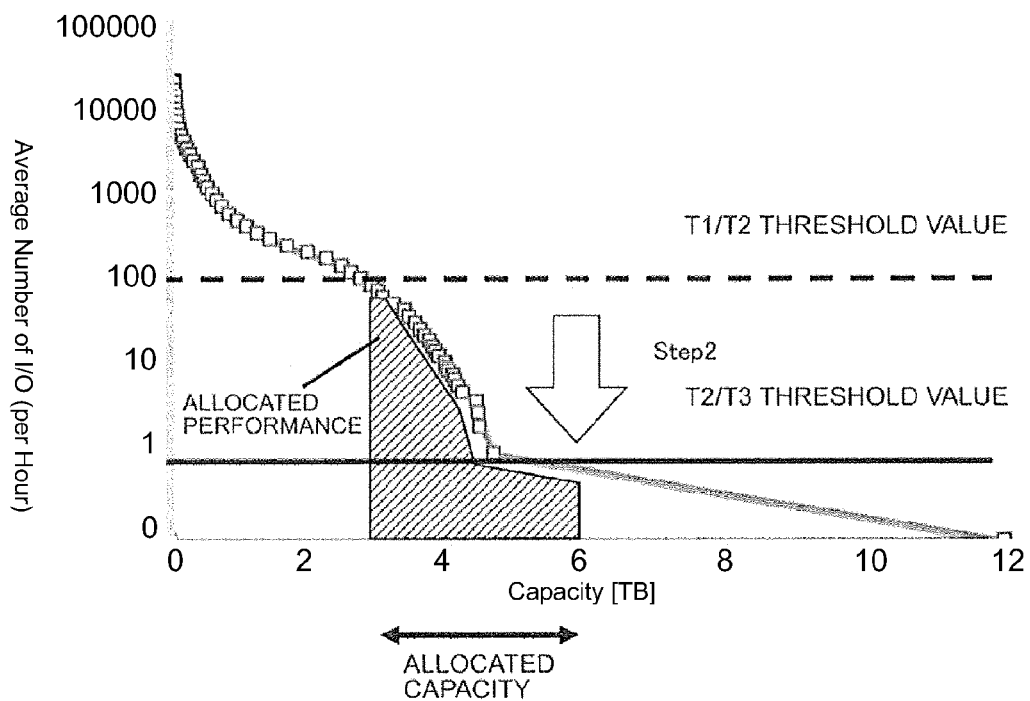

Therefore, a point where the transverse length of a shaded portion in this frequency distribution diagram reaches the number of physical pages which can be allocated from the first tier to the virtual volume VVOL (the allocated capacity) or where the area of the relevant shaded portion reaches the number of I/O accesses which can be processed per unit time in the first tier (the allocated performance) becomes the threshold value between the first tier and the second tier (the first tier threshold value). Furthermore, as shown in FIG. 31(B), a point in the same frequency distribution diagram where the transverse length of the shaded portion in the relevant FIG. 31(B) reaches the number of physical pages which can be allocated from the second tier (the allocated capacity) or where the area of the relevant shaded portion reaches the number of I/O accesses which can be processed in the second tier (the allocated performance) becomes the threshold value between the second tier and the third tier (the second tier threshold value). If the tiers are configured in a three-tier structure as in this embodiment, the first and second tier threshold values are calculated consecutively.

Figure 32:
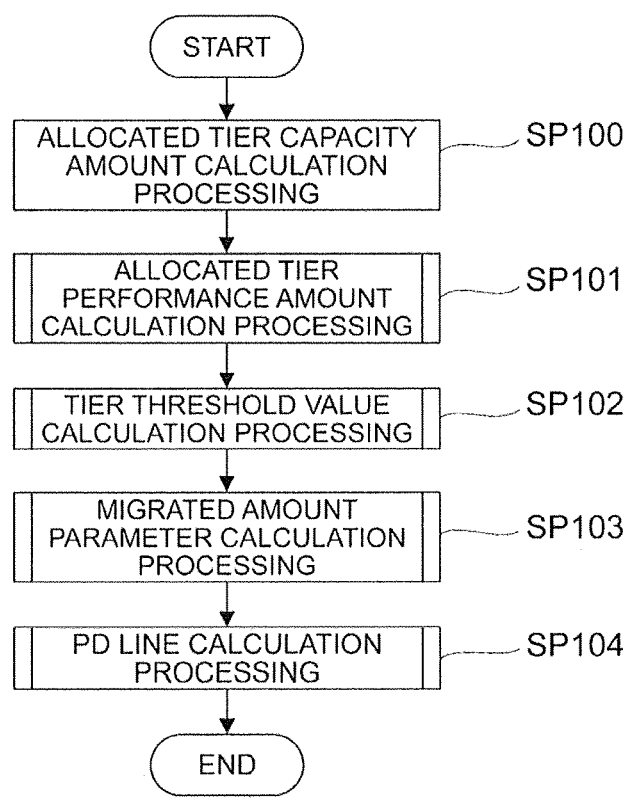
FIG. 32 is a flowchart illustrating a processing sequence for tier threshold value calculation processing.

(3-2-2) Processing Content of Tier Threshold Value Calculation Processing (3-2-2-1) Outline of Tier Threshold Value Calculation Processing FIG. 32 shows a specific processing sequence for the tier threshold value calculation processing executed by the CPU 25A, 25B for each of the system-0 controller 21A and the system-1 controller 21B (FIG. 1) of the storage apparatus 4 during the tier threshold value calculation processing ST2 in FIG. 3.

The CPU 25A, 25B calculates optimum values of the aforementioned first and second tier threshold values at that point in time and optimum values of each promotion line (a T3-T1 promotion line, a T2-T1 promotion line, a T3-T2 promotion line) and each demotion line (a T1-T2 demotion line, a T2-T3 demotion line, and a T1-T3 demotion line), respectively, when performing calculation during the count processing (SP25 in FIG. 15) or by executing this tier threshold value calculation processing ST2 on a specified cycle (for example, on a cycle of several minutes).

In fact, when the CPU 25A, 25B starts this tier threshold value calculation processing, it firstly refers to the tier management table 42 (FIG. 7) and calculates the total number of physical pages which can be allocated from each tier of the corresponding pool PL to the virtual volume VVOL associated with the relevant pool PL (hereinafter referred to as the allocated tier capacity amount) (SP100). This allocated tier capacity amount can be calculated by subtracting a buffer capacity (the number of physical pages for buffering) which is required at the time of the data relocation processing or the physical page allocation processing, from the total capacity of the relevant tier (the total number of physical pages).

Subsequently, the CPU 25A, 25B calculates the number of I/O accesses per unit time to the corresponding pool PL at that time and calculates the number of I/O accesses to be assigned to each tier from among the calculated number of I/O accesses (hereinafter referred to as the allocated tier performance amount), respectively (SP101).

Next, the CPU 25A, 25B refers to the counter value management table 45 (FIG. 10), creates the frequency distribution diagram described earlier with reference to FIG. 31 about the corresponding pool PL, and calculates the first and second tier threshold values based on the created frequency distribution diagram, the allocated tier capacity amount for each tier which was calculated in step SP100, and the allocated tier performance amount for each tier which was calculated in step SP101 (SP102).

Subsequently, the CPU 25A, 25B calculates a migrated amount parameter for the virtual volume VVOL associated with the corresponding pool PL (SP103). This migrated amount parameter is a parameter for adjusting the data migration amount between tiers according to the progress of the tier decision processing ST3 described with reference to FIG. 3; and the larger this migrated amount parameter is, the larger the number of pages to be migrated between tiers becomes; and the smaller the relevant migrated amount parameter is, the smaller the number of pages to be migrated between tiers becomes. The CPU 25A, 25B sets this migrated amount parameter according to the progress of the tier decision processing described later with reference to FIG. 43 so that the migrated amount parameter becomes larger as the load imposed upon data migration is heavier; and the migrated amount parameter becomes smaller as the load imposed upon data migration is lighter.

Furthermore, the CPU 25A, 25B calculates each of the above-described promotion lines (the T3-T1 promotion line, the T2-T1 promotion line, and the T3-T2 promotion line) and the above-described demotion line (the T1-T2 demotion line, the T2-T3 demotion line and the T1-T3 demotion line) based on the migrated amount parameter calculated in step SP103 (SP104) and then terminates this tier threshold value calculation processing.

(3-2-2-2) Allocated Tier Performance Calculation Processing

Figure 33:
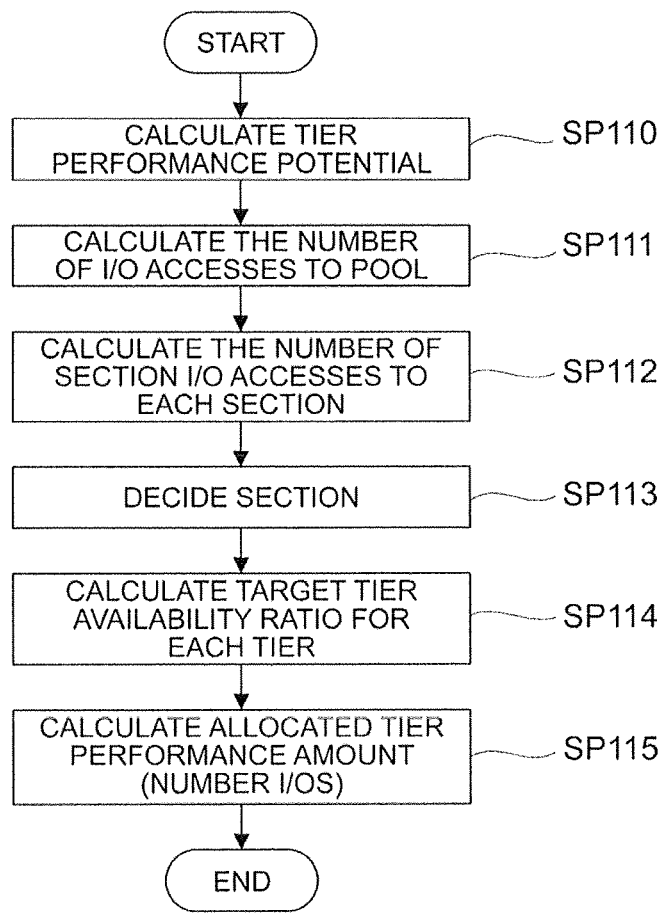
FIG. 33 is a flowchart illustrating a processing sequence for allocated tier performance amount calculation processing.

FIG. 33 shows a specific processing sequence for the allocated tier performance amount calculation processing executed by the CPU 25A, 25B in step SP101 of the aforementioned tier threshold value calculation processing. The CPU 25A, 25B calculates the allocated tier performance amount of each tier in accordance with the processing sequence shown in FIG. 33.

In fact, when the CPU 25A, 25B proceeds to step SP101 of the tier threshold value calculation processing, it starts this allocated tier performance amount calculation processing and calculates the number of I/O accesses to each tier, which can be processed in that tier per unit time (hereinafter referred to as the tier performance potential) when the availability ratio of the tier (hereinafter referred to as the tier availability ratio of the tier) is 100% (SP110).

Now, as examples of the tier availability ratio, there are two types: a real-time tier availability ratio and a migration average tier availability ratio. The real-time tier availability ratio is an availability ratio of each tier which is sampled on a specified cycle (for example, on a 1-minute cycle; and hereinafter referred to as the real-time tier availability ratio acquisition cycle) and is used for, for example, calculation of the promotion lines and the demotion lines described later. Furthermore, the migration average tier availability ratio is an availability ratio obtained by calculating a migration average from the real-time tier availability ratio and is used to decide the tier performance potential.

The tier availability ratio that the CPU 25A, 25B obtains by its performance monitoring function is only the real-time tier availability ratio; and the migration average availability ratio is calculated by using a specified number of the real-time tier availability ratios obtained in the past (X times). Specifically speaking, the CPU 25A, 25B calculates the migration average tier availability ratio $AOR_n'$ according to the following formula where $AOR_{n-1}$ represents the migration average tier availability ratio of the last time, $AOR_n$ represents the migration average tier availability ratio to be calculated this time, and $ROR_n$ represents the real-time tier availability ratio obtained this time.

[Math. 1]

$$AOR_n' = \frac{AOR_{n-1} \times (X-1) + ROR_n}{X} \quad (1)$$

Then, the CPU 25A, 25B defines the larger of the migration average tier availability ratio $AOR_n'$ calculated this time and the real-time tier availability ratio $ROR_n$ obtained this time as the migration average tier availability ratio $AOR_n$ of this time.

Incidentally, the purpose of calculation of the migration average tier availability ratio is to inhibit the occurrence of excessive fluctuations of the tier threshold value and the occurrence of wasteful data migration due to fluctuations of the tier performance potential attributable to fluctuations of the real-time tier availability ratio.

On the other hand, the tier performance potential $P_n$ can be calculated by using the migration average tier availability ratio $AOR_n$ of this time calculated as described above according to the following formula where $AC_{I/O}$ represents the total number of I/O accesses to the relevant tier during the real-time tier availability ratio acquisition cycle of this time.

[Math. 2]

$$P_n = \frac{AC_{I/O}}{AOR_n} \qquad (2)$$

Subsequently, the CPU 25A, 25B calculates the total number of I/O accesses to the then target pool PL per unit time (hereinafter referred to as the total number of pool I/O accesses) (SP111). This total number of pool I/O accesses can be calculated by aggregating count values of all logical pages of the virtual volume VVOL, to which the physical pages are allocated from any of the tiers in the relevant pool PL, from among each of the counter values registered in the counter value management table 45 (FIG. 10).

Next, the CPU 25A, 25B calculates the number of I/O accesses to each section (hereinafter referred to as the number of section I/O accesses) (SP112).

The hierarchical data management system is adopted for this storage apparatus 4 as explained earlier with reference to FIG. 30 so that physical pages of the higher-performance tier are allocated to logical pages as much as possible when the load on the entire storage apparatus 4 is low; and as the load becomes heavier, the availability ratio of each tier is increased to make the availability ratio of each tier become closer to 100% in a stepwise manner.

As a means for realizing such a hierarchical data management system, the storage apparatus 4 retains the section I/O access management table 60 for each pool PL as shown in FIG. 34 in the local memory 26A, 26B (FIG. 1). This section I/O access management table 60 is constituted from a section number field 60A, a number-of-section-I/O-accesses field 60B, and a media-based availability ratio standard field 60C; and the section number field 60A stores the section number assigned to each section (step) corresponding to each "step" of "step-wise" mentioned above.

Figure 35:
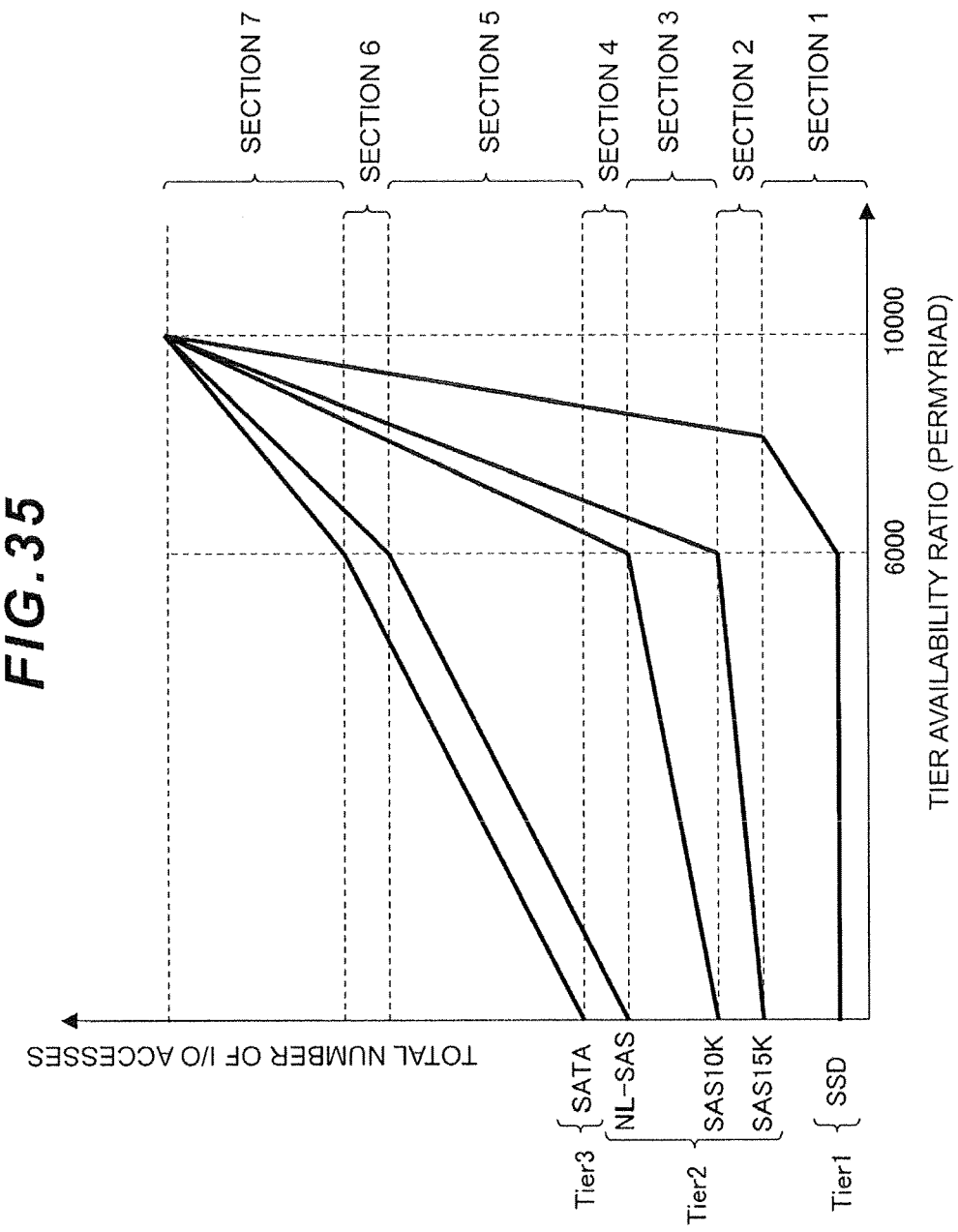
FIG. 35 is a graph for explaining allocated tier performance amount calculation processing.

Furthermore, the media-based availability ratio standard field 60C is constituted from a plurality of availability ratio standard fields 60CA to 60CE associated with each drive type (such as SSD, SAS15K, and SATA) of the storage drives 20 (FIG. 1) belonging to the corresponding pool PL (or which provides the storage areas of that pool PL). Then, each availability ratio standard field 60CA to 60CE stores a predetermined standard of the availability ratio for the corresponding storage drive 20 in each corresponding section (hereinafter referred to as the availability ratio standard) on a permyriad basis. This availability ratio standard is a numeric value as shown in FIG. 35 according to a set value that was set in advance by, for example, a system designer and indicates which storage drive 20 should be made to operate with respect to the total number of I/O accesses to the pool PL to what degree of the availability ratio.

Therefore, FIG. 34 shows that the respective storage drives 20 of the drive types such as "SSD," "SAS15K," "SAS10K," "NL-SAS" and "SATA" belong to the relevant pool PL and eight sections "0" to "7" are defined as the sections. Furthermore, FIG. 34 shows that only "SSD" is operated at the availability ratio of "8000" permyriad in section "1"; "SSD" is operated at the availability ratio of "8089" permyriad and "SAS15K" is operated at the availability ratio of "6000" permyriad in section "2"; "SSD" is operated at the availability ratio of "8267" permyriad, "SAS15K" is operated at the availability ratio of "6372" permyriad, and "SAS10K" is operated at the availability ratio of "6000" permyriad, respectively, in section "3"; and "SSD" is operated at the availability ratio of "8311" permyriad, "SAS15K" is operated at the availability ratio of "6465" permyriad, "SAS10K" is operated at the availability ratio of "6103" permyriad, and "NL-SAS" is operated at the availability ratio of "1000" permyriad, respectively, in section "4."

Furthermore, FIG. 34 shows that "SSD" is operated at the availability ratio of "8533" permyriad, "SAS15K" is operated at the availability ratio of "6930" permyriad, "SAS10K" is operated at the availability ratio of "6615" permyriad, "NL-SAS" is operated at the availability ratio of "6000" permyriad, and "SATA" is operated at the availability ratio of "3750" permyriad, respectively in section "5"; and "SSD" is operated at the availability ratio of "8667" permyriad, "SAS15K" is operated at the availability ratio of "7209" permyriad, "SAS10K" is operated at the availability ratio of "6923" permyriad, "NL-SAS" is operated at the availability ratio of "6364" permyriad, and "SATA" is operated at the availability ratio of "6000" permyriad, respectively, in section "6"; and all of "SSD," "SAS15K," "SAS10K," "NL-SAS," and "SATA" are operated at the availability ratio of "10000" permyriad, respectively, in section "7."

Furthermore, the number-of-section-I/O-accesses field 60B stores the number of I/O accesses which can be processed as the entire pool PL (the number of section I/O accesses) when each storage drive 20 belonging to that pool PL is operated at the availability ratio standard specified in the media-based availability ratio standard field 60C in the corresponding section. This number of section I/O accesses is calculated by multiplying, for each storage drive 20, the tier performance potential of the tier, to which the relevant storage drive 20 belongs, by the availability ratio standard of the relevant storage drive in that section and adding up all the multiplication results of the respective storage drives 20.

Specifically speaking, in step SP112, the number of section I/O accesses in each of such sections is calculated. Then, the obtained number of section I/O accesses for each section is stored in the corresponding number-of-section-I/O-accesses field 60B in the section I/O access management table 60.

Next, the CPU 25A, 25B decides a section to which the total number of pool I/O accesses belongs at that time, based on the total number of pool I/O accesses calculated in step SP111 and the number of section I/O accesses for each section, which is stored in each number-of-section-I/O-accesses field 60B in the section I/O access management table 112 as calculated in step SP112 (SP113).

Specifically speaking, the section whose total number of pool I/O accesses does not exceed the number of section I/O accesses for that section and is equal to or more than the number of section I/O accesses for a section immediately below the relevant section is decided as the section for the total number of pool I/O accesses. Therefore, for example, if the total number of pool I/O accesses is within the range from "11362" to "11268" in the example of FIG. 34, the section for the total number of pool I/O accesses is decided as "3"; and if the total number of pool I/O accesses is within the range from "16000" to "12729," the section for the total number of pool I/O accesses is decided as "7."

Subsequently, the CPU 25A, 25B calculates a target tier availability ratio for each tier (SP114). This target tier availability ratio is the availability ratio of each tier when the storage drives 20 are operated at the availability ratio standard of each storage drive 20 for the section decided in step SP113 as specified in the section I/O access management table 60.

Next, the CPU 25A, 25B calculates the allocated tier performance amount for each tier based on the target tier availability ratio of each tier as calculated in step SP114 (SP115). Specifically speaking, the CPU 25A, 25B calculates the allocated tier performance amount for each tier by multiplying the target tier availability ratio calculated in step SP114 by the corresponding tier performance potential calculated in step SP110. Then, the CPU 25A, 25B terminates this allocated tier performance amount calculation processing.

(3-2-2-3) Tier Threshold Value Calculation Processing

Figure 36:
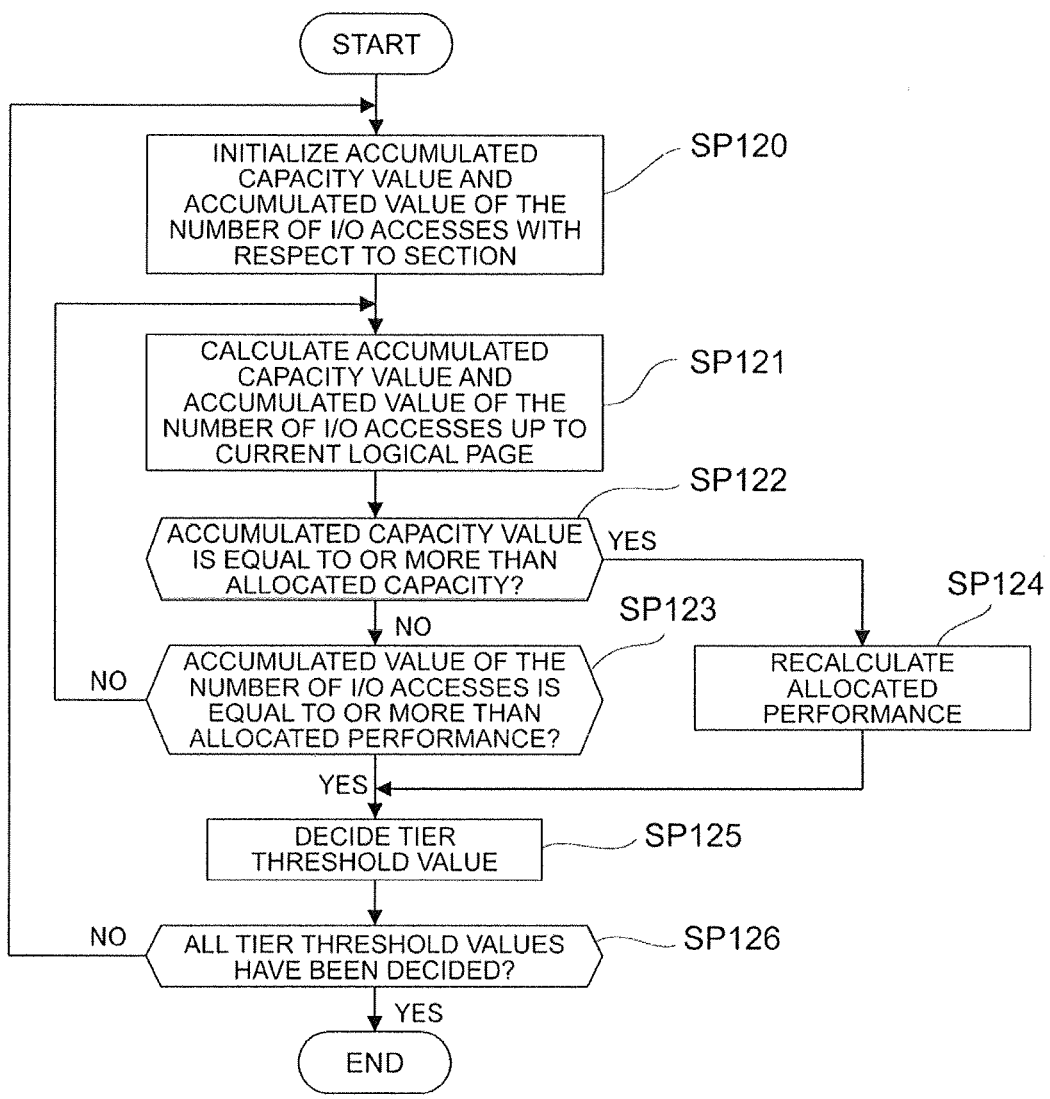
FIG. 36 is a flowchart illustrating a processing sequence for tier threshold value calculation processing.

FIG. 36 shows a specific processing sequence for the tier threshold value calculation processing executed by the CPU 25A, 25B in step SP102 of the tier threshold value calculation processing (FIG. 32). The CPU 25A, 25B calculates each tier threshold value (the first and second tier threshold values) for the relevant pool by executing the tier threshold value calculation processing shown in FIG. 36 on each pool.

Specifically speaking, the CPU 25A, 25B calculates an accumulated value of the number of I/O accesses and capacity (the number of physical pages) from the physical pages in descending order of the number of I/O accesses for each tier in accordance with this FIG. 36 and decides the accumulated value of the number of I/O accesses immediately before the accumulated value of the number of I/O accesses exceeds the allocated performance for that tier as explained earlier with reference to FIG. 31 (the limit count of the number of I/O accesses which can be processed within a unit time period in that tier), or the accumulated value of the number of I/O accesses immediately before the accumulated value of the capacity exceeds the allocated capacity of that tier as explained earlier with reference to FIG. 31 (the limit count of the physical pages which can be allocated from that tier to the virtual volume VVOL), to be the tier threshold value between the relevant tier and a tier of one level lower than that of the relevant tier.

In fact, when the CPU 25A, 25B proceeds to step SP102 of the tier threshold value calculation processing, it starts this tier threshold value calculation processing and firstly initializes each of the accumulated capacity value and the accumulated value of the number of I/O accesses which will be described later and are parameters used for the processing in step SP121 and subsequent steps (SP120).

Subsequently, the CPU 25A, 25B refers to the counter value management table 45 (FIG. 10) and obtains the number of I/O accesses to a logical page with the maximum number of I/O accesses from among logical pages to which physical pages are allocated from the then target pool PL; and calculates the accumulated capacity value, which is an accumulated value of the number of physical pages up to present, and the accumulated value of the number of I/O accesses, which is an accumulated value of the number of I/O accesses up to present, respectively (SP121). Incidentally, at this stage, the accumulated capacity value is "1" and the accumulated value of the number of I/O accesses is the same as the number of I/O accesses obtained in step SP121.

Next, the CPU 25A, 25B judges whether the accumulated capacity value calculated in step SP121 is equal to or more than the allocated capacity (SP122).

Now, the allocated capacity DC of the tier can be calculated according to the following formula where PP represents the tier performance potential calculated in step SP110 of the aforementioned allocated tier performance amount calculation processing (FIG. 33), $AV_{I/O}$ represents the estimated number of I/O accesses per unit time for as many as the number of physical pages excluded or reserved in the corresponding tier, and OR represents the target tier availability ratio for the relevant tier as calculated in step SP114 of the allocated tier performance amount calculation processing (FIG. 33).

[Math. 3]

$$DC=(PP-AV_{I/O}) \times OR \quad (3)$$

Therefore, in this step SP 122, the CPU 25A, 25B judges whether the accumulated capacity value calculated in step SP121 is equal to or more than the allocated capacity DC of the relevant tier as calculated according to the formula (3).

Then, if the CPU 25A, 25B obtains a negative judgment result in this step, it judges whether the accumulated value of the number of I/O accesses calculated in step SP121 is equal to or more than the allocated performance of the relevant tier (SP123).

Now, the allocated performance DP of the tier can be calculated according to the following formula where TAP represents the total number of physical pages in that tier, $MR_1$ and $MR_2$ represent a new allocation buffer ratio and a relocation buffer ratio, respectively, which were described with reference to FIG. 7, and AP represents the number of physical pages excluded or reserved in that tier.

[Math. 4]

$$DP=TAP \times (100-MR_1-MR_2)-AP \quad (4)$$

Therefore, in this step SP123, the CPU 25A, 25B judges whether the accumulated value of the number of I/O accesses calculated in step SP121 is equal to or more than the allocated performance DP of that tier as calculated according to the formula (4).

Then, if the CPU 25A, 25B obtains a negative judgment result in this step, it returns to step SP121 and then repeats the processing from step SP121 to step SP123 until it obtains an affirmative judgment result in step SP122 or step SP123. Incidentally, in step SP121, the CPU 25A, 25B thereafter calculates a new accumulated capacity value by adding "1" to the accumulated capacity value calculated in step SP121 last time. Furthermore, the CPU 25A, 25B calculates a new accumulated value of the number of I/O accesses by adding the number of I/O accesses to a logical page with the second largest number of I/O accesses next to the target logical page in step SP121 last time from among logical pages, to which physical pages are allocated from the then target pool PL, to the accumulated value of the number of I/O accesses calculated in step SP121 last time.

Then, if the CPU 25A, 25B eventually obtains an affirmative judgment result in step SP122, it recalculates the allocated performance of the then target tier according to the formula (3) (SP124) and decides the tier threshold value between the relevant tier and a tier of one level lower than that of the relevant tier based on this calculation result (SP125).

Furthermore, if the CPU 25A, 25B obtains an affirmative judgment result in step SP123, it decides the accumulated value of the number of I/O accesses at that time as the tier threshold value between the then target tier and a tier of one level lower than that of the relevant tier (SP125).

Subsequently, the CPU 25A, 25B judges whether all the tier threshold values have been decided or not (SP126); and if the CPU 25A, 25B obtains a negative judgment result, it returns to step SP120 and then executes step SP120 and subsequent steps in the same manner as described above. Incidentally, when this happens, the CPU 25A, 25B calculates the accumulated capacity value and the accumulated I/O access value in a newly targeted tier in step SP121.

Then, if the CPU 25A, 25B obtains an affirmative judgment result in step SP126 by eventually calculating all the tier threshold values, it terminates this tier threshold value calculation processing and returns to the tier threshold value calculation processing in FIG. 32.

(3-2-2-4) Migrated Amount Parameter Calculation Processing

In step SP103 of the aforementioned tier threshold value calculation processing (FIG. 32), the CPU 25A, 25B calculates the migrated amount parameter by the following method.

Specifically speaking, the CPU 25A, 25B calculates a ratio of the number of logical pages, which have been checked, CP to a total number of check target logical pages CAP (hereinafter referred to as the number-of-checked-page ratio) SR according to the following formula where CAP represents the total number of check target logical pages and CP represents the number of checked logical pages.

[Math. 5]

$$SR = \frac{CP}{CAP} \times 10000 \times 11 \quad (5)$$

Incidentally, "10000" is used as a multiplier on the right-hand side of the formula (5) in order to calculate the number of the relevant pages CP on a permyriad basis.

Furthermore, the CPU 25A, 25B calculates a ratio TR of elapsed time after the start of the current tier decision processing ST3 until present to a target cycle F of the tier decision processing ST3 (hereinafter referred to as the elapsed time ratio) according to the following formula where F represents the target cycle (for example, one hour) of the tier decision processing ST3 (FIG. 3) described later with reference to FIG. 43, T1 represents start time of one cycle of the tier decision processing ST3, and T2 represents the current time.

[Math. 6]

$$TR = \frac{T2 - T1}{F} \times 10000 \times 10 \quad (6)$$

Incidentally, "10" is used as a multiplier on the right-hand side of the formula (6) in order to make a unit of the formula (6) match a unit of the formula (5).

Subsequently, the CPU 25A, 25B compares the number-of-checked-page ratio SR with the elapsed time ratio TR, which were calculated as described above. Then, if the elapsed time ratio TR is larger than the number-of-checked-page ratio SR (migrated amount parameter: 0 to 254) as in the following formula, the CPU 25A, 25B calculates the migrated amount parameter to be a value obtained by adding 1 to the current value.

[Math. 7]

$$SR < TR \quad (7)$$

If the number-of-checked-page ratio SR is equal to or more than the elapsed time ratio TR as in the following formula (the migrated amount parameter: 1 to 255), the CPU 25A, 25B calculates the migrated amount parameter to be a value obtained by subtracting 1 from the current value.

[Math. 8]

$$SR \geq TR \quad (8)$$

(3-2-2-5) PD Line Calculation Processing

Figure 37:
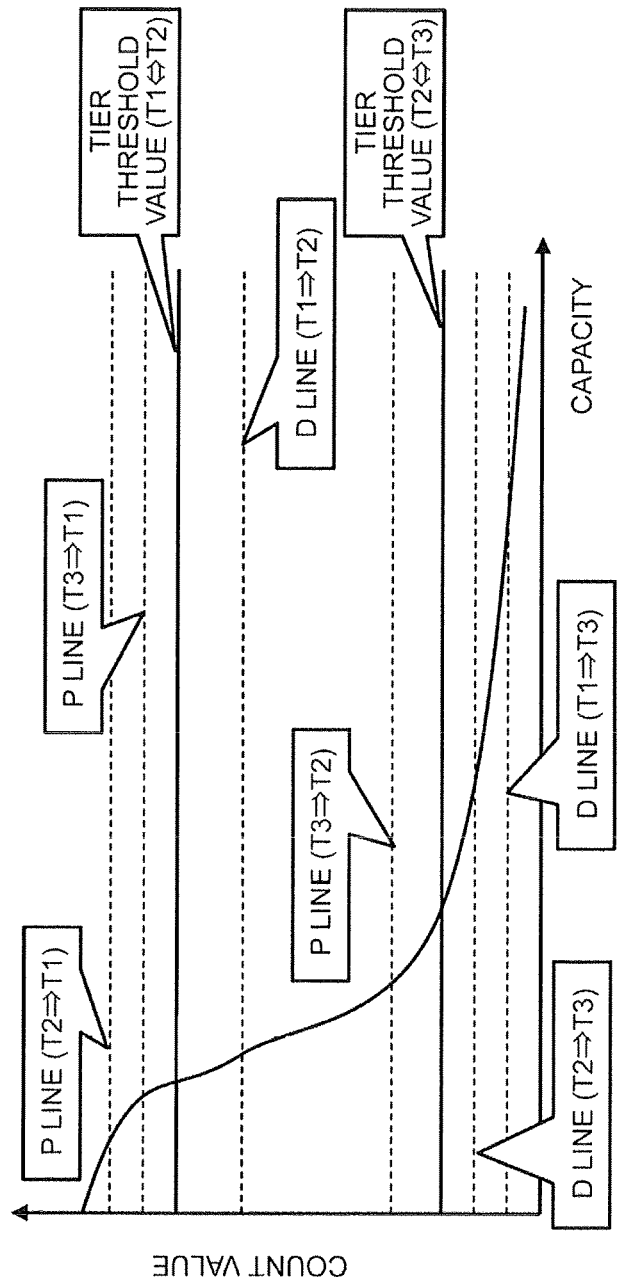
FIG. 37 is a graph for explaining promotion lines and demotion lines.

FIG. 37 shows the relationship between the first and second tier threshold values, each promotion line (the T3-T1 promotion line, the T2-T1 promotion line, and the T3-T2 promotion line) and each demotion line (the T1-T2 demotion line, the T2-T3 demotion line, and the T1-T3 demotion line).

The promotion lines and the demotion lines are threshold values of access frequency to logical pages, which are set for the purpose of improvement of response performance of each tier that can be achieved by promoting data, which is stored in the logical pages of the virtual volume VVOL, to an upper-level tier or demoting the data to a lower-level tier.

The promotion line is a threshold value of access frequency to logical pages, which is set for the purpose of improvement of response performance of each tier that can be achieved by promoting data, which is stored in the logical pages of the virtual volume VVOL, to an upper-level tier. This promotion line is used together with the first and second tier threshold values when judging whether the data stored in the logical page of the virtual volume VVOL should be promoted or not. Incidentally, such judgment may be performed based on the promotion line without considering the first and second tier threshold values as described above.

If the promotion line matches the corresponding first or second tier threshold value, a data amount to be promoted becomes a maximum; and if the relevant promotion line becomes more separated from the corresponding first or second tier threshold value, the data amount to be promoted decreases. In other words, as the promotion line becomes more separated from the corresponding first or second tier threshold value, there is a high tendency that a logical page which can achieve the higher advantageous effect (i.e., the improvement of the tier response performance, which will be hereinafter referred to as the migration effect) by promoting the data stored in that logical page will be selected.

Furthermore, the demotion line is a threshold value of access frequency to logical pages, which is set for the purpose of improvement of response performance of each tier that can be achieved by demoting data, which is stored in the logical pages of the virtual volume VVOL, to a lower-level tier. This demotion line is used together with the first and second tier threshold values when judging whether the data stored in the logical page of the virtual volume VVOL should be demoted or not. This is because a physical page allocated to a logical page whose access frequency is smaller than the first and second tier threshold values and larger than the demotion line is set as the target to be migrated.

If the demotion line matches the corresponding first or second tier threshold value, a data amount to be demoted becomes a minimum; and if the relevant demotion line becomes more separated from the corresponding first or second tier threshold value, the data amount to be demoted increases. In other words, as the demotion line becomes closer to the corresponding first or second tier threshold value, data with higher access frequency can be selected and demoted from among even the access frequency smaller than the first or second tier threshold value, so that data stored in a logical page capable of achieving the migration effect more can be demoted.

Incidentally, FIG. 37 shows just an example of the relationship between the first and second tier threshold values and each promotion line and each demotion line and all the promotion lines may be sometimes set above the first tier threshold value and all the demotion lines may be sometimes set below the second tier threshold value.

Now, such promotion lines or demotion lines are decided based on the tier threshold values (the first and second tier threshold values) and the response performance (response time) of the storage drives 20 constituting each tier which is always being monitored.

Specifically speaking, the migration effect obtained when data is promoted or demoted between tiers is firstly calculated with respect to all combinations of tiers based on the response performance of each tier. In this embodiment, this migration effect E(s,d) is calculated according to the following formula where Rsp(S) represents the response performance of the migration source tier, and Rsp(d) represents the response performance of the migration destination tier.

[Math. 9]

$$E(s,d)=Rsp(s)-Rsp(d) \qquad (9)$$

Specifically speaking, when data is migrated between tiers, the migration effect is a value indicating how better (or shorter) the response performance (response time) of the migration destination tier (physical page) becomes as compared to the response performance (response time) of the migration source tier (physical page).

For example, it is assumed that: as shown in FIG. 38(A), the first tier threshold value which is set between the first tier and the second tier is "100 IOPH (Input Output Per Hour)," and the second tier threshold value which is set between the second tier and the third tier is "10I OPH"; and as shown in FIG. 38(B), average drive response time of the storage drives 20 belonging to the first tier is "1 ms," the average drive response time of the storage drives 20 belonging to the second tier is "9 ms," and the average drive response time of the storage drives 20 belonging to the third tier is "12 ms."

In this case, as shown in FIG. 38(C), possible combinations of tiers are a combination of the first tier and the second tier, a combination of the first tier and the third tier, and a combination of the tier second and the third tier.

Then, the migration effect of a case where data of the second tier is promoted to the first tier between the first tier and the second tier ("T2→T1") is calculated as "8 ms" obtained by subtracting the average response time "1 ms" of the storage drives 20 constituting the first tier from the average response time "9 ms" of the storage drives 20 constituting the second tier (see 1$^{st}$ row of FIG. 38(C)). Also, the migration effect of a case where data of the third tier is promoted to the first tier between the first tier and the third tier ("T3→T1") is calculated as "11 ms" obtained by subtracting the average response time "1 ms" of the storage drives 20 constituting the first tier from the average response time "12 ms" of the storage drives 20 constituting the third tier (see 2$^{nd}$ row of FIG. 38(C)). Furthermore, the migration effect of a case where data of the third tier is promoted to the second tier between the second and the third tier ("T3→T2") is calculated as "3 ms" obtained by subtracting the average response time "9 ms" of the storage drives 20 constituting the second tier from the average response time "12 ms" of the storage drives 20 constituting the third tier (see 3$^{rd}$ row of FIG. 38(C)).

Similarly, the migration effect of a case where data of the first tier is demoted to the second tier between the first tier and the second tier ("T1→T2") is calculated as "−8 ms" obtained by subtracting the average response time "9 ms" of the storage drives 20 constituting the second tier from the average response time "1 ms" of the storage drives 20 constituting the first tier (see 4$^{th}$ row of FIG. 38(C)). Also, the migration effect of a case where data of the first tier is demoted to the third tier between the first tier and the third tier ("T1→T3") is calculated as "−11 ms" obtained by subtracting the average response time "12 ms" of the storage drives 20 constituting the third tier from the average response time "1 ms" of the storage drives 20 constituting the first tier (see 5$^{th}$ row of FIG. 38(C)). Furthermore, the migration effect of a case where data of the second tier is demoted to the third tier between the second tier and the third tier ("T2→T3") is calculated as "−3 ms" obtained by subtracting the average response time "12 ms" of the storage drives 20 constituting the third tier from the average response time "9 ms" of the storage drives 20 constituting the second tier (see 6$^{th}$ row of FIG. 38(C)).

Then, if the migration effect of the data promotion which is calculated as described above between each combination of tiers is a positive value (that is, if the migration effect can be obtained), either a quotient obtained by dividing the migrated amount parameter by the migrated amount effect or the first or second tier threshold value, whichever is larger, is set as the promotion line for the relevant combination of tiers; and if the migration effect is a negative value (that is, if the migration effect cannot be obtained), the maximum value ("255") of the count value for the number of I/O accesses to each logical page as managed by the counter value management table 45 (FIG. 10) is set as the promotion line for the relevant combination of tiers. Specifically speaking, the larger the migration effect of data migration between the tiers is, the closer to the corresponding first or second tier threshold value the promotion line becomes; and if the migration effect cannot be obtained, the promotion line is set so that it is considerably separated from the corresponding first or second tier threshold value. As a result, the promotion can be accelerated with respect to the combination of tiers for which the migration effect by the promotion can be obtained; and the promotion can be inhibited with respect to the combination of tiers for which the migration effect cannot be obtained.

Furthermore, if the migration effect of the data demotion is a positive value (that is, if the migration effect can be obtained), either a quotient obtained by dividing the migration effect parameter by the migration effect or the first or second tier threshold value, whichever is smaller, is set as the demotion line for the relevant combination of tiers; and if the migration effect is a negative value (that is, if the migration effect cannot be obtained), the first or second tier threshold value is set as the demotion line for the relevant combination of tiers. Specifically speaking, the larger the migration effect of data migration between the tiers is, the more separated from the corresponding first or second tier threshold value the demotion line becomes; and if the migration effect cannot be obtained, the demotion line is set so that it becomes closer to the corresponding first or second tier threshold value. As a result, in the same manner as in the case of the promotion, the demotion can be accelerated with respect to the combination of tiers for which the migration effect by the demotion can be obtained; and the demotion can be inhibited with respect to the combination of tiers for which the migration effect cannot be obtained.

Incidentally, FIG. 38(C) shows an example of each promotion line and each demotion line when the migrated amount parameter is "2048" and there is no tier with concentrated accesses which might cause a performance bottleneck.

As is apparent from FIG. 38(C), control is performed to use the first tier with higher performance as much as possible, because there is no tier with concentrated accesses which might cause the performance bottleneck. Specifically speaking, the processing for promoting data from the third or second tier to the first tier is prioritized over the promotion of data from the third tier to the second tier. Therefore, the promotion line between the third tier and the second tier is set as a value separated from the second tier threshold value.

Figure 39:
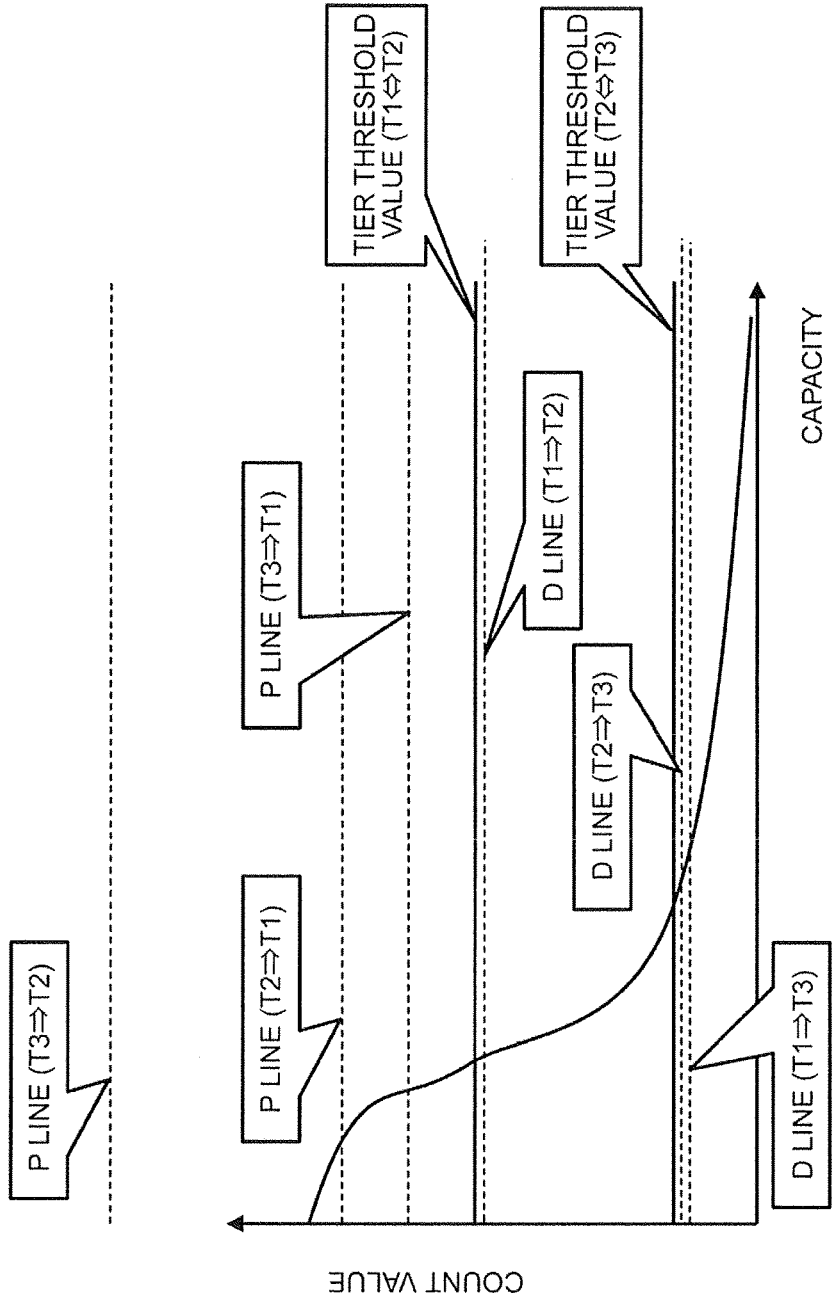
FIG. 39 is a chart for explaining the promotion lines and the demotion lines.

Furthermore, in the example of FIG. 38 as is apparent from FIG. 39, the distance between the promotion line between the third and first tiers and the first tier threshold value is shorter than the distance between the promotion line between the second and first tiers and the first tier threshold value. So, the promotion from the third tier to the first tier is performed more often than the promotion from the second tier to the first tier.

Furthermore, in the example of FIG. 38, each demotion line matches the corresponding first or second tier threshold value, so that none of the demotion from the first tier to the second tier, the demotion from the first tier to the third tier, or the demotion from the second tier to the third tier will be performed.

If there is no tier with concentrated accesses which might cause the performance bottleneck (FIG. 38), the promotion from the second or third tier to the first tier is executed and prioritized over the promotion from the third tier to the second tier and the demotion will not be performed basically. The demotion is executed as the emergency demotion processing (FIG. 18) only when the promotion destination has no unused capacity in step SP35 of the promotion judgment processing described earlier with reference to FIG. 16.

On the other hand, FIG. 40(C) shows an example of each promotion line and each demotion line when the migrated amount parameter is "2048" and accesses are concentrated on the second tier (Tier 2), thereby causing the performance bottleneck. The difference between FIG. 38 and FIG. 40(C) is that the second tier is in a state of high load as shown in FIG. 40(B).

Under such circumstances, the priority of the promotion from the second tier (Tier 2) to the first tier (Tier 1) and the demotion from the second tier to the third tier (Tier 3), which are the performance bottlenecks, increases as compared to the example of FIG. 38.

Figure 40:
FIG. 40(A) to FIG. 40(C) are charts for explaining the promotion lines and the demotion lines.
Figure 41:
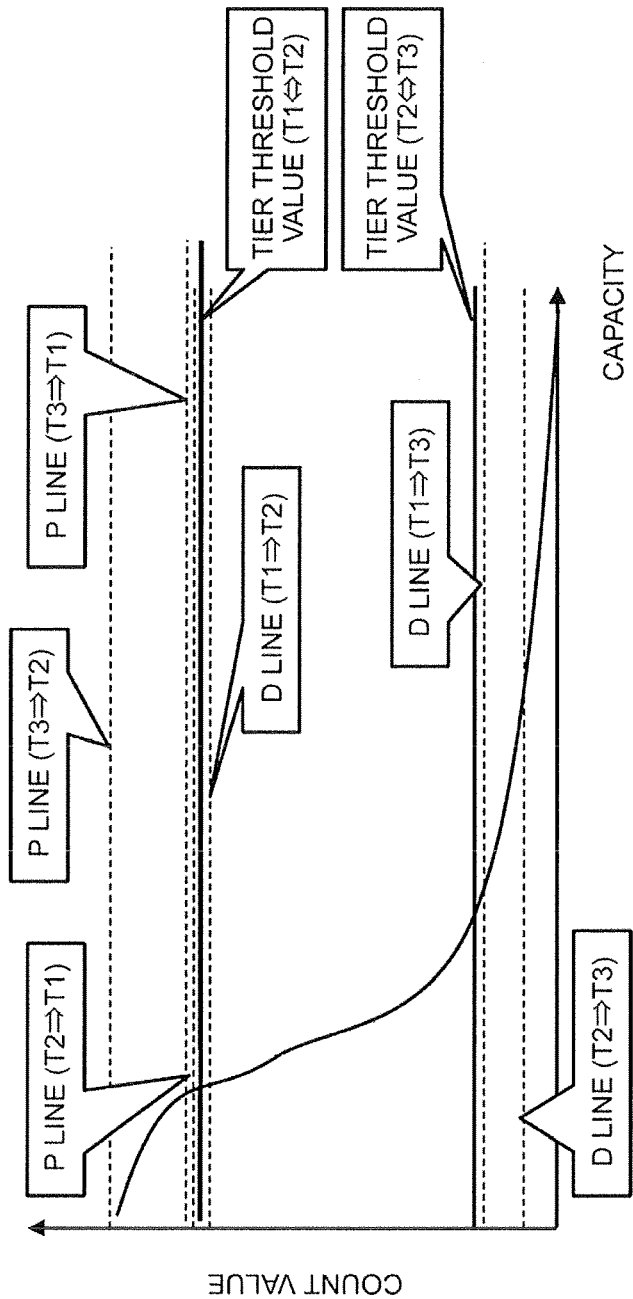
FIG. 41 is a graph for explaining the promotion lines and the demotion lines.

Specifically speaking, as is apparent from FIG. 40(C), the high migration effect can be obtained by promoting data between the second tier and the first tier, so that the promotion line between the second tier and the first tier is also set to a value identical to the corresponding first tier threshold value as shown in FIG. 41. Therefore, the promotion between the second tier and the first tier will be performed very often.

Furthermore, in the example of FIG. 40, the promotion line between the third tier and the first tier is slightly separated from the corresponding first tier threshold value as is also apparent from FIG. 41, so that the promotion between the third tier and the first tier will be performed less frequently. Thus, under the circumstances as in FIG. 40, the promotion from the second tier to the first tier will be executed and prioritized over the promotion from the third tier to the first tier.

Furthermore, with respect to the promotion from the third tier to the second tier, the promotion line between the third tier and the second tier is "MAX" meaning the maximum possible value ("255") of the counter value in the counter value management table 45 (FIG. 10). So, such promotion will not be performed.

Furthermore, in the example of FIG. 40, the demotion line between the first tier and the second tier and the demotion line between the first tier and the third tier match the corresponding first or second tier threshold value, respectively (see FIG. 41), so that neither the demotion from the first tier to the second tier nor the demotion from the first tier to the third tier will be performed. On the other hand, the demotion line between the second tier and the third tier is slightly separated from the corresponding second tier threshold value (see FIG. 41), so that the demotion from the second tier to the third tier will be performed less frequently.

Figure 42:
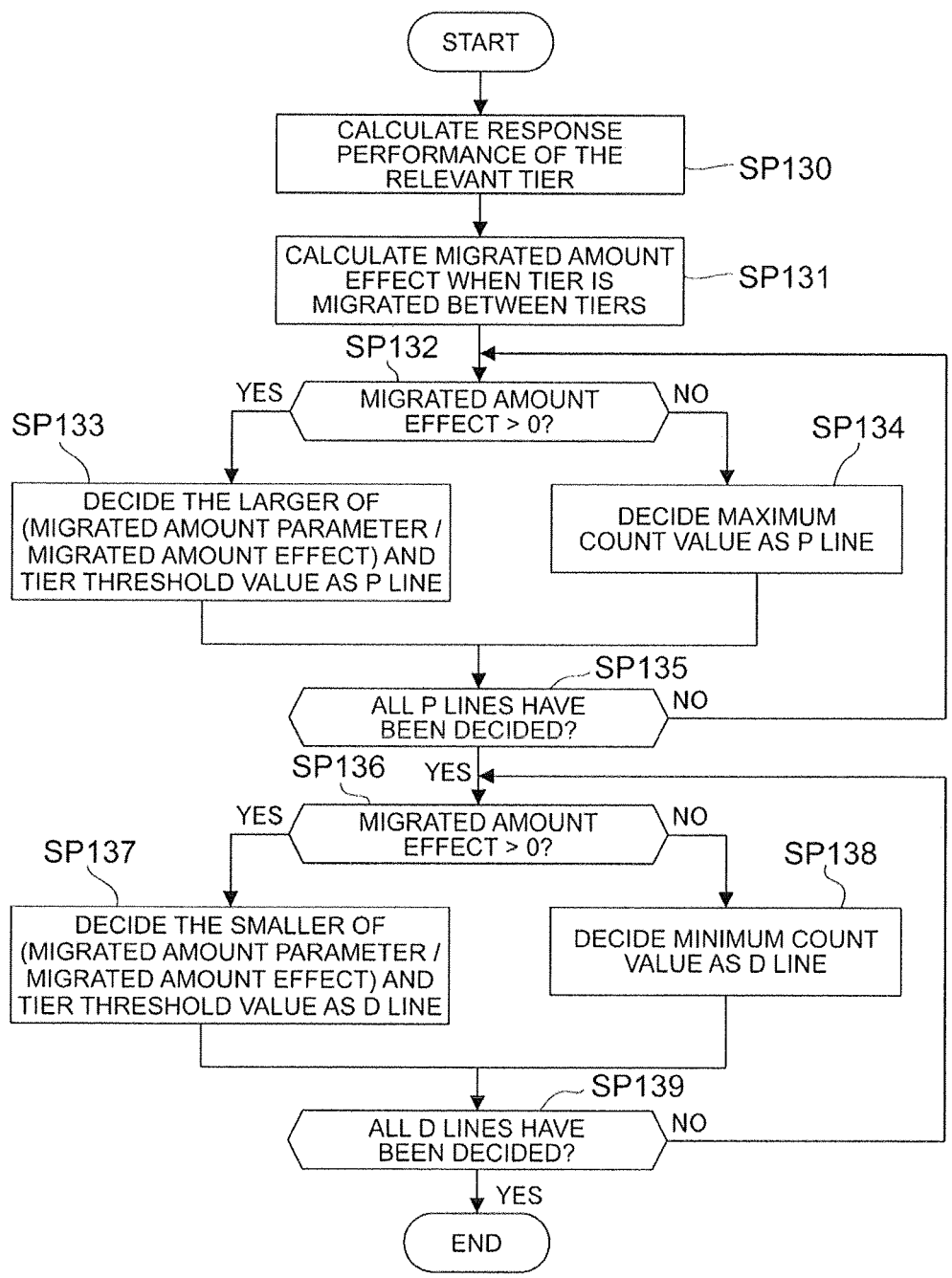
FIG. 42 is a flowchart illustrating a processing sequence for PD line calculation processing.

Now, FIG. 42 shows a specific processing sequence for the PD line calculation processing executed by the CPU 25A, 25B in step SP104 of the aforementioned tier threshold value calculation processing (FIG. 32). The CPU 25A, 25B calculates each promotion line and each demotion line in accordance with the processing sequence shown in FIG. 42.

In fact, when the CPU 25A, 25B proceeds to step SP104 of the tier threshold value calculation processing, it starts this PD line calculation processing and firstly calculates the average response time of each tier in the pool as the response performance of that tier based on response time of each storage drive 20 which is always being monitored (SP130).

Subsequently, the CPU 25A, 25B calculates the migration effect on each combination of tiers based on the then-calculated response performance of each tier in a case of the promotion between the relevant tiers and the migration effect in a case of the demotion, respectively, according to the formula (9) (SP131).

Next, the CPU 25A, 25B sets the promotion line for each combination of tiers (SP132 to SP135).

Specifically speaking, the CPU 25A, 25B selects one combination of tiers and judges whether the migration effect in the case of the promotion of that combination of tiers as calculated in step SP131 is larger than "0" or not (SP132).

Then, if the CPU 25A, 25B obtains an affirmative judgment result in this step, it sets either a quotient obtained by dividing the migrated amount parameter by the migrated amount effect or the first or second tier threshold value, whichever is larger, as the promotion line for that combination of tiers (SP133). Now, the promotion line (T2→T1) is compared with the first tier threshold value, the promotion line (T3→T2) is compared with the second tier threshold value, and the promotion line (T3→T1) is compared with the first tier threshold value. On the other hand, if the CPU 25A, 25B obtains a negative judgment result in step SP132, it sets the maximum count value among count values of the number of I/O accesses to each logical page of virtual volumes VVOL managed in the counter value management table 45 (FIG. 10) as the promotion line for the relevant combination of tiers (SP134).

Subsequently, the CPU 25A, 25B judges whether or not the calculation of the promotion line has been completed for all combinations of tiers (SP135). Then, if the CPU 25A, 25B obtains a negative judgment result in this step, it returns to step SP132 and then repeats the processing from step SP132 to step SP135, while sequentially switching the target (combination of tiers) to be selected in step SP132 to an unprocessed combination of tiers.

Then, if the CPU 25A, 25B obtains an affirmative judgment result in step SP135 by eventually finishing calculating the promotion line for all the combinations of tiers, it then sets the demotion line for each combination of tiers (SP136 to SP139).

Specifically speaking, the CPU 25A, 25B selects one combination of tiers and judges whether the migration effect in the case of the demotion for the relevant combination of tiers as calculated in step SP131 is larger than "0" or not (SP136).

Then, if the CPU 25A, 25B obtains an affirmative judgment result in this step, it sets either an quotient obtained by dividing the migrated amount parameter by the migrated amount effect or the first or second tier threshold value, whichever is smaller, as the promotion line for that combination of tiers (SP137). Now, the demotion line (T1→T2) is compared with the first tier threshold value, the demotion line (T2→T3) is compared with the second tier threshold value, and the demotion line (T1→T3) is compared with the second tier threshold value. On the other hand, if the CPU 25A, 25B obtains a negative judgment result in step SP136, it sets the first or second threshold value among the count values of the number of I/O accesses to each logical page of virtual volumes VVOL managed in the counter value management table 45 (FIG. 10) as the demotion line for the relevant combination of tiers (SP138).

Subsequently, the CPU 25A, 25B judges whether or not the calculation of the demotion lines between all the tiers has been completed or not (SP139). Then, if the CPU 25A, 25B obtains a negative judgment result in this step, it returns to step SP136 and then repeats the processing from step SP136 to step SP139, while sequentially switching the target (combination of tiers) to be selected in step SP136 to an unprocessed combination of tiers.

Then, if the CPU 25A, 25B obtains an affirmative judgment result in step SP139 by eventually finishing calculating the demotion lines between all the tiers, it terminates this PD line calculation processing and returns to the tier threshold value calculation processing.

(3-3) Tier Decision Processing ST3
(3-3-1) Tier Decision Processing

Figure 43:
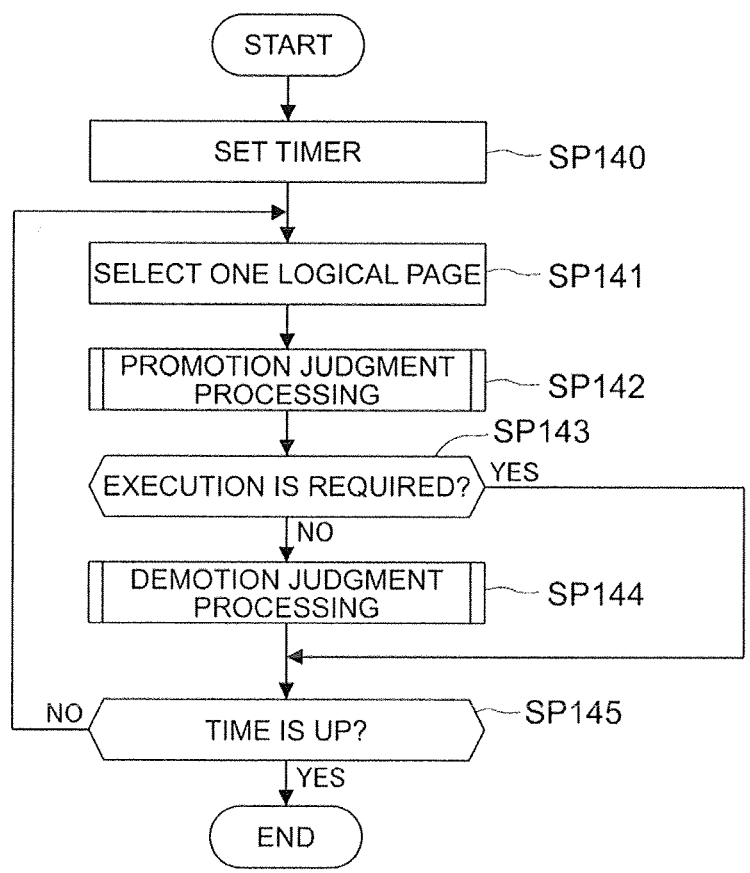
FIG. 43 is a flowchart illustrating a processing sequence for tier decision processing.

FIG. 43 shows a processing sequence for the tier decision processing ST3 (FIG. 3) executed by the CPU 25A, 25B for each of the system-0 controller 21A and the system-1 controller 21B of the storage apparatus 4 during the tier decision processing ST3 in FIG. 3.

The CPU 25A, 25B decides an optimum tier, to which a physical page allocated to the relevant logical page should belong, with respect to each of all logical pages in the storage apparatus 4 by executing this tier decision processing on a specified cycle (for example, every several seconds) by which all logical pages in all virtual volumes VVOL in the storage apparatus 4 can be checked in a predetermined specified time period (for example, in 60 minutes).

In fact, when the CPU 25A, 25B starts this tier decision processing, it sets preset time to execute the tier decision processing to a countdown-type timer (SP140) and then selects a logical page which should be a target (SP141).

Subsequently, the CPU 25A, 25B executes the aforementioned promotion judgment processing (FIG. 16) on the logical page selected in step SP141 (SP142). Accordingly, if it is necessary to promote data, which is stored in the logical page selected in step SP141, to an upper-level tier, the CPU 25A, 25B sets "Execution Required" to the returned value. On the other hand, if it is not necessary to promote the relevant data to the upper-level tier, the CPU 25A, 25B sets "Execution Not Required" to the returned value.

Next, the CPU 25A, 25B judges whether or not "Execution Required" is set to the returned value of the promotion judgment processing executed in step SP142 (SP143). Then, if the CPU 25A, 25B obtains an affirmative judgment result in this step, it proceeds to step SP145.

On the other hand, if the CPU 25A, 25B obtains a negative judgment result in step SP143, it executes demotion judgment processing (SP144) and then proceeds to SP145.

The CPU 25A, 25B judges whether the counter value of the timer has become "0" or not (SP145); and if the CPU 25A, 25B obtains a negative judgment result in this step, it returns to step SP141 and then repeats the processing from step SP141 to step SP145, while sequentially changing the logical page selected in step SP141 to another logical page by means of round robin scheduling.

Then, if the CPU 25A, 25B obtains an affirmative judgment result in step SP148 as the counter value of the timer eventually becomes "0," it terminates this tier decision processing.

(3-3-2) Demotion Judgment Processing

FIG. 44 shows a specific processing sequence for the demotion judgment processing executed by the CPU 25A, 25B in step SP144 of the tier judgment processing (FIG. 43). The CPU 25A, 25B judges whether or not the data stored in the logical page selected in step SP141 last time of the tier judgment processing should be demoted to a lower-level tier in accordance with the processing sequence shown in FIG. 44.

Specifically speaking, when the CPU 25A, 25B proceeds to step SP144 of the tier judgment processing, it starts this demotion judgment processing and firstly sets a tier of one level lower than that of the current tier as a demotion destination tier (SP150).

Subsequently, the CPU 25A, 25B obtains the counter value of the relevant logical page from the counter value management table 45 (FIG. 10) and judges whether or not the obtained counter value is smaller than the tier threshold value (first or second tier threshold value) for demoting the data from the current tier to the tier which was set as the demotion destination in step SP150 (SP151). Then, if the CPU 25A, 25B obtains a negative judgment result in this step, it proceeds to step SP160.

On the other hand, if the CPU 25A, 25B obtains an affirmative judgment result in step SP151, it judges whether or not if the counter value obtained from the counter value management table 45 in step SP151 is larger than the corresponding candidate demotion line (first to third demotion lines) for demoting data from the current tier to the tier which was set as the demotion destination in step SP150 (SP152).

If the CPU 25A, 25B obtains a negative judgment result in this step, it registers that logical page in the LIFO 50 described earlier with reference to FIG. 17 (SP153) and then judges whether or not the judgment to check if the data of the relevant logical page can be demoted has been performed on all the tiers down to the lowest-level tier (SP154). Then, if the CPU 25A, 25B obtains a negative judgment result in this step, it sets a tier of one level lower than that of the current tier as the demotion destination (SP160). Then, the CPU 25A, 25B returns to step SP151 and subsequently executes the processing of step SP151 and subsequent steps in the same manner as described above.

Incidentally, in the subsequent processing, the tier threshold value (first or second tier threshold value) for demoting data from the current tier to the tier which was set as the demotion destination in step SP155 last time is used as a target to be compared with the counter value of the logical page in step SP151; and the demotion line for demoting data from the current tier to the tier which was set as the demotion destination in step SP155 last time is used as a target to be compared with the above-described counter value in step SP152.

On the other hand, if the CPU 25A, 25B obtains an affirmative judgment result in step SP154 (this means that the judgment has been performed on all the tiers down to the lowest-level tier, but the access frequency to the local page where the data is stored is not the access frequency for which the demotion should be performed), it executes preferred relocation processing for demoting the data, which is stored in the physical page belonging to the tier set as the demotion destination in step SP150 or step SP155 executed last, to a lower-level tier than the level of the relevant tier (SP157). Specific processing content of this preferred relocation processing is the same as step SP40 to step SP44 of the emergency demotion processing described earlier with reference to FIG. 18.

Then, the CPU 25A, 25B judges whether the data of any of logical pages belonging to the tier which was set as the demotion destination in step SP150 or step SP155 executed last has been successfully demoted to a lower-level tier than the level of the relevant tier as a result of this preferred relocation processing (SP158).

If the CPU 25A, 25B obtains an affirmative judgment result in this step, it sets "Execution Required" to the returned value (SP159) and then terminates this demotion judgment processing and returns to the tier decision processing (FIG. 43). Thus, in this case, an affirmative judgment result will be obtained in step SP145 of the tier decision processing to be executed after this.

On the other hand, If the CPU 25A, 25B obtains a negative judgment result in step 158, it sets "Execution Not Required" to the returned value and then terminates this demotion judgment processing and returns to the tier decision processing. Thus, in this case, a negative judgment result will be obtained in step SP145 of the tier decision processing to be executed after this.

On the other hand, if the CPU 25A, 25B obtains an affirmative judgment result in step SP156, it refers to the tier management table 42 (FIG. 7) and judges whether or not the tier which was set as the demotion destination in step SP150 or step SP 155 executed last has enough unused capacity to demote the data of the then target page (SP156).

If the CPU 25A, 25B obtains a negative judgment result in this step, it proceeds to step SP157 and then executes processing of step SP157 and subsequent steps in the same manner as described above. On the other hand, if the CPU 25A, 25B obtains an affirmative judgment result in step SP156, it sets "Execution Required" to the returned value (SP159) and then terminates this demotion judgment processing and returns to the tier judgment processing.

(3-4) Page Relocation Processing ST4

The specific processing content of the page relocation processing ST4 in FIG. 3 is the same as the aforementioned page relocation processing in FIG. 19, so that an explanation about it has been omitted here. Incidentally, the relocation processing is executed on the read target data as explained with reference to FIG. 19; however, the relocation processing is also executed on other data which require the relocation processing.

(4) Advantageous Effect of this Embodiment

The computer system 1 according to this embodiment as described above executes, in synchronization with the host I/O processing (the read processing and the write processing), the tier judgment processing for judging whether or not it is necessary to migrate the write target data or the read target data to another tier, and the page relocation processing which is data migration processing when it is necessary to migrate the data. So, data of high access frequency can be immediately migrated to the high-performance tier. Therefore, the response performance of the entire storage apparatus 4 can be enhanced on a real-time basis.

Furthermore, if the page relocation processing is executed in synchronization with the host I/O processing as described above, migration target data is always stored in the cache memory 26A, 26B particularly at the time of the write processing, so that it is unnecessary to stage the relevant data. Accordingly, it is possible to reduce the load on the storage apparatus 4 as compared to the case where the page relocation processing is executed asynchronously with the host I/O processing. As a result, degradation of the response performance due to the execution of the page relocation processing asynchronously with the host I/O processing can be prevented.

(5) Other Embodiments

Incidentally, the aforementioned embodiment has described the case where the present invention is applied to the storage apparatus configured as shown in FIG. 1; however, the present invention is not limited to this example. In short, the present invention can be applied to a wide variety of storage apparatuses having various other configurations to which the hierarchical data management technique is applied.

Furthermore, the aforementioned embodiment has described the case where SSD, SAS, SATA, and so on are used as the storage devices (the storage drives 20) in the storage apparatus 4; however, the present invention is not limited to this example and a wide variety of storage devices, for example, hard disk drives such as FC (Fibre Chanel) disks, disk media such as optical disks and magneto-optical disks, and semiconductor memories other than SDDs such as flash memories can be used as storage devices.

INDUSTRIAL APPLICABILITY

The present invention can be applied to a wide variety of storage apparatus having various configurations to which the hierarchical data management technique is applied.

REFERENCE SIGNS LIST

1 Computer system
2 Host system
4 Storage apparatus
20 Storage drives
21A, 21B Controllers
25A, 25B CPUs
26A, 26B Local memories
27A, 27B Cache memories
40 Virtual volume index table
41 RAID group index table
42 Tier management table
43 Pool index table
44 Page address table
45 Counter value management table
46 Page relocation execution management table
47 Counter value transition table
50 LIFO
60 Section I/O access management table
RG RAID group
PL Pool
ST1 Host I/O processing
ST2 Tier threshold value calculation processing
ST3 Tier decision processing
ST4 Page relocation processing
VVOL Virtual volume

The invention claimed is:

1. A storage apparatus being coupled to a host computer, comprising:
  a plurality of storage devices including a first storage device and a second storage device whose performance is higher than that of the first storage device; and
  a controller being configured to provide a virtual volume including a plurality of logical areas to the host computer; and allocate at least one of a plurality of storage areas in the plurality of storage devices to a logical area of the virtual volume after receiving a write request to the logical area of the virtual volume;
  wherein, the controller is configured to:
  execute a first determination, in response to receiving a read request or a write request to the virtual volume, as to whether or not to migrate data in a first storage area of the first storage device allocated to a first logical area in the first virtual volume corresponding to the read request or the write request, to a second storage area of the second storage device based on an access frequency corresponding to the data of the first logical area;
migrate the data in the first storage area of the first storage device to the second storage area of the second storage device according to a result of the determination; and
allocate the second storage area of the second storage device to the first logical area in the virtual volume if the data in the first storage area is migrated based on the result of the first determination,
wherein when a capacity of storage areas, for storing data migrated from the first storage area of the first storage device, in the second storage device is less than a threshold, the controller is configured to:
execute a second determination as to whether or not to migrate data in a third storage area of the second storage device, which is allocated to a second logical area in the first virtual volume, to the first storage device according to an access frequency corresponding to the data of the second logical area;
migrate the data in the third storage area of the second storage device to a fourth storage area of the first storage device based on a result of the second determination; and
allocate the fourth storage area of the first storage device to the second logical area in the virtual volume if the data in the third storage area is migrated based on the result of the second determination.

2. A storage apparatus according to claim 1, wherein the second storage device is a SSD (Solid State Drive).

3. A storage apparatus according to claim 1, wherein if the controller determines not to migrate the data in the first storage area, the controller maintains the data in the first storage area and keeps allocating the first storage area to the first logical area.

4. A storage apparatus according to claim 1, wherein a third storage area of the second storage device is allocated to a second logical area in the first virtual volume for storing data of the second logical area while the first storage area of the first storage device is allocated to the first logical area in the first virtual volume for storing data of the first logical area.

5. A storage apparatus according to claim 4, wherein an access frequency of the data of the second logical area is higher than an access frequency of the data of the first logical area.

6. A method of managing a storage apparatus coupled to a host computer, the storage apparatus having a plurality of storage devices including a first storage device and a second storage device whose performance is higher than that of the first storage device, and a controller being configured to provide a virtual volume including a plurality of logical areas to the host computer; and allocate at least one of a plurality of storage areas in the plurality of storage devices to a logical area of the virtual volume after receiving a write request to the logical area of the virtual volume, the method comprising:

executing a first determination, in response to receiving a read request or a write request to the virtual volume, whether or not to migrate data in a first storage area of the first storage device allocated to a first logical area in the first virtual volume corresponding to the read request or the write request, to a second storage area of the second storage device based on an access frequency corresponding to the data of the first logical area; and
migrating the data in the first storage area of the first storage device to the second storage area of the second storage device according to a result of the first determination; and
allocating the second storage area of the second storage device to the first logical area in the virtual volume if the data in the first storage area is migrated based on the result of the first determination,
when a capacity of storage areas, for storing data migrated from the first storage area of the first storage device, in the second storage device is less than a threshold, performing the steps of:
executing a second determination as to whether or not to migrate data in a third storage area of the second storage device, which is allocated to a second logical area in the first virtual volume, to the first storage device according to an access frequency corresponding to the data of the second logical area;
migrating the data in the third storage area of the second storage device to a fourth storage area of the first storage device based on a result of the second determination; and
allocate the fourth storage area of the first storage device to the second logical area in the virtual volume if the data in the third storage area is migrated based on the result of the second determination.

7. The method according to claim 6, wherein the second storage device is a SSD (Solid State Drive).

8. The method according to claim 6, further comprising:
upon determining not to migrate the data in the first storage area, maintaining the data in the first storage area and continuing to allocate the first storage area to the first logical area.

9. The method according to claim 6, wherein a third storage area of the second storage device is allocated to a second logical area in the first virtual volume for storing data of the second logical area while the first storage area of the first storage device is allocated to the first logical area in the first virtual volume for storing data of the first logical area.

10. The method according to claim 9, wherein an access frequency of the data of the second logical area is higher than an access frequency of the data of the first logical area.

* * * * *